United States Patent
Kemp et al.

(10) Patent No.: US 9,411,855 B2
(45) Date of Patent: Aug. 9, 2016

(54) TRIGGERING ACTIONS IN AN INFORMATION FEED SYSTEM

(75) Inventors: Christopher A. Kemp, Toronto (CA); Carter Thaxton, Portland, OR (US); Christopher De Gour, San Jose, CA (US); Kevin Schraith, Orinda, CA (US); Andrew Sopko, San Francisco, CA (US); Nathan Wisman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 389 days.

(21) Appl. No.: 13/162,273

(22) Filed: Jun. 16, 2011

(65) Prior Publication Data

US 2012/0102063 A1    Apr. 26, 2012

Related U.S. Application Data

(60) Provisional application No. 61/474,546, filed on Apr. 12, 2011, provisional application No. 61/406,524, filed on Oct. 25, 2010, provisional application No. 61/416,204, filed on Nov. 22, 2010.

(51) Int. Cl.
*G06F 17/30* (2006.01)

(52) U.S. Cl.
CPC .................. *G06F 17/3051* (2013.01)

(58) Field of Classification Search
USPC .................................................. 707/702, 769
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

FOREIGN PATENT DOCUMENTS

| | | |
|---|---|---|
| WO | WO 2008/148130 | 12/2008 |
| WO | WO 2011/060306 | 5/2011 |

(Continued)

OTHER PUBLICATIONS

U.S. Appl. No. 13/174,296, filed Jun. 30, 2011, Hubbard et al.

(Continued)

*Primary Examiner* — Shyue Jiunn Hwa
(74) *Attorney, Agent, or Firm* — Weaver Austin Villeneuve & Sampson LLP

(57) ABSTRACT

Disclosed are systems, apparatus, methods, and computer readable media for performing actions in response to information updates provided in an information feed. In one implementation, an information update is selected for comparison with a data record creation rule. The data record creation rule may specify a data record creation operation for creating a data record based the selected information update. The selected information update may be capable of being displayed in an information feed. A determination may be made as to whether the selected information update includes information satisfying a trigger condition associated with the data record creation rule. When the information in the selected information update satisfies the trigger condition, the data record creation operation may be performed to create the data record. The data record creation operation may identify information to include in the data record.

20 Claims, 44 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,852,715 A | 12/1998 | Raz et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,189,016 B1 | 2/2001 | Cabrera et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,240,429 B1 | 5/2001 | Thornton et al. |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,564,207 B1 | 5/2003 | Abdoh |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,013,325 B1 | 3/2006 | Vivian et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,130,807 B1 * | 10/2006 | Mikurak ............... G06Q 10/06 705/7.25 |
| 7,181,758 B1 | 2/2007 | Chan |
| 7,269,590 B2 | 9/2007 | Hull et al. |
| 7,289,976 B2 | 10/2007 | Kihneman et al. |
| 7,356,482 B2 | 4/2008 | Frankland et al. |
| 7,373,599 B2 | 5/2008 | McElfresh et al. |
| 7,398,223 B2 | 7/2008 | Kahlert et al. |
| 7,401,094 B1 | 7/2008 | Kesler |
| 7,406,501 B2 | 7/2008 | Szeto et al. |
| 7,412,455 B2 | 8/2008 | Dillon |
| 7,421,444 B1 | 9/2008 | Owen, Jr. |
| 7,454,509 B2 | 11/2008 | Boulter et al. |
| 7,508,789 B2 | 3/2009 | Chan |
| 7,552,063 B1 | 6/2009 | McEachern |
| 7,574,429 B1 | 8/2009 | Zaifman |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,416 B2 | 8/2010 | Koga et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,881 B1 | 12/2010 | Assal et al. |
| 7,945,653 B2 | 5/2011 | Zuckerberg et al. |
| 7,984,056 B1 | 7/2011 | Kane |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,060,634 B1 | 11/2011 | Darnell et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,539,359 B2 | 9/2013 | Rapaport et al. |
| 8,566,301 B2 | 10/2013 | Rueben et al. |
| 8,646,103 B2 | 2/2014 | Jakobson et al. |
| 8,655,938 B1 | 2/2014 | Smith et al. |
| 8,886,766 B2 | 11/2014 | Dunn et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0188777 A1 | 12/2002 | Kraft et al. |
| 2003/0004971 A1 | 1/2003 | Gong |
| 2003/0018705 A1 | 1/2003 | Chen et al. |
| 2003/0018830 A1 | 1/2003 | Chen et al. |
| 2003/0046140 A1 | 3/2003 | Callahan et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |

(56) References Cited

U.S. PATENT DOCUMENTS

| | | |
|---|---|---|
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0205540 A1 | 10/2004 | Vulpe et al. |
| 2004/0226002 A1 | 11/2004 | Larcheveque et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004978 A1* | 1/2005 | Reed ............... G06Q 30/0601 |
| | | 709/203 |
| 2005/0050555 A1 | 3/2005 | Exley et al. |
| 2005/0091098 A1 | 4/2005 | Brodersen et al. |
| 2005/0267907 A1 | 12/2005 | Pope et al. |
| 2006/0200443 A1* | 9/2006 | Kahn ............... G06F 17/3089 |
| 2006/0235715 A1 | 10/2006 | Abrams et al. |
| 2006/0235831 A1 | 10/2006 | Adinolfi et al. |
| 2007/0005339 A1 | 1/2007 | Jaquinta |
| 2007/0038641 A1 | 2/2007 | Fawcett et al. |
| 2007/0043766 A1* | 2/2007 | Nicholas ............ H04L 67/02 |
| 2007/0061487 A1 | 3/2007 | Moore et al. |
| 2007/0073787 A1* | 3/2007 | Tysowski .......... G06F 17/30581 |
| 2007/0083536 A1 | 4/2007 | Darnell et al. |
| 2007/0106536 A1 | 5/2007 | Moore |
| 2007/0174429 A1 | 7/2007 | Mazzaferri et al. |
| 2007/0214097 A1 | 9/2007 | Parsons et al. |
| 2007/0226037 A1 | 9/2007 | Garg et al. |
| 2008/0040474 A1 | 2/2008 | Zuckerberg et al. |
| 2008/0040673 A1 | 2/2008 | Zuckerberg et al. |
| 2008/0082540 A1 | 4/2008 | Weissman et al. |
| 2008/0168135 A1* | 7/2008 | Redlich ............. G06Q 10/10 |
| | | 709/204 |
| 2008/0244091 A1 | 10/2008 | Moore et al. |
| 2008/0249972 A1 | 10/2008 | Dillon |
| 2008/0263169 A1 | 10/2008 | Brabec et al. |
| 2008/0281610 A1 | 11/2008 | Yoshida et al. |
| 2008/0301175 A1 | 12/2008 | Applebaum et al. |
| 2009/0063415 A1 | 3/2009 | Chatfield et al. |
| 2009/0100342 A1 | 4/2009 | Jakobson |
| 2009/0157658 A1* | 6/2009 | Bonev ............... G06Q 30/00 |
| 2009/0177484 A1 | 7/2009 | Davis et al. |
| 2009/0177744 A1 | 7/2009 | Marlow et al. |
| 2009/0222527 A1 | 9/2009 | Arconati et al. |
| 2009/0222750 A1 | 9/2009 | Jain et al. |
| 2009/0249290 A1 | 10/2009 | Jenkins et al. |
| 2009/0259628 A1 | 10/2009 | Farrell et al. |
| 2009/0271287 A1 | 10/2009 | Halpern |
| 2009/0282045 A1 | 11/2009 | Hsieh et al. |
| 2009/0292773 A1 | 11/2009 | Leedberg et al. |
| 2010/0030734 A1 | 2/2010 | Chunilal |
| 2010/0049852 A1 | 2/2010 | Whitnah et al. |
| 2010/0082431 A1 | 4/2010 | Ramer et al. |
| 2010/0107164 A1 | 4/2010 | Koskimies et al. |
| 2010/0107165 A1 | 4/2010 | Koskimies et al. |
| 2010/0132049 A1 | 5/2010 | Vernal et al. |
| 2010/0145939 A1 | 6/2010 | Kumar et al. |
| 2010/0153377 A1 | 6/2010 | Rajan et al. |
| 2010/0161707 A1 | 6/2010 | Henderson |
| 2010/0198649 A1 | 8/2010 | Appleyard et al. |
| 2010/0205541 A1 | 8/2010 | Rapaport et al. |
| 2010/0287256 A1 | 11/2010 | Neilio |
| 2010/0325107 A1 | 12/2010 | Kenton et al. |
| 2011/0066710 A1 | 3/2011 | Paul |
| 2011/0113057 A1 | 5/2011 | Lee et al. |
| 2011/0113058 A1 | 5/2011 | Lee et al. |
| 2011/0113059 A1 | 5/2011 | Lee et al. |
| 2011/0113071 A1 | 5/2011 | Lee et al. |
| 2011/0113072 A1 | 5/2011 | Lee et al. |
| 2011/0137940 A1 | 6/2011 | Gradin et al. |
| 2011/0153712 A1* | 6/2011 | Whetsel ........... G06F 17/30569 |
| | | 709/201 |
| 2011/0161444 A1 | 6/2011 | Chauhan |
| 2011/0218958 A1 | 9/2011 | Warshavsky et al. |
| 2011/0238495 A1 | 9/2011 | Kang |
| 2011/0247051 A1 | 10/2011 | Bulumulla et al. |
| 2011/0271175 A1 | 11/2011 | Lavi et al. |
| 2011/0289097 A1 | 11/2011 | Fischer et al. |
| 2011/0289161 A1* | 11/2011 | Rankin, Jr. .......... G06Q 10/107 |
| | | 709/206 |
| 2011/0302221 A1 | 12/2011 | Tobin et al. |
| 2011/0307695 A1 | 12/2011 | Slater et al. |
| 2011/0314029 A1 | 12/2011 | Fischer et al. |
| 2011/0320423 A1* | 12/2011 | Gemmell .......... G06F 17/30867 |
| | | 707/706 |
| 2012/0042218 A1 | 2/2012 | Cinarkaya et al. |
| 2012/0059795 A1 | 3/2012 | Hersh et al. |
| 2012/0078917 A1 | 3/2012 | Gradin et al. |
| 2012/0078981 A1 | 3/2012 | Gradin et al. |
| 2012/0079004 A1 | 3/2012 | Herman |
| 2012/0079038 A1 | 3/2012 | Hersh |
| 2012/0086544 A1 | 4/2012 | Kemp |
| 2012/0089610 A1 | 4/2012 | Agrawal et al. |
| 2012/0096046 A1 | 4/2012 | Kucera |
| 2012/0101985 A1 | 4/2012 | Kemp et al. |
| 2012/0102114 A1 | 4/2012 | Dunn et al. |
| 2012/0102153 A1 | 4/2012 | Kemp et al. |
| 2012/0102402 A1 | 4/2012 | Kwong |
| 2012/0102420 A1 | 4/2012 | Fukahori |
| 2012/0143817 A1 | 6/2012 | Prabaker et al. |
| 2012/0143917 A1 | 6/2012 | Prabaker et al. |
| 2012/0223951 A1 | 9/2012 | Dunn et al. |
| 2012/0233137 A1 | 9/2012 | Jakobson et al. |
| 2012/0290407 A1 | 11/2012 | Hubbard et al. |
| 2012/0316962 A1 | 12/2012 | Rathod |
| 2012/0317203 A1 | 12/2012 | Hostetler |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0026600 A1 | 1/2015 | Dunn et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

FOREIGN PATENT DOCUMENTS

| | | |
|---|---|---|
| WO | WO 2012/048092 | 4/2012 |
| WO | WO 2012/054309 | 4/2012 |

OTHER PUBLICATIONS

U.S. Appl. No. 13/280,086, filed Oct. 24, 2011, Dunn.
U.S. Appl. No. 13/362,941, filed Jan. 31, 2012, Olsen.
U.S. Appl. No. 13/363,007, filed Jan. 31, 2012, Dunn et al.
U.S. Appl. No. 13/363,081, filed Jan. 31, 2012, Dunn et al.
U.S. Appl. No. 13/439,755, filed Apr. 4, 2012, Beechuk et al.
U.S. Appl. No. 13/440,479, filed Apr. 5, 2012, Olsen et al.
U.S. Appl. No. 13/446,855, filed Apr. 13, 2012, Dunn.
U.S. Appl. No. 13/447,643, filed Apr. 16, 2012, Thaxton et al.
U.S. Appl. No. 13/447,645, filed Apr. 16, 2012, Hanson et al.
U.S. Appl. No. 13/455,999, filed Apr. 25, 2012, Bedi.
U.S. Appl. No. 13/478,002, filed May 22, 2012, Hubbard et al.
U.S. Appl. No. 13/489,882, filed Jun. 6, 2012, Verma et al.
U.S. Appl. No. 13/540,363, filed Jul. 2, 2012, Dunn et al.

(56) References Cited

OTHER PUBLICATIONS

U.S. Appl. No. 13/540,367, filed Jul. 2, 2012, Micucci et al.
U.S. Appl. No. 13/540,375, filed Jul. 2, 2012, Micucci et al.
U.S. Appl. No. 13/585,556, filed Aug. 14, 2012, Mencke.
U.S. Appl. No. 13/586,202, filed Aug. 15, 2012, Dunn et al.
U.S. Appl. No. 13/589,335, filed Aug. 20, 2012, Wong et al.
U.S. Appl. No. 13/603,910, filed Sep. 5, 2012, Schneider.
U.S. Office Action dated Mar. 16, 2012 issued in U.S. Appl. No. 13/025,069.
U.S. Office Action dated Jun. 28, 2012 issued in U.S. Appl. No. 13/025,076.
U.S. Office Action dated Jun. 7, 2012 issued in U.S. Appl. No. 13/162,276.
U.S. Office Action dated Mar. 15, 2012 issued in U.S. Appl. No. 12/945,410.
U.S. Final Office Action dated Jul. 30, 2012 issued in U.S. Appl. No. 12/945,410.
U.S. Office Action dated Mar. 30, 2012 issued in U.S. Appl. No. 12/945,417.
U.S. Office Action dated Mar. 28, 2012 issued in U.S. Appl. No. 12/945,577.
U.S. Office Action dated Jun. 29, 2012 issued in U.S. Appl. No. 12/945,656.
U.S. Office Action dated Sep. 18, 2012 issued in U.S. Appl. No. 12/917,326.
U.S. Office Action dated Sep. 7, 2012 issued in U.S. Appl. No. 13/154,324.
PCT International Search Report and Written Opinion dated Feb. 27, 2012 issued in PCT/US2011/055071.
PCT International Search Report and Written Opinion dated Mar. 8, 3012 issued in PCT/US2011/056207.
PCT International Search Report dated Nov. 17, 2011 issued in PCT/US2010/056596.
PCT International Preliminary Report on Patentability and Written Opinion dated May 24, 2012 issued in PCT/US2010/056596.
"Google Plus Users", Google+Ripples, Oct. 31, 2011 [retrieved on Feb. 21, 2012 from Internet at http://www.googleplusers.com/google-ripples.html], 3 pages.
U.S. Office Action dated Mar. 15, 2013 issued in U.S. Appl. No. 13/162,270.
U.S. Office Action dated Jan. 31, 2013 issued in U.S. Appl. No. 13/162,276.
U.S. Final Office Action dated Nov. 6, 2013 issued in U.S. Appl. No. 13/162,270.
U.S. Office Action dated Nov. 29, 2013 issued in U.S. Appl. No. 13/309,435.
U.S. Final Office Action dated Mar. 13, 2014 issued in U.S. Appl. No. 13/162,276.
U.S. Office Action dated Oct. 14, 2014 issued in U.S. Appl. No. 13/162,270.
U.S. Final Office Action dated May 21, 2015 issued in U.S. Appl. No. 13/162,270.
U.S. Notice of Allowance dated Apr. 14, 2014 issued in U.S. Appl. No. 13/309,435.
U.S. Notice of Allowance dated Jul. 2, 2014 issued in U.S. Appl. No. 13/309,435.
U.S. Final Office Action dated Apr. 17, 2014 issued in U.S. Appl. No. 13/162,273.
U.S. Office Action dated Feb. 12, 2015 issued in U.S. Appl. No. 13/162,273.

* cited by examiner

| Event ID 911 | Object ID 912 | Created by ID 913 |
|---|---|---|
| E1 | O615 | U5 |
| E2 | O489 | U101 |

Event History Table 910

| Event ID 931 | Comment 932 | Time/Date 933 |
|---|---|---|
| E37 | " " | 10-21-2010 5:32 PM |
| E37 | " " | 9-17-2010 |

Comment Table 930

| Event ID 921 | Old value 922 | New value 923 |
|---|---|---|
| E37 | 300 | 400 |
| E37 | 4.23 | 4.10 |

Field Change Table 920

| Event ID 951 | Post Text 952 | Time/Date 953 |
|---|---|---|
| E69 | " " | 10-11-2010 4:12 PM |
| E90 | " " | 8-12-2010 |

Post Table 950

| User ID 941 | Object ID 942 |
|---|---|
| U819 | O615 |
| U819 | O489 |
| U719 | O615 |

User Subscription Table 940

| User ID 961 | Event ID 962 |
|---|---|
| U819 | E37 |
| U819 | E90 |
| U719 | E37 |

News Feed Table 960

*FIG. 9A*

TRIGGERING ACTIONS IN AN INFORMATION FEED SYSTEM

PRIORITY AND RELATED APPLICATION DATA

This application claims priority to and commonly assigned Provisional U.S. Patent Application No. 61/474,546, titled "Systems and Methods for Triggering Events Over a Social Network", by Kemp, et al., filed on Apr. 12, 2011, Provisional U.S. Patent Application No. 61/406,524, titled "Performing Scheduling and Providing Auto-responses via an Enterprise Business Network Feed", by Kevin Schraith, filed on Oct. 25, 2010, and Provisional U.S. Patent Application No. 61/416,204, titled "Chatter Keywords", by Sopko et al., filed on Nov. 22, 2010, all of which are hereby incorporated by reference in their entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to providing information updates in an information feed system and, more specifically, to techniques for analyzing and responding to information updates.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and process operations for the disclosed inventive systems, apparatus, and methods for performing trigger actions and detecting trigger conditions on an information feed in an information feed system. These drawings in no way limit any changes in form and detail that may be made by one skilled in the art without departing from the spirit and scope of the disclosed implementations.

FIG. 9A shows a plurality of tables that may be used in tracking events and creating feeds according to one or more implementations.

DETAILED DESCRIPTION

Figure 1A:
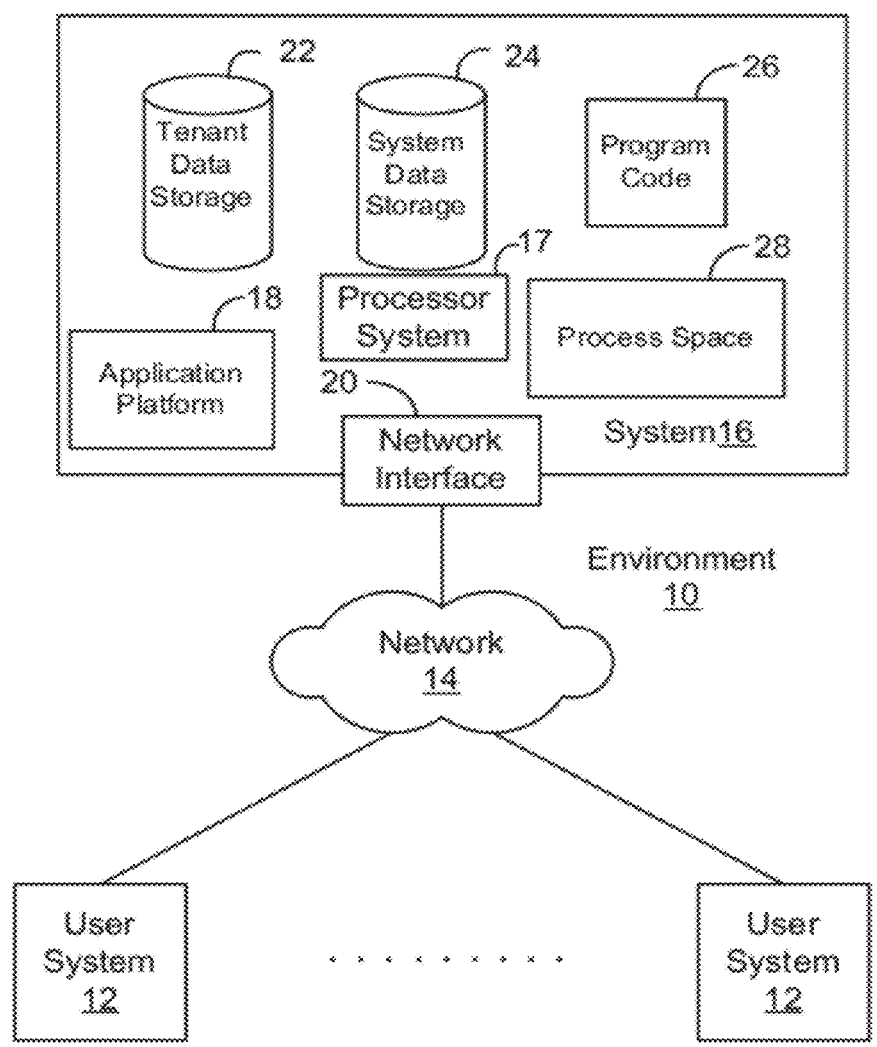
FIG. 1A illustrates a block diagram of an example of an environment 10 wherein an on-demand database service might be used.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, well known process/method steps have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

The "following" of a database record, as described in greater detail below, allows a user to track the progress of that record. Updates to the record, also referred to herein as changes, can occur and be noted on an information feed such as the record feed or the news feed of a user subscribed to the record. With the disclosed implementations, updates are often presented as an item or entry in the feed, but can also be presented as a collection of individual of items. Types of such updates can include field changes in a data record, posts such as explicit text or characters submitted by a user, status updates, uploaded files, and links to other data or records. Also, one type of update is the creation of the record itself. Updates can also be group-related, e.g., a change to group status information for a group of which the user is a member. Users following the record are capable of viewing updates on the user's feed.

In some implementations, the disclosed methods, apparatus, systems, and computer program products may be configured or designed for use in a multi-tenant database environment.

Various implementations described or referenced herein are directed to different methods, apparatus, systems, and computer program products for facilitating the performance of trigger rules on an information feed in an on-demand database service environment. The disclosed implementations provide for creating and activating trigger rules for automatically responding to information updates. For example, implementations of the disclosed systems, apparatus, and methods are configured to create data objects in response to detecting designated conditions in information updates. As another example, implementations of the disclosed systems, apparatus, and methods are configured to cause user account to follow data objects in response to detecting designated conditions in information updates.

In some implementations, a trigger rule can be created. A trigger rule may designate one or more trigger conditions and one or more trigger actions. The system may then compare the trigger rule with an information update created in an information feed system. When the designated trigger condition or conditions is detected, the designated trigger action or actions is performed.

In some implementations, a condition may include one or more text strings included in the information update, status conditions associated with the information update, information update scheduling information, or any other information accessible via the system. A single trigger rule may be associated with various numbers and types of trigger conditions. A trigger condition may be selected by a user, defined by custom computer programming language code, or created by the system.

In some implementations, a designated action may be performed for an information update when a trigger condition is detected. The action may include altering the information update, creating a new information update, creating or altering a data object, removing a data object, sending a message, creating an information update in a social networking system accessible via a network such as the Internet (e.g., Twitter®), or performing any other action capable of being performed by the system.

In some implementations, the action may include creating a data object such as a database record based on an information update. For example, an information update may be selected for comparison with a data object creation rule. The data object creation rule may specify a data object creation operation for creating the data object. A determination may be made as to whether the selected information update includes information satisfying a trigger condition associated with the data object creation rule. When the information in the selected information update satisfies the trigger condition, the data object creation operation may be performed to create the data object. The data object creation operation may identify information to include in the data object.

In some implementations, the action may include causing designated user accounts to follow or stop following a designated database record, user account, group of user accounts, or other construct. For example, an information update may be created in associated with a database record, such as a case. If the text string "!ALLFOLLOW" or "!UNFOLLOW" is detected in the information update, then a designated list of users may be made to follow or stop following the case.

In some implementations, the action may include translating an information update when a trigger condition is detected. For example, a trigger rule may be configured to translate an information update from one language (e.g., English) to another language (e.g., French) when the system detects that the information update includes the text string "&translate". The translated text may be stored on a storage medium, presented in a new information update, or transmitted in a message.

In some implementations, keywords may be stored in association with a user account. Then, if any of these words is mentioned in a conversation within the information feed system, the user account is made to automatically follow the users having the conversation. The system may monitor any information updates that the user account has permission to view according to a security and privacy model. The following action may remain in place until a termination event occurs, such as the passage of a designated time period.

In some implementations, keyword-based monitoring may allow users to stay informed about a variety of topics. For example, a user may plan to be involved with an event in the future and may wish to know whenever other users mention the event. As another example, a user may be responsible for a particular technology or software and may want to know whenever other users ask questions or discuss problems related to the technology or software. In these and other examples, the user could manually search through publicly available updates, but such searching requires time and effort and may need to be performed often to be effective. Alternately, the user could follow any users, groups, or data records that might discuss the topic of interest, but such a strategy might result in the user receiving an excess of irrelevant information. Instead, as described herein, the user can specify one or more keywords for active monitoring. When the system finds information updates, data objects, or other information within the feed system that matches the keywords, the user will be informed. The user can receive as much or as little information related to the identified keyword as desired.

In some implementations, keywords may be displayed within a profile page or other user interface component within an information feed system. Keywords displayed within a profile page may resize dynamically based on various factors such as the prevalence of the keyword as compared to other keywords, a designated importance ranking indicated by the user, or a frequency of occurrence within the information feed system. The system may suggest or recommend keywords to users based similarity or relevance to existing keywords. Keyword entry may employ an auto-complete or selection mechanism to enforce usage of existing keywords, which may help in avoiding the creation of many variations of one term. The system may also prevent designated keywords from being used.

In some implementations, users may create their own applications using a framework. For example, a user may create a class implemented in a computer programming language. The class may include methods that override abstract methods provided in the framework. By overriding these abstract methods, the user may specify a trigger condition and trigger action for a trigger rule.

In some implementations, users may communicate in an information feed system such as a social networking system by posting information updates that include comments, files, status information, and other types of information. An information feed system may be configured to react to conditions defined by trigger rules. The trigger rules may extend and enhance the functionality of the information feed system by streamlining the performance of an action. For instance, instead of manually causing a collection of user accounts to follow a data record, the user can simply enter a text string such as "!ALLFOLLOW" into an information update and let the system automatically perform the action. As another example, instead of manually creating a database record and manually populating its content, the user can simply enter a text string such as "!CASE" and let the system automatically create the database record based on the information update. As yet another example, a user such as a manager may automatically follow a particularly active discussion, such as one with more than ten reply comments to a post, in order to be aware of hot-button issues within the feed system. As still another example, a user may be notified if a comment is posted to a Case data object that has a status of "Closed," since normally such a case might be expected to remain dormant. As still another example, a user following a designated keyword (e.g., an account name) may be notified if the status of an Opportunity database record for the account changes from "Dead" or "Closed" to a different status, such as "Pending."

In one example, two users named Chet and Cindy may be discussing a problem with Windows® via information updates posted in an information feed. Chet may wish to create a "Case" database object in a customer relations management (CRM) system in order to resolve the problem. Instead of manually creating the database object, Chet can simply post an information update that includes the text string "!case." Chet's information update may then be compared with a predefined trigger rule for automatically creating a case. The predefined trigger rule may specify that a case will be automatically created when the text string "!case" is detected. Thus, the trigger rule may be activated to automatically create the case. The case may include information drawn from any associated information updates. For example, the information updates may be added to the comments associated with the case.

In one example, an administrator may set a regular weekly update that is going to go out every week at a certain time. The weekly update may remind users to post a timecard before leaving for the weekend. For example, the user named Chet may receive an information update on Friday that states: "The end of the week is coming fast! Don't forget to post your timecard to the system before you go home for the weekend! Thanks, The Mgmt."

In one example, an administrator may create a rule to automatically respond to the phrase "order 66" that relates to a topic that users are forbidden to discuss. The system may then monitor posts to detect the presence of the "order 66" phrase. The automatic process searching for the phrase "order 66" may run periodically (e.g., every hour), on demand, or for each new information update created. When Chet posts an information update that includes the text "Order 66 is a really bad idea," the system may automatically generate an information update in response that reminds Chet that discussion of the topic is not permitted.

In one example, an H.R. employee named Chet wants to be included on any conversations that mention the new employee H.R. management software he has implemented, called HRForce. Chet can go to his Chatter profile page, scroll to the section in the right sidebar labeled "Key Words," and click the edit icon. An input box appears, allowing Chet to enter "HRForce" and the number of days to follow any employees that mention the term. Chet then click a Save button, and the word HRForce appears in the appropriate key words section. One week later, an employee posts an information update directed at another employee that states: "I'm really enjoying being able to see all of my benefits in HRForce, I just wish there were more documentation to go along with it." In this example, Chet is made to immediately begin following both employees for the number of days specified, and the relevant conversation now appears in Chet's information feed.

These and other implementations may be implemented by various types of hardware, software, firmware, etc. For example, some implementations may be implemented, at least in part, by machine-readable media that include program instructions, state information, etc., for performing various services and operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features and benefits of the disclosed implementations will be described in more detail below with reference to the associated drawings.

The term "multi-tenant database system" can refer to those systems in which various elements of hardware and software of the database system may be shared by one or more customers. For example, a given application server may simultaneously process requests for a great number of customers, and a given database table may store rows for a potentially much greater number of customers. The term "query plan" generally refers to one or more steps used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company that is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one implementation implementing a multi-tenant database, all of the records for the tenants have an identifier stored in a common table. A record has data fields that are defined by the structure of the object (e.g. fields of certain data types and purposes). A record can also have custom fields defined by a user. A field can be another record or include links thereto, thereby providing a parent-child relationship between the records.

The terms "feed" and "information feed" generally include a combination (e.g. a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to information about a user ("profile feed") of the database or about a record ("record feed") in the database. A profile feed and a record feed are examples of different information feeds. A user following the user or record can receive the associated feed items. In some implementations, the feed items from all of the followed users and records can be combined into a single feed for the user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order when displayed in a graphical user interface (GUI) as part of a feed. In contrast to a post, a user status update changes a status of a user and can be made by that user or an administrator. Other similar sections of a user's profile can also include an "About" section. A record can also have a status, whose update can be provided by an owner of the record or other users having suitable write access permissions to the record. The owner can be a single user, multiple users, or a group. In one implementation, there is only one status for a record. In one implementation, a comment can be made on any feed item. In another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

A "feed tracked update," also referred to herein as a "feed update," generally refers to data representing an event, and can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some aspects, the group may be defined as users with a same or similar attribute, or by membership. In one implementation, a "group feed" includes any feed item about any user in a group. In another implementation, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page (e.g. a web page) associated with the record (e.g. a home page of the record). As used herein, a "profile feed" is a feed of feed items about a particular user. In one implementation, the feed items for a profile feed are posts and comments that other users make about or send to the particular user, and status updates made by the user. Such a profile feed can be displayed on a page associated with the particular user. In another implementation, feed items in a profile feed could include posts made by the particular user and feed tracked changes (feed tracked updates) initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record (e.g. an opportunity such as a possible sale of 1000 computers). Once the record update has been made, a feed tracked update about the record update can then automatically be sent (e.g. in a feed) to anyone subscribing to the opportunity or to the user. Thus, the user does not need to contact a manager regarding the change in the opportunity, since the feed tracked update about the update is sent via a feed right to the manager's feed page (or other page).

Next, mechanisms and methods for providing systems implementing enterprise level social and business information networking will be described with reference to example implementations. First, an overview of an example database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other implementations, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 1B) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an implementation, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product implementation includes a machine-readable storage medium (media) having instructions stored thereon/in which can be used to program a computer to perform any of the processes of the implementations described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing implementations of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one implementation, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
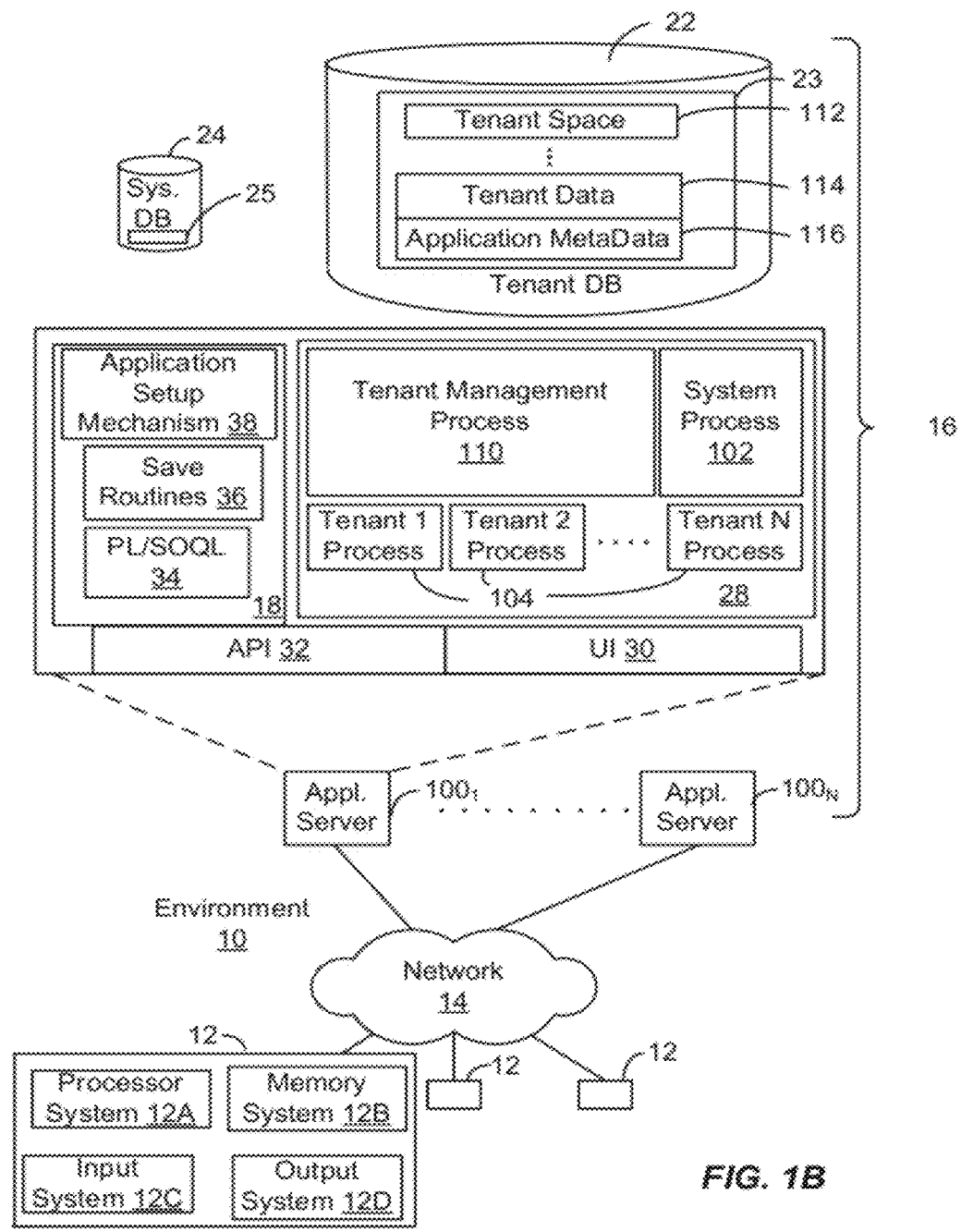
FIG. 1B illustrates a block diagram of an implementation of elements of FIG. 1A and various possible interconnections between these elements.

FIG. 1B also illustrates environment 10. However, in FIG. 1B elements of system 16 and various interconnections in an implementation are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage area 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to implementations of the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039 by Weissman et al., filed Apr. 2, 2004, entitled "Custom Entities and Fields in a Multi-Tenant Database System", and which is hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
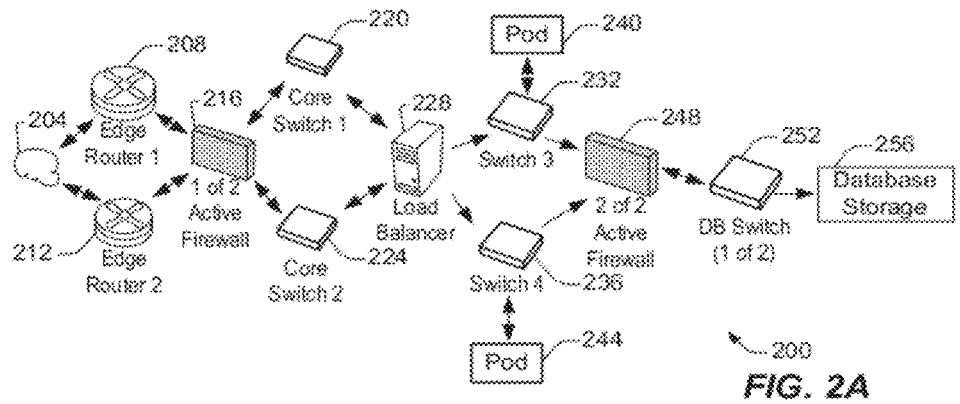
FIG. 2A shows a system diagram 200 illustrating architectural components of an on-demand service environment according to one implementation.

FIG. 2A shows a system diagram 200 illustrating architectural components of an on-demand service environment, in accordance with one implementation.

A client machine located in the cloud 204 (or Internet) may communicate with the on-demand service environment via one or more edge routers 208 and 212. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand service environment may communicate with a database storage system 256 via a database firewall 248 and a database switch 252.

Figure 2B:
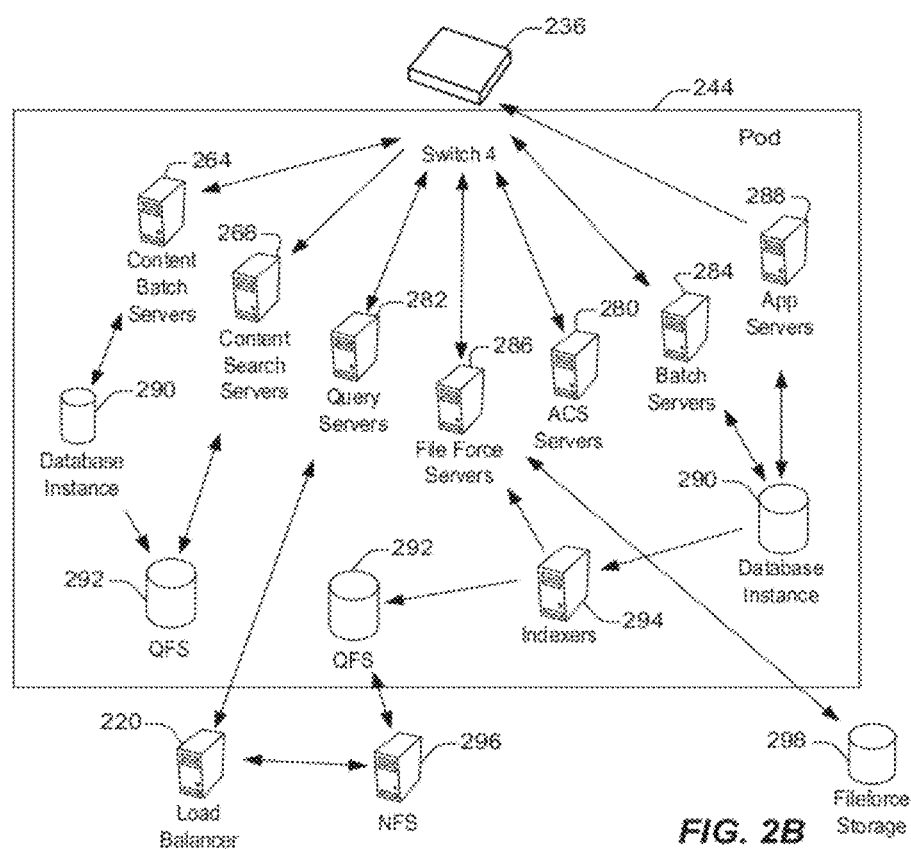
FIG. 2B shows a system diagram further illustrating architectural components of an on-demand service environment according to one implementation.

As shown in FIGS. 2A and 2B, accessing an on-demand service environment may involve communications transmitted among a variety of different hardware and/or software components. Further, the on-demand service environment 200 is a simplified representation of an actual on-demand service environment. For example, while only one or two devices of each type are shown in FIGS. 2A and 2B, some implementations of an on-demand service environment may include anywhere from one to many devices of each type. Also, the on-demand service environment need not include each device shown in FIGS. 2A and 2B, or may include additional devices not shown in FIGS. 2A and 2B.

Moreover, one or more of the devices in the on-demand service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand service environment to access services provided by the on-demand service environment. For example, client machines may access the on-demand service environment to retrieve, store, edit, and/or process information.

In some implementations, the edge routers 208 and 212 route packets between the cloud 204 and other components of the on-demand service environment 200. The edge routers 208 and 212 may employ the Border Gateway Protocol (BGP). The BGP is the core routing protocol of the Internet. The edge routers 208 and 212 may maintain a table of IP networks or 'prefixes' which designate network reachability among autonomous systems on the Internet.

In one or more implementations, the firewall 216 may protect the inner components of the on-demand service environment 200 from Internet traffic. The firewall 216 may block, permit, or deny access to the inner components of the on-demand service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand service environment 200. The core switches 220 and 224 may be configured as network bridges that quickly route data between different components within the on-demand service environment. In some implementations, the use of two or more core switches 220 and 224 may provide redundancy and/or reduced latency.

In some implementations, the pods 240 and 244 may perform the core data processing and service functions provided by the on-demand service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage system 256 may be conducted via the database switch 252. The multi-tenant database system 256 may include more than one hardware and/or software components for handling database queries. Accordingly, the database switch 252 may direct database queries transmitted by other components of the on-demand service environment (e.g., the pods 240 and 244) to the correct components within the database storage system 256.

In some implementations, the database storage system 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram illustrating the architecture of the pod 244, in accordance with one implementation. The pod 244 may be used to render services to a user of the on-demand service environment 200.

In some implementations, each pod may include a variety of servers and/or other systems. The pod 244 includes one or more content batch servers 264, content search servers 268, query servers 272, file force servers 276, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the application servers 288 may include a hardware and/or software framework dedicated to the execution of procedures (e.g., programs, routines, scripts) for supporting the construction of applications provided by the on-demand service environment 200 via the pod 244. Some such procedures may include operations for providing the services described herein, such as performing the methods/processes described below with reference to FIGS. 15-21 and 37-40. In alternative implementations, two or more app servers 288 may be included and cooperate to perform such methods, or one or more other servers in FIG. 2B can be configured to perform the disclosed methods described below.

The content batch servers 264 may requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand service environment.

The Fileforce servers 276 may manage requests information stored in the Fileforce storage 278. The Fileforce storage 278 may store information such as documents, images, and basic large objects (BLOBs). By managing requests for information using the Fileforce servers 276, the image footprint on the database may be reduced.

The query servers 272 may be used to retrieve information from one or more file systems. For example, the query system 272 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may require various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 272 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 220, which may distribute resource requests over various resources available in the on-demand service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without requiring an additional database call.

In some implementations, database information may be transmitted to the indexer 294. Indexer 294 may provide an index of information available in the database 290 and/or QFS 292. The index information may be provided to file force servers 276 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update. For example, a vendor may negotiate a new price with a salesperson of company X, where the salesperson is a user associated with tenant X. As part of creating a new invoice or for accounting purposes, the salesperson can change the price saved in the database. It may be important for co-workers to know that the price has changed. The salesperson could send an e-mail to certain people, but this is onerous and the salesperson might not e-mail all of the people who need to know or want to know. Accordingly, implementations can inform others (e.g. co-workers) who want to know about an update to a record automatically.

Figure 3:
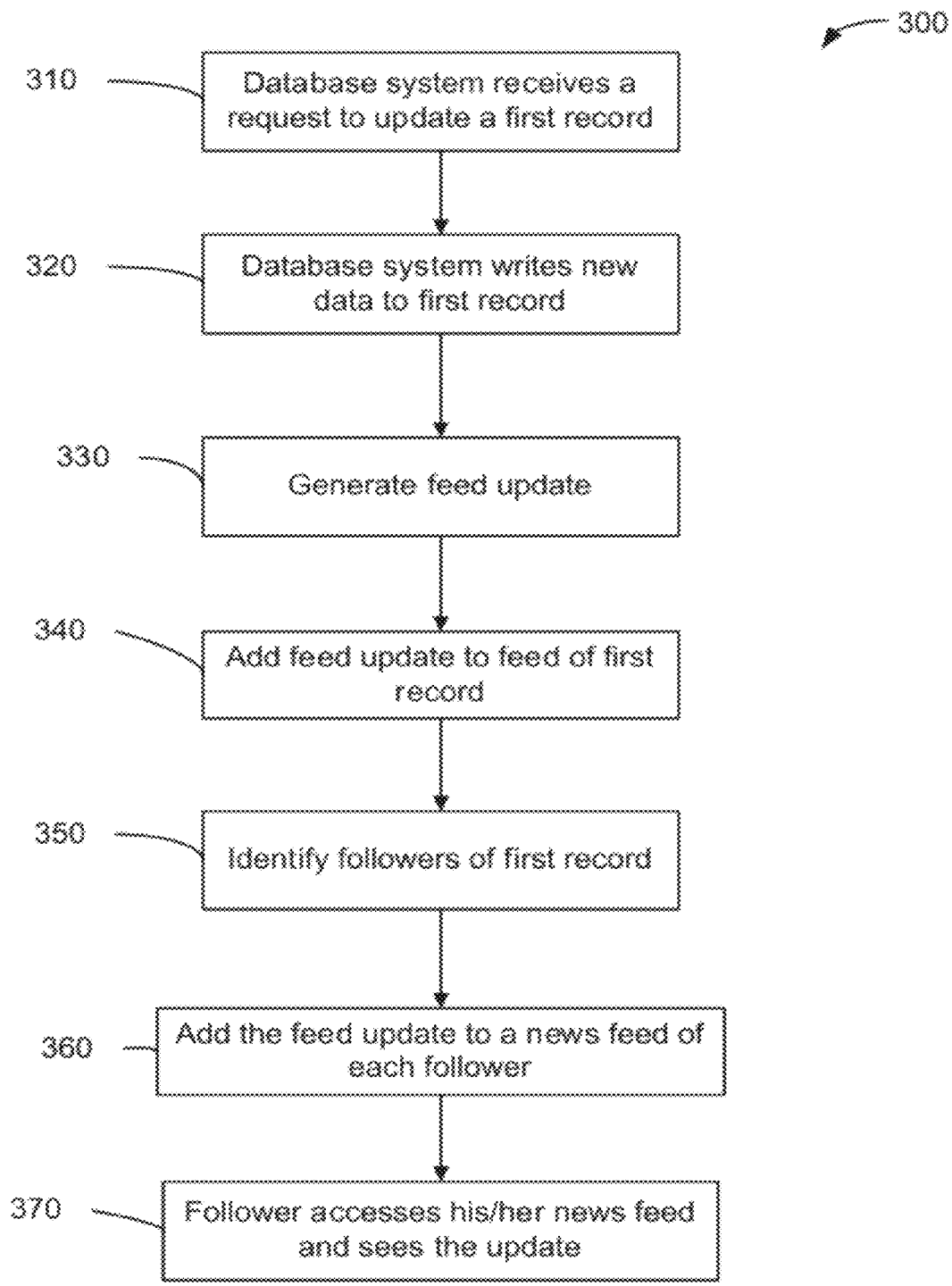
FIG. 3 is a flowchart of a method 300 for tracking updates to a record stored in a database system according to one or more implementations.

FIG. 3 is a flowchart of a method 300 for tracking updates to a record stored in a database system according to implementations. In some implementations, method 300 (and other methods described herein) may be implemented at least partially with multi-tenant database system 16, e.g., by one or more processors configured to receive or retrieve information, process the information, store results, and the transmit the results. In other implementations, method 300 may be implemented at least partially with a single tenant database system. In various implementations, steps may be omitted, combined, or split into additional steps for method 300, as well as for other methods described herein.

In step 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g. converting a lead to an opportunity), closing a record (e.g. a case type record), and potentially any state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In step 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records that are child objects of the first record. A child object itself can include further fields. Thus, if a field of a child object is updated with a new value, the parent record also can be considered to have a field changed. In one example, a field could be a list of related child objects, also called a related list.

In step 330, a feed tracked update is generated about the update to the record. In one implementation, the feed tracked update is created in parts for assembling later into a display version. For example, event entries can be created and tracked in one table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g. through an administrator) can configure the database system to create (enable) feed tracked updates only for certain types of records. For example, an administrator can specify that records of type Account and Opportunity are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is required to be larger than a threshold (e.g. an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In step 340, the feed tracked update is added to a feed for the first record. In one implementation, adding the feed tracked update to a feed can include adding events to a table (which may be specific to a record or be for all or a group of objects), where a display version of a feed tracked update can be performed dynamically when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the feed. For example, the feed can be stored as a field (e.g. as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In step 350, followers of the first record can be identified. A follower is a user following (subscribing to a feed of) the first record. In one implementation, when a user requests a feed of a particular record such an identification need not be done. In another implementation where a record feed is pushed to a user (e.g. as part of a news feed), then the user can be identified as a follower of the first record. Accordingly, this step can be the identification of records and other objects being followed by a particular user.

In one implementation, the database system can store a list of the followers for a particular record. In various implementations, the list can be stored with the first record or associated with the record using an identifier (e.g. a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In step 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in step 370. Thus, these actions may occur in a different order. The creation of the feed for a pull may be a dynamic creation that identifies records being followed by the requesting user, generates the display version of relevant feed tracked updates from stored information (e.g. event and field change), and adds the feed tracked updates into the feed. A feed of feed tracked updates of records and other objects that a user is following is also called a news feed.

In yet another implementation, the feed tracked update could be sent as an e-mail to the follower, instead of in a feed. In one implementation, e-mail alerts for events can enable people to be e-mailed when certain events occur. In another implementation, e-mails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g. a new value input into a specified field, or the creation of a new field).

In step 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g. a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g. importance flags).

Figure 4:
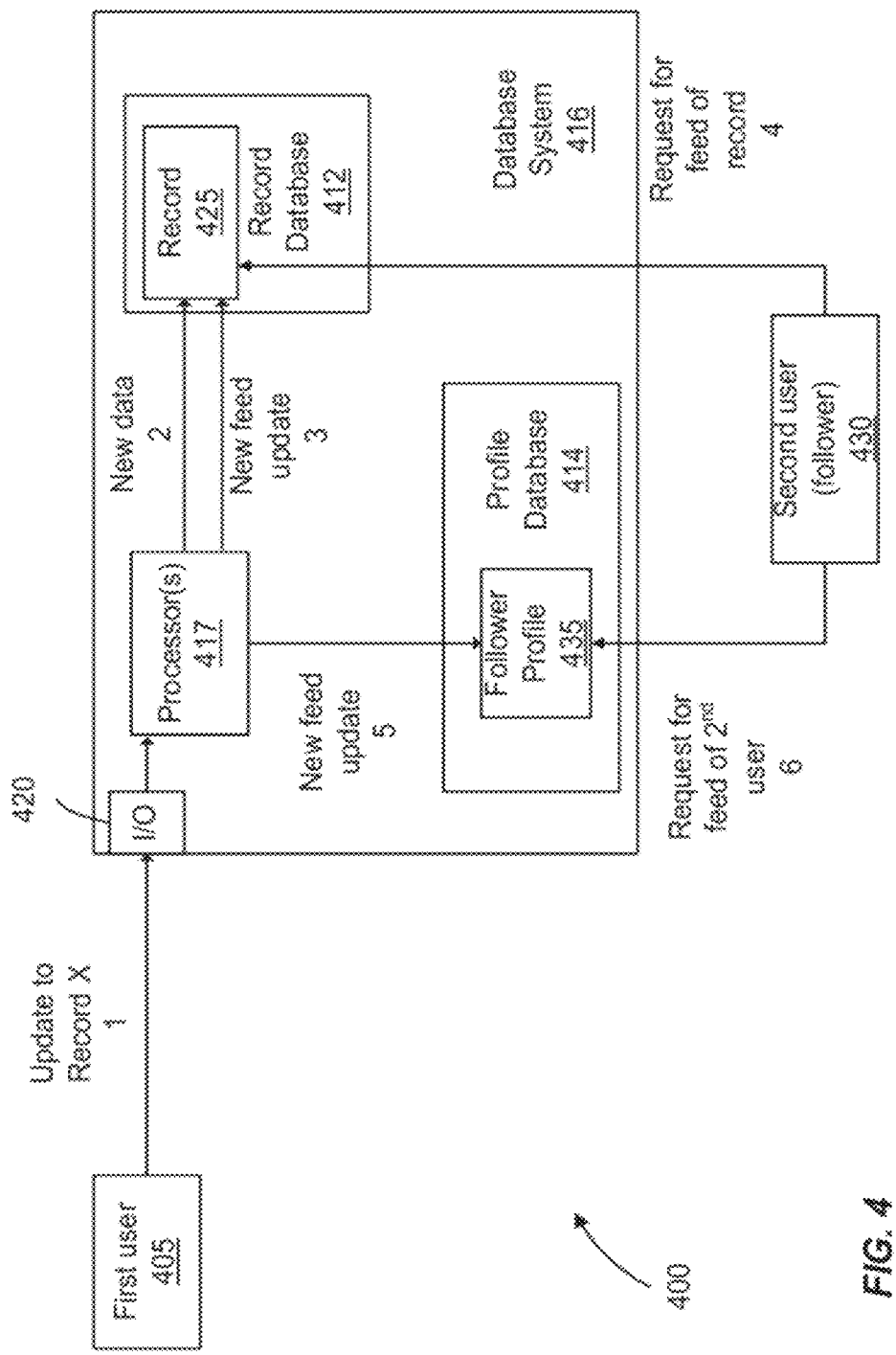
FIG. 4 is a block diagram of components of a database system performing a method for tracking an update to a record according to one or more implementations.

FIG. 4 is a block diagram 400 of components of a database system performing a method for tracking an update to a record according to implementations. Block diagram 400 can perform implementations of method 300, as well as implementations of other method described herein.

A first user 405 sends a request 1 to update record 425 in database system 416. Although an update request is described, other events that are being tracked are equally applicable. In various implementations, the request 1 can be sent via a user interface (e.g. 30 of FIG. 1B) or an application program interface (e.g. API 32). An I/O port 420 can accommodate the signals of request 1 via any input interface, and send the signals to one or more processors 417. The processor 417 can analyze the request and determine actions to be performed. Herein, any reference to a processor 417 can refer to a specific processor or any set of processors in database system 416, which can be collectively referred to as processor 417.

Processor 417 can determine an identifier for record 425, and send commands 2 with the new data to record database 412 to update record 425. In one implementation, record database 412 is where tenant data 112 is stored. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g. a change to a particular field) is to be tracked. This determination can be based on an interaction (i.e. an exchange of data) with record database 412 and/or other databases, or based on information stored locally (e.g. in cache or RAM) at processor 417. In one implementation, a list of record types that are being tracked can be stored. The list may be different for each tenant, e.g. as each tenant may configure the database system to their own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g. if a tenant can specify the particular records to be tracked, as opposed to just type).

As an example, processor 417 may obtain an identifier associated with record 425 (e.g. obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field.

If a feed tracked update is to be generated, processor 417 can then generate the feed tracked update.

In some implementations, a feed tracked update is created dynamically when a feed (e.g. the entity feed of record 425) is requested. Thus, in one implementation, a feed tracked update can be created when a user requests the entity feed for record 425. In this implementation, the feed tracked update may be created (e.g. assembled), including re-created, each time the entity feed is to be displayed to any user. In one implementation, one or more hifeed tracked update tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g. as a child object) of record 425. In another implementation, the feed can be stored in another location or in another database, but with a link (e.g. a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g. with a query or by browsing), and the feed can be obtained through a tab, button, or other activation object on the page. The feed can be displayed on the screen or downloaded.

In another implementation, processor 417 can add the new feed tracked update in a step 5 to a feed (e.g. a news feed) of a user that is following record 425. In one implementation, processor 417 can determine each of the followers of record 425 by accessing a list of the users that have been registered as followers. This determination can be done for each new event (e.g. update 1). In another implementation, processor 417 can poll (e.g. with a query) the records that second user 430 is following to determine when new feed tracked updates (or other feed items) are available. Processor 417 can use a follower profile 435 of second user 430, which can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for records like Account, Opportunity, Case, and Contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g. linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g. a user submitting a synopsis of what the user has done). Accordingly, implementations can automatically track actions of a user that trigger events, and feed tracked updates can be generated for certain events.

Figure 5:
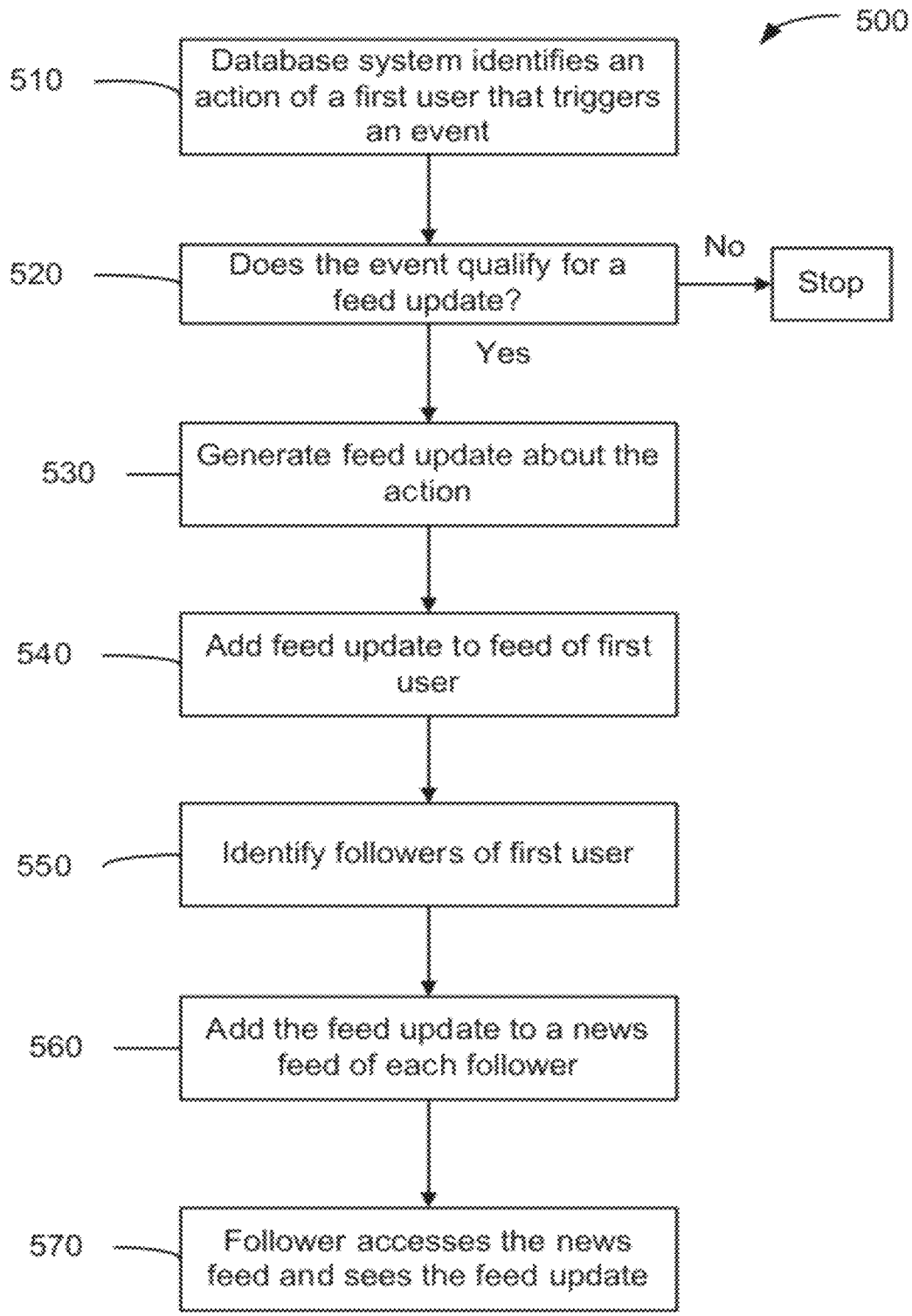
FIG. 5 is a flowchart of a method 500 for tracking actions of a user of a database system according to one or more implementations.

FIG. 5 is a flowchart of a method 500 for tracking actions of a user of a database system according to implementations. Method 500 may be performed in addition to method 300. The methods of implementing method 300, including order of steps, can also be applied to method 500 and other methods described herein. Thus, a feed can be composed of changes to a record and actions of users.

In step 510, a database system (e.g. 16) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In step 520, it is determined whether the event qualifies for a feed tracked update. In one implementation, a predefined list of events (e.g. as mentioned herein) can be created so that only certain actions are identified. In one implementation, an administrator (or other user) of a tenant can specify the type of actions (events) for which a feed tracked update is to be generated. This step may also be performed for method 300.

In step 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In step 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In step 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for step 350.

In step 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In step 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g. updates) that have occurred for a record and actions by a user that trigger an event. A database system can be configured to generate the feed tracked updates for various events in various ways.

A. Which Events to Generate a Feed Tracked Update

In a database system, there are various events that can be detected. However, the operator of the database system and/or a tenant may not want to detect every possible event as this could be costly with regards to performance. Accordingly, the operator and/or the tenant can configure the database system to only detect certain events. For example, an update of a record may be an event that is to be detected.

Out of the events that are detected, a tenant (including a specific user of the tenant) may not want a feed tracked update about each detected event. For example, all updates to a record may be identified at a first level. Then, based on specifications of an administrator and/or a specific user of a tenant, another level of inquiry can be made as to whether a feed tracked update is to be generated about the detected event. For example, the events that qualify for a feed tracked update can be restricted to changes for only certain fields of the record, which can differ depending on which user is receiving the feed. In one implementation, a database system can track whether an event qualifies for a feed tracked update for any user, and once the feed tracked update is generated, it can be determined who is to receive the feed tracked update.

Supported events (events for which a feed tracked update is generated) can include actions for standard fields, custom fields, and standard related lists. Regarding standard fields, for the entity feed and the profile feed, a standard field update can trigger a feed tracked update to be published to that feed. In one implementation, which standard field can create a feed tracked update can be set by an administrator to be the same for every user. In another implementation, a user can set which standard fields create a feed tracked update for that user's news feed. Custom fields can be treated the same or differently than standard fields.

The generation of a feed item can also depend on a relationship of an object to other objects (e.g. parent-child relationships). For example, if a child object is updated, a feed tracked update may be written to a feed of a parent of the child object. The level of relationship can be configured, e.g., only 1 level of separation (i.e. no grandparent-grandchild relationship). Also, in one implementation, a feed tracked update is generated only for objects above the objects being updated, i.e., a feed tracked update is not written for a child when the parent is updated.

In some implementations, for related lists of a record, a feed tracked update is written to its parent record (1 level only) when the related list item is added, and not when the list item is changed or deleted. For example: user A added a new opportunity XYZ for account ABC. In this manner, entity feeds can be controlled so as not to be cluttered with feed tracked updates about changes to their related items. Any changes to the related list item can be tracked on their own entity feed, if that related list item has a feed on it. In this implementation, if a user wants to see a feed of the related list item then the user can subscribe to it. Such a subscription might be when a user cares about a specific opportunity related to a specific account. A user can also browse to that object's entity feed. Other implementations can create a feed tracked update when a related entity is changed or deleted.

In one implementation, an administrator (of the system or of a specific tenant) can define which events of which related objects are to have feed tracked updates written about them in a parent record. In another implementation, a user can define which related object events to show. In one implementation, there are two types of related lists of related objects: first class lookup and second class lookup. Each of the records in the related lists can have a different rule for whether a feed tracked update is generated for a parent record. Each of these related lists can be composed as custom related lists. In various implementations, a custom related list can be composed of custom objects, the lists can contain a variety of records or items (e.g. not restricted to a particular type of record or item), and can be displayed in a customized manner.

In one implementation, a first class lookup contains records of a child record that can exist by itself. For example, the contacts on an account exist as a separate record and also as a child record of the account. In another implementation, a record in a first class lookup can have its own feed, which can be displayed on its detail page.

In one implementation, a second class lookup can have line items existing only in the context of their parent record (e.g. activities on an opportunity, contact roles on opportunity/contact). In one implementation, the line items are not objects themselves, and thus there is no detail page, and no place to put a feed. In another implementation, a change in a second class lookup can be reported on the feed of the parent.

Some implementations can also create feed tracked updates for dependent field changes. A dependent field change is a field that changes value when another field changes, and thus the field has a value that is dependent on the value of the other field. For example, a dependent field might be a sum (or other formula) that totals values in other fields, and thus the dependent field would change when one of the fields being summed changes. Accordingly, in one implementation, a change in one field could create feed tracked updates for multiple fields. In other implementations, feed tracked updates are not created for dependent fields.

B. How the Feed Tracked Update is Generated

After it is determined that a feed tracked update is going to be generated, some implementations can also determine how the feed tracked update is generated. In one implementation, different methods can be used for different events, e.g., in a similar fashion as for the configurability of which events feed tracked updates are generated. A feed tracked update can also include a description of multiple events (e.g. john changed the account status and amount).

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g. submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g. a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a creation of a new record, "Mark Abramowitz created a new Opportunity IBM-20,000 laptops with Amount as $3.5M and Sam Palmisano as Decision Maker." This event can be posted to the profile feed for Mark Abramowitz and the entity feed for record of Opportunity for IBM-20,000 laptops. The pattern can be given by (AgentFullName) created a new (ObjectName)(RecordName) with [(FieldName) as (FieldValue) [,/and]]*[[added/changed/removed] (RelatedListRecordName) [as/to/as] (RelatedListRecordValue) [,/and]]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted by users, the text (also referred generally as messages) can be about any topic. Thus, more information than just actions of a user and events of a record can be conveyed. In one implementation, the messages can be used to ask a question about a particular record, and users following the record can provide responses (comments).

Figure 6:
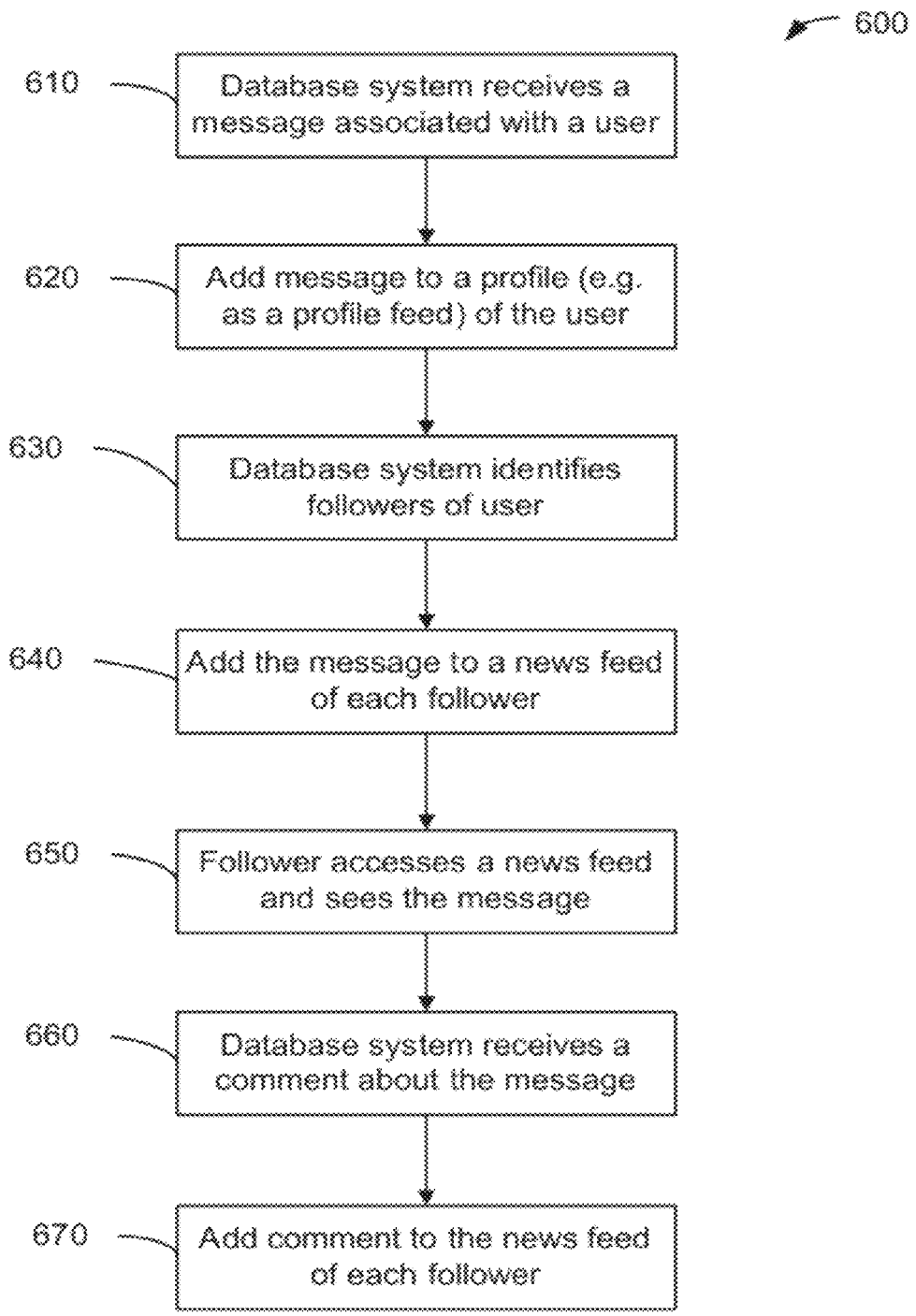
FIG. 6 is a flowchart of a method 600 for creating a news feed from messages created by a user about a record or another user according to one or more implementations.

FIG. 6 is a flowchart of a method 600 for creating a news feed that includes messages associated with a first user according to implementations. In one implementation, method 600 can be combined with methods 300 and 500. In one aspect, a message can be associated with the first user when the first user creates the message (e.g. a post or comment about a record or another user). In another aspect, a message can be associated with the first user when the message is about the first user (e.g. posted by another user on the first user's profile feed).

In step 610, database system receives a message (e.g. a post or status) associated with a first user. The message (e.g. a post or status update) can contain text submitted by another user or by the first user. In one implementation, a post is for a section of the first user's profile where any user can add a post, and where multiple posts can exist. Thus, a post can appear on the first user's profile and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In step 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g. as a related list) with the first user's profile. In one implementation, the posts are listed indefinitely. In another implementation, only the most recent posts (e.g. last 50) are kept in the profile feed. Such implementations can also be employed with feed tracked updates. In yet another implementation, the message can be added to a profile of the user adding the message.

In step 630, database system identifies followers of the first user. In one implementation, the database system can identify the followers as described above for method 500. In various implementations, a follower can select to follow a feed about the actions of the first user, messages about the first user, or both (potentially in a same feed).

In step 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In step 650, the follower accesses a news feed and sees the message. For example, the follower can access a news feed on the user's own profile page. As another example, the follower can have a news feed sent to his/her own desktop without having to first go to a home page.

In step 660, database system receives a comment about the message. The database system can add the comment to a feed of the same first user, much as the original message was added. In one implementation, the comment can also be added to a feed of the user adding the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update (or post) is deleted, its corresponding comments are deleted as well. In another implementation, new comments on a feed tracked update (or post) do not update the feed tracked update timestamp. Also, the feed tracked update or post can continue to be shown in a feed (profile feed, record feed, or news feed) if it has had a comment within a specified timeframe (e.g. within the last week). Otherwise, the feed tracked update (post) can be removed in an implementation.

In some implementations, all or most feed tracked updates can be commented on. In other implementations, feed tracked updates for certain records (e.g. cases or ideas) are not commentable. In various implementations, comments can be made for any one or more records of opportunities, accounts, contacts, leads, and custom objects.

In step 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g. on users, opportunities, etc.) as well as an opportunity to reach out to your co workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain criteria that are common to the users, can be created by inviting users, or can be created by receiving requests to join from a user. In one implementation, a group feed can be created, with messages being added to the group feed when someone adds a message to the group as a whole. For example, a group page may have a section for posts. In another implementation, a message can be added to a group feed when a message is added about any one of the members. In yet another implementation, a group feed can include feed tracked updates about actions of the group as a whole (e.g. when an administrator changes data in a group profile or a record owned by the group), or about actions of an individual member.

Figure 7:
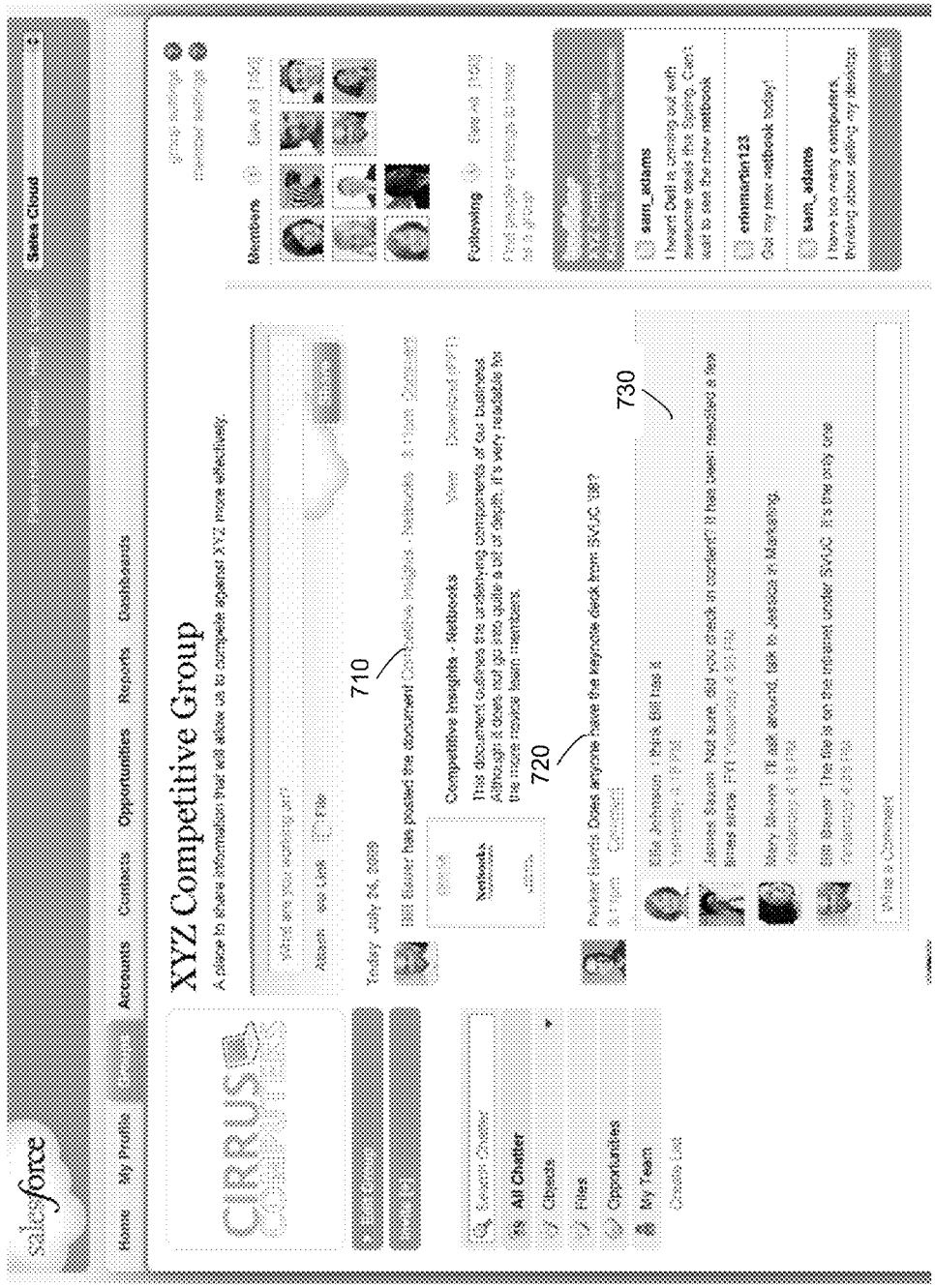
FIG. 7 shows an example of a group feed on a group page according to one or more implementations.

FIG. 7 shows an example of a group feed on a group page according to implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730.

Figure 8:
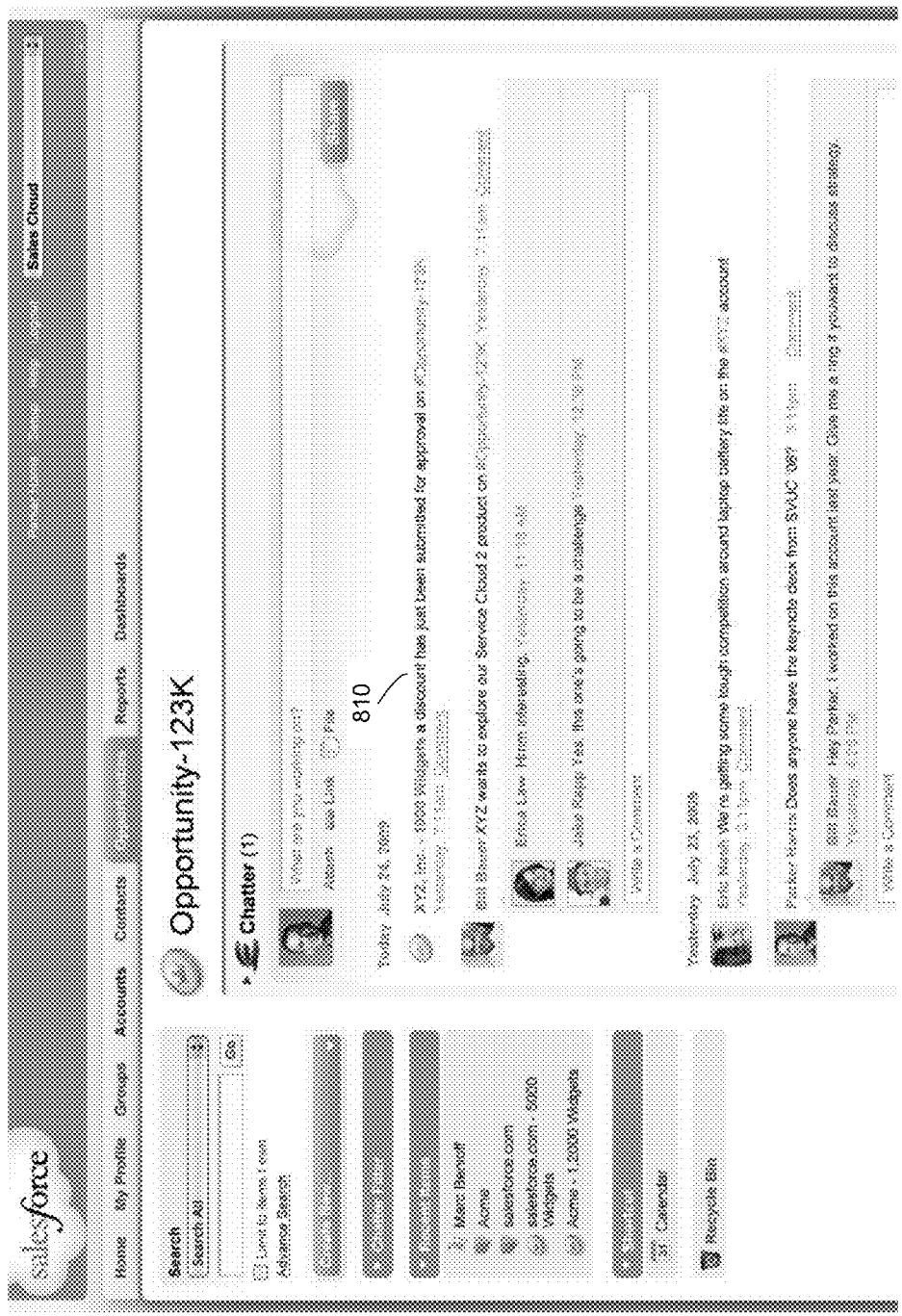
FIG. 8 shows an example of a record feed containing a feed tracked update, post, and comments according to one or more implementations.

FIG. 8 shows an example of a record feed containing a feed tracked update, post, and comments according to implementations. Feed item 810 shows a feed tracked update based on the event of submitting a discount for approval. Other feed items show posts that are made to the record and comments that are made on the posts.

VII. Infrastructure for a Feed

A. Tables Used to Create a Feed

FIG. 9A shows a plurality of tables that may be used in tracking events and creating feeds according to implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event hifeed tracked update table 910 can provide a hifeed tracked update of events from which feed items are created. In one aspect, the events are for objects that are being tracked. Thus, table 910 can store change hifeed tracked updates for feeds, and the changes can be persisted. In various implementations, event hifeed tracked update table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In some other implementations, event hifeed tracked update table 910 can have one or more of the following variables with certain attributes: ORGANIZATION_ID being CHAR(15 BYTE), FEEDS_ENTITY_HIFEED TRACKED UPDATE_ID being CHAR(15 BYTE), PARENT_ID being CHAR(15 BYTE), CREATED_BY being CHAR (15 BYTE), CREATED_DATE being a variable of type DATE, DIVISION being a NUMBER, KEY_PREFIX being CHAR(3 BYTE), and DELETED being CHAR(1 BYTE). The parent ID can provide an ID of a parent object in case the change is promulgated to the parent. The key prefix can provide a key that is unique to a group of records, e.g. custom records (objects). The deleted variable can indicate that the feed items for the event are deleted, and thus the feed items are not generated. In one implementation, the variables for each event entry or any entry in any of the tables may not be nullable. In another implementation, all entries in the event hifeed tracked update table 910 are used to create feed items for only one object, as specified by the object ID 912. For example, one feed tracked update cannot communicate updates on two records, such as updates of an account field and an opportunity field.

In one implementation, a name of an event can also be stored in table 910. In one implementation, a tenant can specify events that they want tracked. In an implementation, event hifeed tracked update table 910 can include the name of the field that changed (e.g. old and new values). In another implementation, the name of the field, and the values, are stored in a separate table. Other information about an event (e.g. text of comment, feed tracked update, post or status update) can be stored in event hifeed tracked update table 910, or in other tables, as is now described.

A field change table 920 can provide a hifeed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

In some other implementations, field change table 920 can have one or more of the following variables with certain attributes: ORGANIZATION_ID being CHAR(15 BYTE), FEEDS_ENTITY_HIFEED TRACKED UPDATE_FIELDS_ID being CHAR(15 BYTE) and identifying each entry, FEEDS_ENTITY_HIFEED TRACKED UPDATE_ID being CHAR(15 BYTE), FIELD_KEY being VARCHAR2(120 BYTE), DATA_TYPE being CHAR(1 BYTE), OLDVAL_STRING VARCHAR2 being (765 BYTE), NEWVAL_STRING being VARCHAR2(765 BYTE), OLDVAL_FIRST_NAME being VARCHAR2(765 BYTE), NEWVAL_FIRST_NAME being VARCHAR2(765 BYTE), OLDVAL_LAST_NAME being VARCHAR2(765 BYTE), NEWVAL_LAST_NAME being VARCHAR2(765 BYTE), OLDVAL_NUMBER being NUMBER, NEWVAL_NUMBER being NUMBER, OLDVAL_DATE being DATE, NEWVAL_DATE being DATE, and DELETED being CHAR(1 BYTE). In one implementation, one or more of the variables for each entry in any of the tables may be nullable.

In one implementation, the data type variable (and/or other variables) is a non-api-insertable field. In another implementation, variable values can be derived from the record whose field is being changed. Certain values can be transferred into typed columns old/new value string, old/new value number or old/new value date depending upon the derived values. In another implementation, there can exist a data type for capturing add/deletes for child objects. The child ID can be tracked in the foreign-key column of the record. In yet another implementation, if the field name is pointing to a field in the parent entity, a field level security (FLS) can be used when a user attempts to a view a relevant feed item. Herein, security levels for objects and fields are also called access checks and determinations of authorization. In one aspect, the access can be for create, read, write, update, or delete of objects.

In one implementation, the field name (or key) can be either a field name of the entity or one of the values in a separate list. For example, changes that do not involve the update of an existing field (e.g. a close or open) can have a field name specified in an enumerated list. This enumerated list can store "special" field name sentinel values for non-update actions that a tenant wants to track. In one aspect, the API just surfaces these values and the caller has to check the enumerated values to see if it is a special field name.

A comment table 930 can provide a hifeed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

In some other implementations, comment table 930 can have one or more of the following variables with certain attributes: ORGANIZATION_ID being CHAR(15 BYTE), FEEDS_COMMENTS_ID being CHAR(15 BYTE) and uniquely identifying each comment, PARENT_ID being CHAR(15 BYTE), CREATED_BY being CHAR(15 BYTE), CREATED_DATE being DATE, COMMENTS being VARCHAR2(420 BYTE), and DELETED being CHAR(1 BYTE).

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In some other implementations, comment table 940 can be composed of two tables (one for records being followed and one for users being followed). One table can have one or more of the following variables with certain attributes: ORGANIZATION_ID being CHAR(15 BYTE), ENTITY_SUBSCRIPTION_ID being CHAR(15 BYTE), PARENT_ID being CHAR(15 BYTE), CREATED_BY being CHAR(15 BYTE), CREATED_DATE being DATE, and DELETED being CHAR(1 BYTE). Another table can have one or more of the following variables with certain attributes: ORGANIZATION_ID being CHAR(15 BYTE), USER_SUBSCRIPTIONS_ID being CHAR(15 BYTE), USER_ID being CHAR(15 BYTE), CREATED_BY being CHAR(15 BYTE), and CREATED_DATE being DATE.

In one implementation, regarding a profile feed and a news feed, these are read-only views on the event hifeed tracked update table 910 specialized for these feed types. Conceptually the news feed can be a semi-join between the entity subscriptions table 940 and the event hifeed tracked update table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g. AccountFeed, CaseFeed etc). A feed associate entity includes information composed of events (e.g. event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event hifeed tracked update table 910. Since the account feed table only contains some of the records (not all), the query can run faster.

In one implementation, there may be objects with no events listed in the event hifeed tracked update table 910, even though the record is being tracked. In this case, the database service can return a result indicating that no feed items exist.

In another implementation, tables can also exist for audit tracking, e.g., to examine that operations of the system (e.g. access checks) are performing accurately. In one implementation, audit change-hifeed tracked update tables can be persisted (e.g. in bulk) synchronously in the same transaction as feed events are added to event hifeed tracked update table 910. In another implementation, entries to the two sets of table can be persisted in asynchronous manner (e.g. by forking a bulk update into a separate java thread). In one aspect, some updates to any of the tables can get lost if the instance of the table goes down while the update has not yet finished. This asynchronous manner can limit an impact performance on save operations. In some implementations, a field "persistence type" (tri state: AUDIT, FEEDS or BOTH) can be added to capture user preferences, as opposed to being hardcoded.

B. Feed Item

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In one implementation, a feed item is visible only when its parent feed is visible, which can be the same as needing read access on the feed's parent (which can be by the type of record or by a specific record). The feed item's field may be only visible when allowed under field-level security (FLS). Unfortunately, this can mean that the parent feed may be visible, but the child may not be because of FLS. Such access rules are described in more detail below. In one implementation, a feed item can be read-only. In this implementation, after being created, the feed item cannot be changed.

In multi-currency organizations, a feed item can have an extra currency code field. This field can give the currency code for the currency value in this field. In one aspect, the value is undefined when the data type is anything other than currency.

C. Feed Comment

In some implementations, a comment exists as an item that depends from feed tracked updates, posts, status updates, and other items that are independent of each other. Thus, a feed comment object can exist as a child object of a feed item object. For example, comment table 930 can be considered a child table of event hifeed tracked update table 910. In one implementation, a feed comment can be a child of a profile feed, news feed, or entity feed that is separate from other feed items.

In various implementations, a feed comment can have various permissions for the following actions. For read permission, a feed comment can be visible if the parent feed is visible. For create permission, if a user has access to the feed (which can be tracked by the ID of the parent feed), the user can add a comment. For delete, only a user with modify all data permission or a user who added the comment can delete the comment. Also delete permission can require access on the parent feed. An update of a comment can be restricted, and thus not be allowed. In one implementation, regarding a query restriction, a feed comment cannot be queried directly, but can be queried only via the parent feed. An example is "select id, parentid, (select ... from feedcomment) from entityfeed". In another implementation, a feed comment can be directly queries, e.g., by querying comment table 930. A query could include the text of a comment or any other column of the table.

In another implementation, regarding soft delete behavior, a feed comment table does not have a soft delete column. A soft delete allows an undelete action. In one implementation, a record can have a soft delete. Thus, when the record is deleted, the feed (and its children) can be soft deleted. Therefore, in one aspect, a feed comment cannot be retrieved via the "query" verb (which would retrieve only the comment), but can be retrieved via "queryAll" verb though. An example is queryAll("select id, (select id, commentbody from feedcomments) from accountfeed where parentid='001x000xxx3MkADAA0'"); // where '001x000xxx3MkADAA0' has been soft deleted. When a hard delete (a physical delete) happens, the comment can be hard deleted from the database.

In one implementation, regarding an implicit delete, feeds with comments are not deleted by a reaper (a routine that performs deletion). In another implementation, a user cannot delete a feed. In yet another implementation, upon lead convert (e.g. to an opportunity or contact), the feed items of the lead can be hard deleted. This implementation can be configured to perform such a deletion for any change in record type. In various implementations, only the comments are hard deleted upon a lead convert, other convert, or when the object is deleted (as mentioned above).

In one implementation, viewing a feed pulls up the most recent messages or feed tracked updates (e.g. 25) and searches the most recent (e.g. 4) comments for each feed item. The comments can be identified via the comment table 930. In one implementation, a user can request to see more comments, e.g., by selecting a see more link.

In some implementations, user feeds and/or entity feeds have a last comment date field. In various implementations, the last comment date field is stored as a field of a record or a user profile. For feeds with no comments, this can be the same as the created date. Whenever a new comment is created, the associated feed's last comment date can be updated with the created date of the comment. The last comment date is unchanged if a feed comment is deleted. A use case is to allow people to order their queries to see the feeds which have been most recently commented on.

D. Creating Custom Feeds by Customizing the Event Hifeed Tracked Update Table In some implementations, a tenant (e.g. through an administrator) or a specific user of a tenant can specify the types of events for which feed items are created. A user can add more events or remove events from a list of events that get added to the event hifeed tracked update table 910. In one implementation, a trigger can be added as a piece of code, rule, or item on a list for adding a custom event to the event hifeed tracked update table 910. These custom events can provide customers the ability to create their own custom feeds and custom feed items to augment or replace implicitly generated feeds via event hifeed tracked update table 910. Implicitly generated feed data can be created when feed-tracking is enabled for certain entities/field-names. In one implementation, in order to override implicit feeds, feed tracking can be turned off and then triggers can be defined by the user to add events to the event hifeed tracked update table 910. In other implementations, users are not allowed to override the default list of events that are added to table 910, and thus cannot define their own triggers for having events tracked.

For example, upon lead convert or case close, a default action to be taken by the system may be to add multiple events to event hifeed tracked update table 910. If a customer (e.g. a tenant or a specific user) does not want each of these events to show up as feed items, the customer can turn off tracking for the entities and generate custom feeds by defining customized triggers (e.g. by using an API) upon the events. As another example, although data is not changed, a customer may still want to track an action on a record (e.g. status changes if not already being tracked, views by certain people, retrieval of data, etc.).

In one implementation, if a user does not want a feed item to be generated upon every change on a given field, but only if the change exceeds a certain threshold or range, then such custom feeds can be conditionally generated with the customized triggers. In one implementation, the default tracking for the record or user may be turned off for this customization so that the events are only conditionally tracked. In another implementation, a trigger can be defined that deletes events that are not desired, so that default tracking can still be turned on for a particular object type. Such conditional tracking can be used for other events as well.

In some implementations, defining triggers to track certain events can be done as follows. A user can define an object type to track. This object type can be added to a list of objects that can be tracked for a particular tenant. The tenant can remove object types from this list as well. Custom objects and standard objects can be on the list, which may, for example, be stored in cache or RAM of a server or in the database. Generally only one such list exists for a tenant, and users do not have individual lists for themselves, although in some implementations, they may particularly when the number of users in a tenant is small.

In one implementation, a tenant can select which records of an object type are to be tracked. In another implementation, once an object type is added to the tracking list of object types, then all records of that type are tracked. The tenant can then specify the particulars of how the tracking is to be performed.

For example, the tenant can specify triggers as described above, fields to be tracked, or any of the customizations mentioned herein.

In some implementations, when a feed is defined as an object in the database (e.g. as a child object of entity records that can be tracked), a particular instance of the feed object (e.g. for a particular record) can be create-able and delete-able. In one implementation, if a user has access to a record then the user can customize the feed for the record. In one implementation, a record may be locked to prevent customization of its feed.

One method of creating a custom feed for users of a database system according to implementations is now described. Any of the following steps can be performed wholly or partially with the database system, and in particular by one or more processor of the database system.

In step A, one or more criteria specifying which events are to be tracked for possible inclusion into a feed to be displayed are received from a tenant. In step B, data indicative of an event is received. In step C, the event is analyzed to determine if the criteria are satisfied. In step D, if the criteria are satisfied, at least a portion of the data is added to a table (e.g. one or more of the tables in FIG. 9A) that tracks events for inclusion into at least one feed for a user of the tenant. The feed in which feed items of an event may ultimately be displayed can be a news feed, record feed, or a profile feed.

E. Creating Custom Feeds with Filtering

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g. number of feed items in the feed) to determine which feed items to display. For instance, if a small number of feed items exist (e.g. below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, the filters can be run by defining code triggers, which run when an event, specific or otherwise, occurs. The trigger could then run to perform the filtering at the time the event occurs or when a user (who has certain defined triggers, that is configured for a particular user) requests a display of the feed. A trigger could search for certain terms (e.g. vulgar language) and then remove such terms or not create the feed item. A trigger can also be used to send the feed item to a particular person (e.g. an administrator) who does not normally receive the feed item were it not for the feed item containing the flagged terms.

F. Access Checks

In one implementation, a user can access a feed of a record if the user can access the record. The security rules for determining whether a user has access to a record can be performed in a variety of ways, some of which are described in U.S. patent application Ser. No. 11/866,184 by Weissman et al., filed Oct. 2, 2007, titled "METHODS AND SYSTEMS FOR CONTROLLING ACCESS TO CUSTOM OBJECTS IN A DATABASE", which is hereby incorporated by reference in its entirety and for all purposes. For example, a security level table can specify whether a user can see a particular type of record and/or particular records. In one implementation, a hierarchy of positions within a tenant is used. For example, a manager can inherit the access levels of employees that the manager supervises. Field level security (FLS) can also be used to determine whether a particular feed tracked update about an update to a field can be seen by the user. The field change table 920 can be used to identify a field name or field ID, and then whether the user has read access to that field can be determined from an FLS table. For example, if a user could not see a field of a social security number, the feed of the user provided to the user would not include any feed items related to the social security number field.

In one implementation, a user can edit a feed of a record if the user has access to the record, e.g., deleting or editing a feed item. In another implementation, a user (besides an administrator) cannot edit a feed item, except for performing an action from which a feed item can be created. In one implementation, a user is required to have access to a particular record and field for a feed item to be created based on an action of the user. In this case, an administrator can be considered to be a user with MODIFY-ALL-DATA security level. In yet another implementation, a user who created the record can edit the feed.

G. Posts

In one implementation, the text of posts are stored in a child table (post table 950), which can be cross-referenced with event hifeed tracked update table 910. Post table 950 can include event ID 951 (to cross-reference with event ID 911), post text 952 to store the text of the post, and time/date 953. An entry in post table 950 can be considered a feed post object. Posts for a record can also be subject to access checks. In one implementation, if a user can view a record then all of the posts can be seen, i.e. there is not an additional level of security check as there is for FLS. In another implementation, an additional security check could be done, e.g., by checking on whether certain keywords (or phrases) exist in the post. For instance, a post may not be not provided to specified users if a certain keyword exists, or only provided to specified users if a keyword exists. In another implementation, a table can exist for status updates.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g. an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g. application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

In one implementation, an automatic subscription feature can ensure that a user is receiving certain feeds. In this manner, a user does not have to actively select certain objects to follow. Also, a tenant can ensure that a user is following objects that the user needs to be following.

In various implementations for automatically following users, a default for small organizations can be to follow everyone. For big organizations, the default can be to follow a manager and peers. If a user is a manager, the default can be to follow the manager's supervisor, peers, and people that the manager supervises (subordinates). In other implementations for automatically following records, records that the user owns may be automatically followed and/or records recently viewed (or changed) may be automatically followed.

In one example, a new record is created. The owner (not necessarily the user who created the entity) is subscribed to the entity. If ownership is changed, the new owner may automatically be subscribed to follow the entity. Also, after a lead convert, the user doing the lead convert may be automatically subscribed to the new account, opportunity, or contact resulting from the lead convert. In one implementation, the auto subscription is controlled by user preference. That is a user or tenant can have the auto subscribe feature enabled or not. In one aspect, the default is to have the auto-subscribe turned on.

Figure 9B:
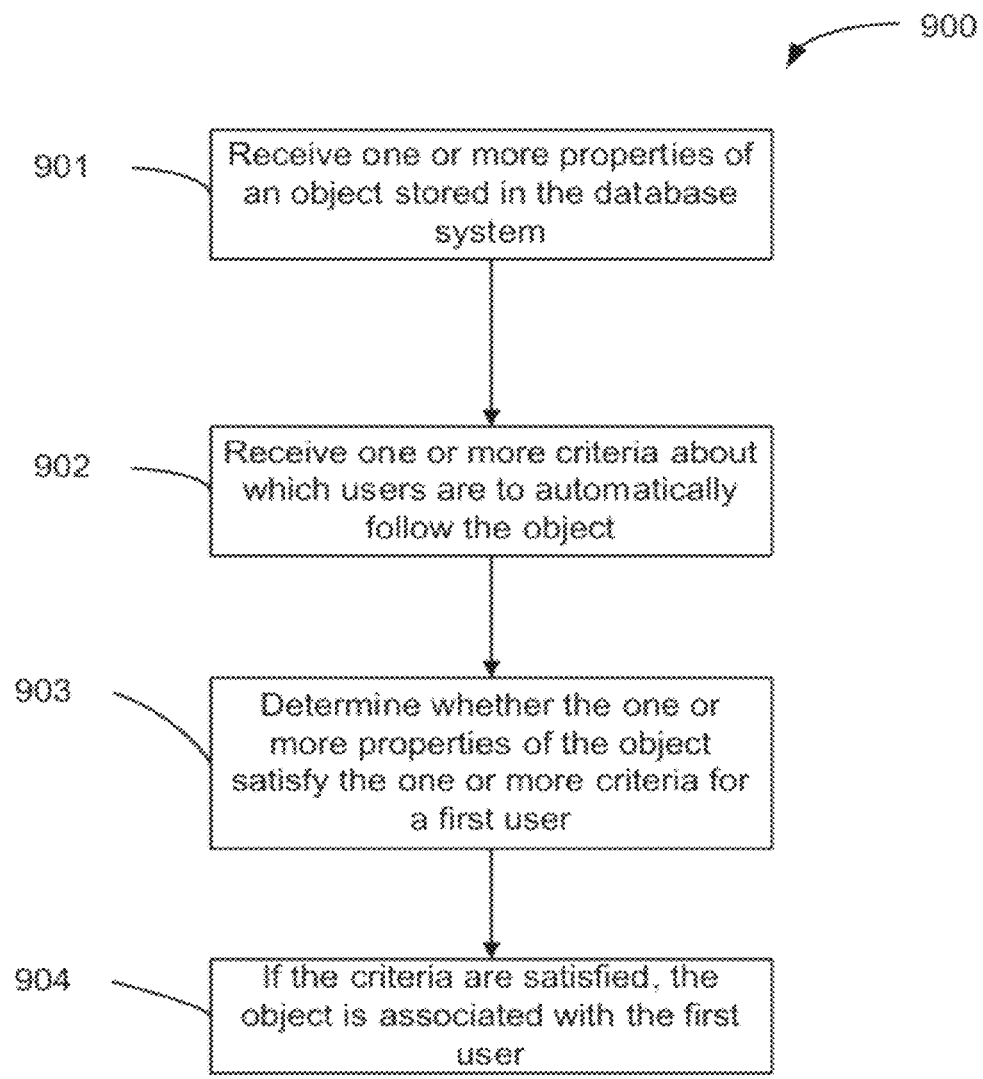
FIG. 9B is a flowchart illustrating a method 900 for automatically subscribing a user to an object in a database system according to implementations.

FIG. 9B shows a flowchart illustrating a method 900 for automatically subscribing a user to an object in a database system according to implementations. Any of the following steps can be performed wholly or partially with the database system, and in particular by one or more processor of the database system.

In step 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had e-mailed or worked with on projects.

In step 902, the database system receives one or more criteria about which users are to automatically follow the object. The criteria can be received from administrators of the database system, or from one or more users of the database system. The users may be an administrator of a customer organization, which can set tenant-wide criteria or criteria for specific users (who may also set the criteria themselves). Examples of the criteria can include: an owner or creator of a record is to follow the record, subordinates of an owner or creator of a record are to follow the record, a user is to follow records recently viewed (potentially after a specific number of views), records that a user has changed values (potentially with a date requirement), records created by others in a same business group as the user. Examples of the criteria can also include: a user is to follow his/her manager, the user's peers, other users in the same business group as the user, and other users that the user has e-mailed or worked with on a project. The criteria can be specific to a user or group of users (e.g. users of a tenant).

In step 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times. If different users have different criteria, then the criteria for a particular user or group could be searched at the same time. Since users of different tenants normally cannot view objects of another tenant, certain criteria does not have to be checked. In another implementation, this determination can occur by looking at certain properties and then identifying any criteria that are met. In yet another implementation, the criteria and properties can be used to find users that satisfy the criteria.

In step 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g. if a certain action happens. The action could be a change in the user's position within the organization, e.g. a demotion or becoming a contractor. As another example, if a case gets closed, then users following the case may be automatically unsubscribed.

B. Feed and Subscription API

In one implementation, a feed and subscription center API can enable tenants to provide mechanisms for tracking and creating feed items, e.g., as described above for creating custom feeds by allowing users to add custom events for tracking. For example, after some initial feed items are created (e.g. by administrators of the database system), outside groups (e.g. tenants or software providers selling software to the tenants) can 'enable objects' for feeds through a standard API. The groups can then integrate into the subscription center and the feed tracked update feeds on their own. In one implementation, the feed and subscription center API can use a graphical user interface implemented for the default feed tracking. In one implementation, API examples include subscribing to an entity by creating a new entity subscription object for a particular user ID, or for all users of a tenant (e.g. user subscription table 940). In one implementation, obtaining all subscriptions for a given user can be performed by using a query, such as "select . . . from EntitySubscription where userid=' . . . '".

Some implementations have restriction on non-admin users, e.g. those without view all data permissions (VAD). One restriction can be a limit clause on entity subscription queries (e.g. queries on user subscription table 940), e.g., where the limit of the number of operations is less than 100. In one implementation, users are not required to specify an order-by, but if an order-by is specified they can only order on fields on the entity subscription entity. In one implementation, filters on entity subscription can likewise only specify fields on the entity subscription entity. In one aspect, the object ID being followed can be sorted or filtered, but not the object name.

In one implementation, one or more restrictions can also be placed on the identification of feed items in a feed that a user can access. For example, if a low-level user (i.e. user can access few objects) is attempting to see a profile feed of a high level user, a maximum number of checks (e.g. 500) for access rights may be allowed. Such a restriction can minimize a cost of a feed request. In some implementations, there are restriction on the type of queries (e.g. fields for filtering) allowed to construct on feeds (e.g. on tables in FIG. 9A).

C. Sharing

As mentioned above, users may be restricted from seeing records from other tenants, as well as certain records from the tenant to which the user belongs (e.g. the user's employer). Sharing rules can refer to the access rules that restrict a user from seeing records that the user is not authorized to see or access. Additionally, in one implementation, a user may be restricted to only seeing certain fields of a record, field-level security (FLS).

In an implementation, access rule checks are done upon subscription. For example, a user is not allowed to subscribe to a record or type of record that the user cannot access. In one aspect, this can minimize (but not necessarily eliminate) cases where a user subscribes to entities they cannot access. Such cases can slow down news feed queries, when an access check is performed (which can end up removing much of the feed items). Thus, a minimization of access checks can speed up operation. In another implementation, when feed items are created dynamically, access rule checks may be done dynamically at the time of subsequent access, and not upon subscription or in addition to at time of subscription.

An example case where access checks are still performed is when a first user follows a second user, but the second user performs some actions on records or is following records that the first user is not allowed to see. The first user may be allowed to follow the second user, and thus the subscription is valid even though the first user may not be able to see all of the feed items. Before a feed tracked update is provided to a news feed of the first user, a security check may be performed to validate whether the first user has access rights to the feed item. If not, the feed item is not displayed to the first user. In one implementation, users can be blocked from feed items that contain certain terms, symbols, account numbers, etc. In one implementation, any user can follow another user. In another implementation, users may be restricted as to which users, objects, and/or records he/she can follow.

Regarding viewing privileges of a feed, in one implementation, a user can always see all of his own subscriptions (even if he's lost read access to a record). For example, a user can become a contractor, and then the user may lose access to some records. But, the user may still see that he/she is following the object. This can help if there is a limit to the number of objects that can be followed. To unsubscribe a user may need to know what they are following so they can unsubscribe and subscribe to objects the user can see. In another implementation, for access to other people's subscriptions, a user can be required to need read-access on the record-id to see the subscription. In some implementations, users with authorization to modify all data can create/delete any subscription. In other implementations, a user can create/delete subscriptions only for that user, and not anyone else.

D. Configuration of which Field to Follow

There can be various feed settings for which feed items get added to profile and record feeds, and which get added to news feeds. In one implementation, for profile feeds and entity feeds, feed tracked updates can be written for all standard and custom fields on the supported objects. In one implementation, feed settings can be set to limit how many and which fields of a record are tracked for determining whether a feed tracked update is to be generated. For example, a user or administrator can choose specific fields to track and/or certain ones not to track. In another implementation, there is a separate limit for the number of trackable fields (e.g. 20) for a record. Thus, only certain changes may be tracked in an entity hifeed tracked update and show up in the feed. In yet another implementation, default fields may be chosen for tracking, where the defaults can be exposed in the subscriptions center.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also subscribe (follow) to user or record and receive the feed items of those feeds through a separate feed application (e.g. in a page or window), which is termed "chatter" in certain examples. The feed application can provide each of the feeds that a user is following in a single news feed.

A feed generator can refer to any software program running on a processor or a dedicated processor (or combination thereof) that can generate feed items (e.g. feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g. adding a document, sender of message, a determined importance, etc.). The feed generator can also check to make sure that no one sees feed tracked updates for data that they don't have access to see (e.g. according to sharing rules). A feed generator can run at various times to pre-compute feeds or to compute them dynamically, or combinations thereof.

In one implementation, the feed generator can de-dupe events (i.e. prevent duplicates) that may come in from numerous records (and users). For example, since a feed tracked update can be published to multiple feeds (e.g. John Choe changed the Starbucks Account Status) and a person can be subscribed to both the Starbucks account and John Choe, implementations can filter out duplicates before adding or displaying the items in a news feed. Thus, the Feed Generator can collapse events with multiple records and users for a single transaction into a single feed tracked update and ensure the right number of feed tracked updates for the particular feed. In some implementations, an action by a user does not create a feed item for that user (e.g. for a profile feed of that user), and it is only the feed of the object being acted upon (e.g. updated) for which a feed item is created. Thus, there should not be duplicates. For example, if someone updates the status of a record, the feed item is only for the record and not the user.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g. "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g. people on a same team, that work for the user, are a boss of the user, etc.). A news feed can tell a user about all the actions across all the records (and people) who have explicitly (or implicitly) subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity hifeed tracked update persistence. Different feeds may have different delays (e.g. delay for new feeds, but none of profile and entity feeds). In another implementation, certain feed tracked updates regarding a subscribed profile feed or an entity feed are not shown because the user is not allowed access, e.g. due to sharing rules (which restrict which users can see which data). Also, in one implementation, data of the record that has been updated (which includes creation) can be provided in the feed (e.g. a file or updated value of a feed can be added as a flash rendition).

Examples are provided below as how it can be determined which feed items to add to which news feeds. In one implementation, the addition of items to a news feed is driven by the following user. For example, the user's profile can be checked to determine objects the user is following, and the database may be queried to determine updates to these objects. In another implementation, the users and records being followed drive the addition of items to a news feed. Implementations can also combine these and other aspects. In one implementation, a database system can be follower-driven if the number of subscriptions (users and records the user is following) is small. For example, since the number subscriptions are small, then changes to a small number of objects need to be checked for the follower.

Regarding implementations that are follower-driven, one implementation can have a routine run for a particular user. The routine knows the users and records that the user is following. The routine can poll the database system for new feed tracked updates and messages about the users and records that are being followed. In one implementation, the polling can be implemented as queries. In one implementation, the routine can run at least partially (even wholly) on a user device.

Regarding implementations where a news feed is driven by the record (or user) being followed, processor 417 can identify followers of the record after a feed item is added to the record feed. Processor 417 can retrieve a list of the followers from the database system. The list can be associated with the record, and can be stored as a related list or other object that is a field or child of the record.

In one implementation, profile and record feeds can be updated immediately with a new feed item after an action is taken or an event occurs. A news feed can also be updated immediately. In another implementation, a news feed can be updated in batch jobs, which can run at periodic times.

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g. top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event hifeed tracked update table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity hifeed tracked update table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Hifeed Tracked Update Tables

Figure 10:
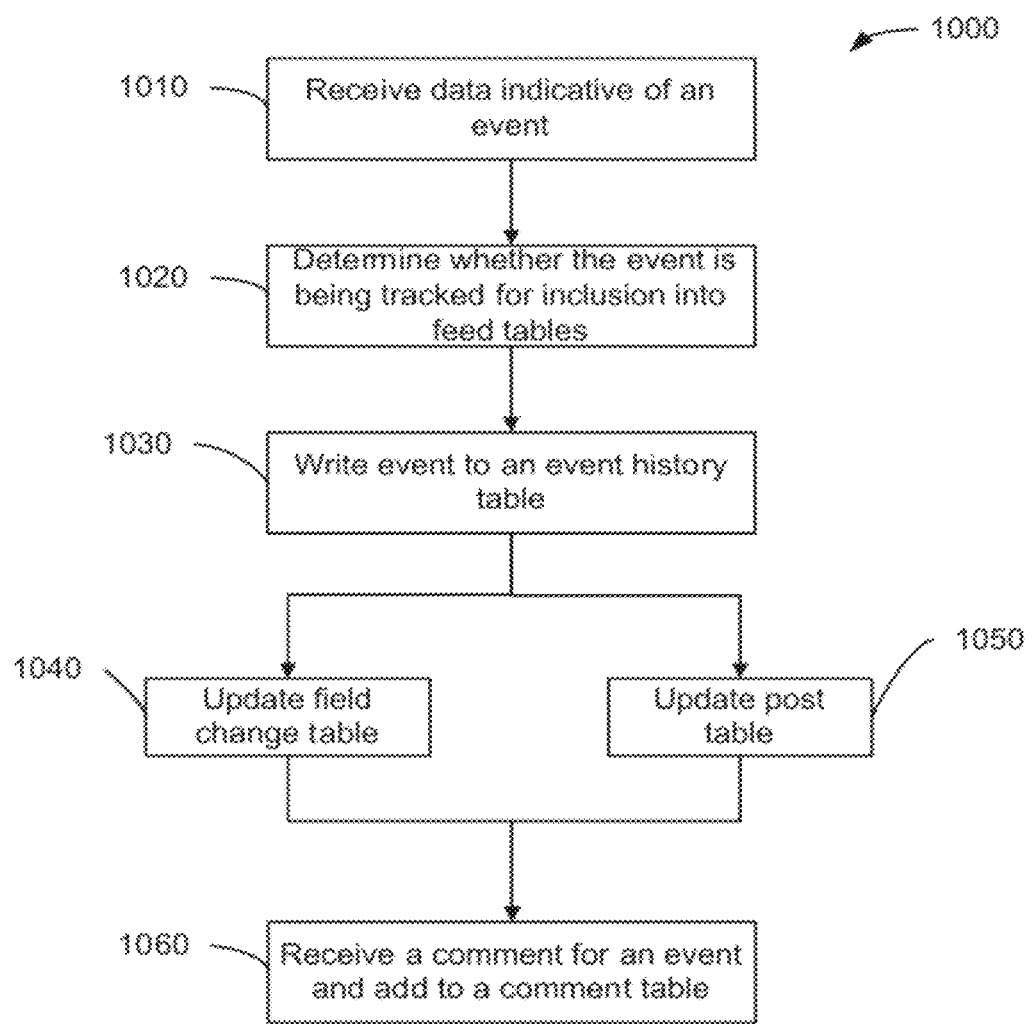
FIG. 10 is a flowchart of a method 1000 for saving information to feed tracking tables according to one or more implementations.

FIG. 10 is a flowchart of a method 1000 for saving information to feed tracking tables according to implementations. In one implementation, some of the steps may be performed regardless of whether a specific event or part of an event (e.g. only one field of an update is being tracked) is being tracked. In various implementations, a processor or set of processors (hardwired or programmed) can perform method 1000 and any other method described herein.

In step 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In step 1020, it is determined whether the event is being tracked for inclusion into feed tables. The determination of what is being tracked can be based on a tenant's configuration as described above. In one aspect, the event has an actor (person performing an event), and an object of the event (e.g. record or user profile being changed).

In step 1030, the event is written to an event hifeed tracked update table (e.g. table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the hifeed tracked update table. In one implementation, the event hifeed tracked update table is chronological. In another implementation, if user A posts on user B's profile, then user A is under the "created by" 913 and user B is under the object ID 912.

In step 1040, a field change table (e.g. field change table 920) can be updated with an entry having the event identifier and fields that were changed in the update. In one implementation, the field change table is a child table of the event hifeed tracked update table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In step 1050, when the event is a post, a post table (e.g. post table 950) can be updated with an entry having the event identifier and text of the post. In one implementation, the field change table is a child table of the event hifeed tracked update table. In another implementation, the text can be identified in the transaction (e.g. a query command), stripped out, and put into the entry at the appropriate column. The various tables described herein can be combined or separated in various ways. For example, the post table and the field change table may be part of the same table or distinct tables, or may include overlapping portions of data.

In step 1060, a comment is received for an event and the comment is added to a comment table (e.g. comment table 930). The comment could be for a post or an update of a record, from which a feed tracked update can be generated for display. In one implementation, the text can be identified in the transaction (e.g. a query command), stripped out, and put into the entry at the appropriate column.

D. Reading Information from Feed Hifeed Tracked Update Tables

Figure 11:
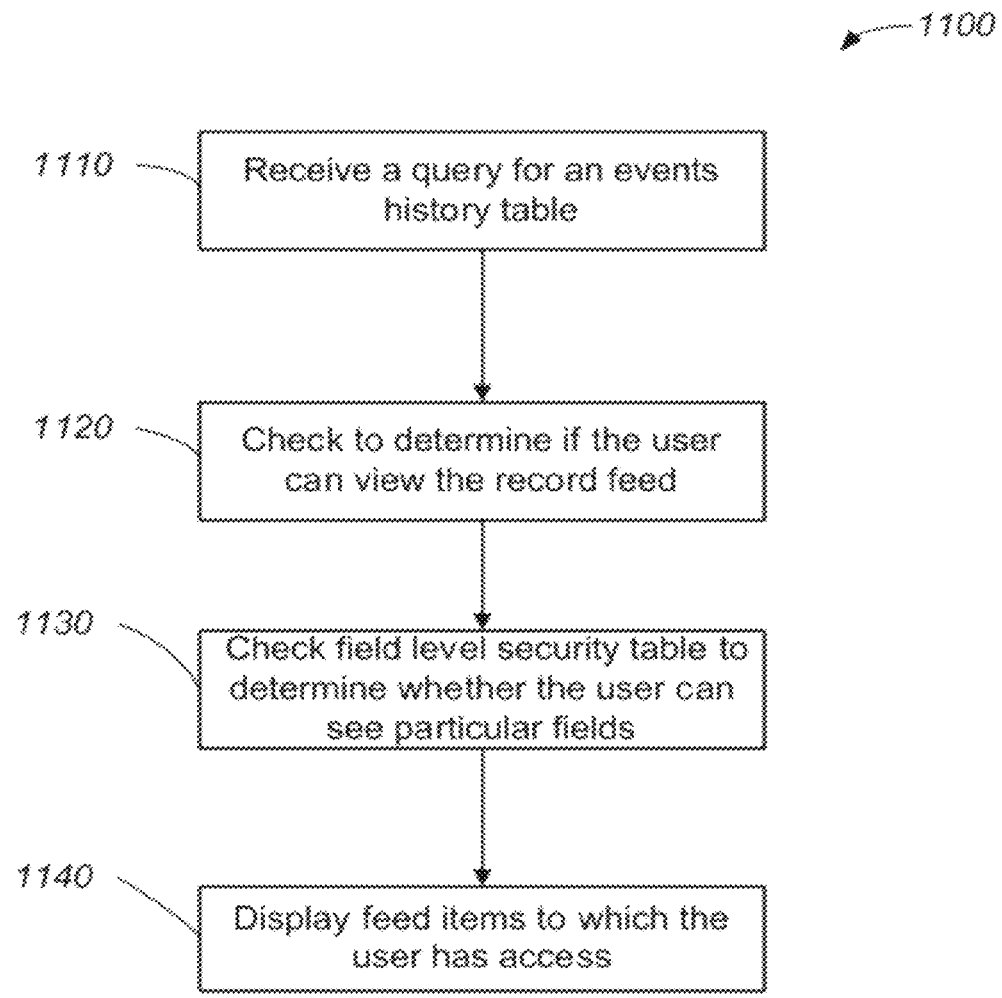
FIG. 11 is a flowchart of a method 1100 for reading a feed item as part of generating a feed for display according to one or more implementations.

FIG. 11 is a flowchart of a method 1100 for reading a feed item as part of generating a feed for display according to implementations. In one implementation, the feed item may be read as part of creating a feed for a record.

In step 1110, a query is received for an event hifeed tracked update table (e.g. event hifeed tracked update table 910) for events related to a particular record. In one implementation, the query includes an identifier of the record for which the feed is being requested. In various implementations, the query may be initiated from a detail page of the record, a home page of a user requesting the record feed, or from a listing of different records (e.g. obtained from a search or from browsing).

In step 1120, the user's security level can be checked to determine if the user can view the record feed. Typically, a user can view a record feed, if the user can access the record. This security check can be performed in various ways. In one implementation, a first table is checked to see if the user has a classification (e.g. a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In step 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g. as determined from field change table 920) can be removed from the feed being displayed.

In step 1140, the feed items that the user has access to are displayed. In one implementation, a predetermined number (e.g. 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
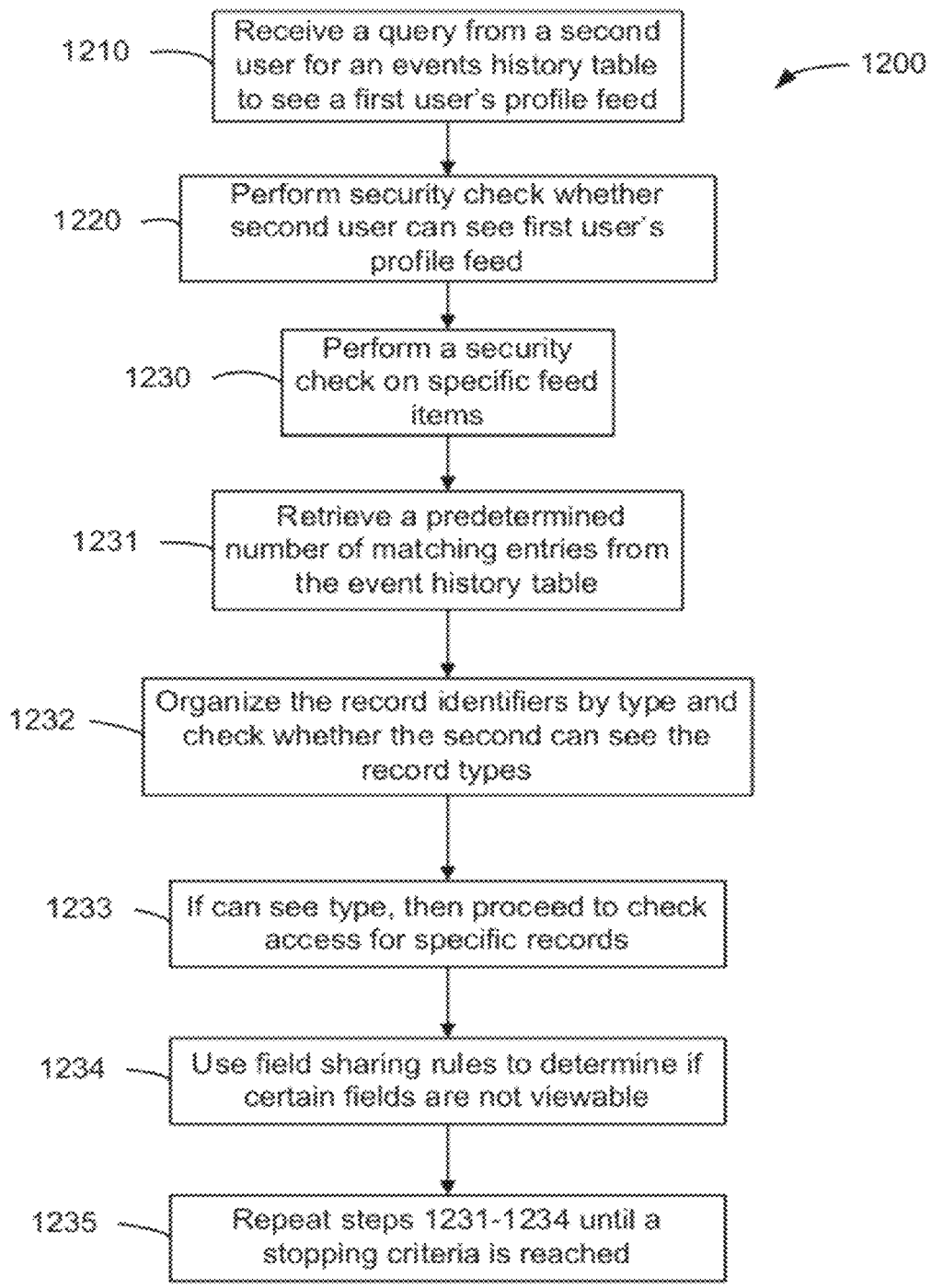
FIG. 12 is a flowchart of a method 1200 for reading a feed item of a profile feed for display according to one or more implementations.

FIG. 12 is a flowchart of a method 1200 for reading a feed item of a profile feed for display according to implementations. In one implementation, the query includes an identifier of the user profile feed that is being requested. Certain steps may be optional, as is also true for other methods described herein. For example, security checks may not be performed.

In step 1210, a query is directed to an event hifeed tracked update table (e.g. event hifeed tracked update table 910) for events having a first user as the actor of the event (e.g. creation of an account) or on which the event occurred (e.g. a post to the user's profile). In various implementations, the query may be initiated by a second user from the user's profile page, a home page of a user requesting the profile feed (e.g. from a list of users being followed), or from a listing of different users (e.g. obtained from a search or from browsing). Various mechanisms for determining aspects of events and obtaining information from tables can be the same across any of the methods described herein.

In step 1220, a security check may also be performed on whether the second user can see the first user's profile. In one implementation any user can see the profile of another user of the same tenant, and step 1220 is optional.

In step 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following steps illustrate one implementation of how security might be checked for a first user that has a lot of feed items, but the second user cannot see most of them. This implementation can be used for all situations, but can be effective in the above situation.

In step 1231, a predetermined number of entries are retrieved from the event hifeed tracked update table (e.g. starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g. because the second user can see the profile of the first user as determined in step 1220.

In step 1232, the record identifiers are organized by type and the type is checked on whether the second user can see the record types. Other checks such as whether a record was manually shared (e.g. by the owner) can also be performed. In one implementation, the queries for the different types can be done in parallel.

In step 1233, if a user can see the record type, then a check can be performed on the specific record. In one implementation, if a user can see a record type, then the user can see all of the records of that type, and so this step can be skipped. In another implementation, the sharing model can account for whether a user below the second user (e.g. the second user is a manager) can see the record. In such an implementation, the second user may see such a record. In one implementation, if a user cannot see a specific record, then comments on that record are also not viewable.

In step 1234, field level sharing rules can be used to determine whether the second user can see information about an update or value of certain fields. In one implementation, messages can be analyzed to determine if reference to a particular field name is made. If so, then field level security can be applied to the messages.

In step 1280, steps 1231-1234 are repeated until a stopping criterion is met. In one implementation, the stopping criteria may be when a maximum number (e.g. 100) of entries that are viewable have been identified. In another implementation, the stopping criteria can be that a maximum number (e.g. 500) of entries from the entity hifeed tracked update table have been analyzed, regardless of whether the entries are viewable or not.

In one implementation, a news feed can be generated as a combination of the profile feeds and the entity feeds, e.g. as described above. In one implementation, a list of records and user profiles for the queries in steps 1110 and 1210 can be obtained form user subscription table 940. In one implementation, there is a maximum number of objects that can be followed.

In various implementations, the entity hifeed tracked update table can be queried for any one or more of the following matching variables as part of determining items for a feed: CreatedDate, CreatedById, CreatedBy.FirstName, CreatedBy.LastName, ParentId, and Parent.Name. The child tables can also be queried for any one or more of the following matching variables as part of determining items for a feed: DataType, FieldName, OldValue, and NewValue. A query can also specify how the resulting feed items can be sorted for display, e.g., by event number, date, importance, etc. The query can also include a number of items to be returned, which can be enforced at the server.

The two examples provided above can be done periodically to create the feeds ahead of time or done dynamically at the time the display of a feed is requested. Such a dynamic calculation can be computationally intensive for a news feed, particularly if many users and records are being followed, although there can be a low demand for storage. Accordingly, one implementation performs some calculations ahead of time and stores the results in order to create a news feed.

E. Partial Pre-Computing of Items for a Feed

Figure 13:
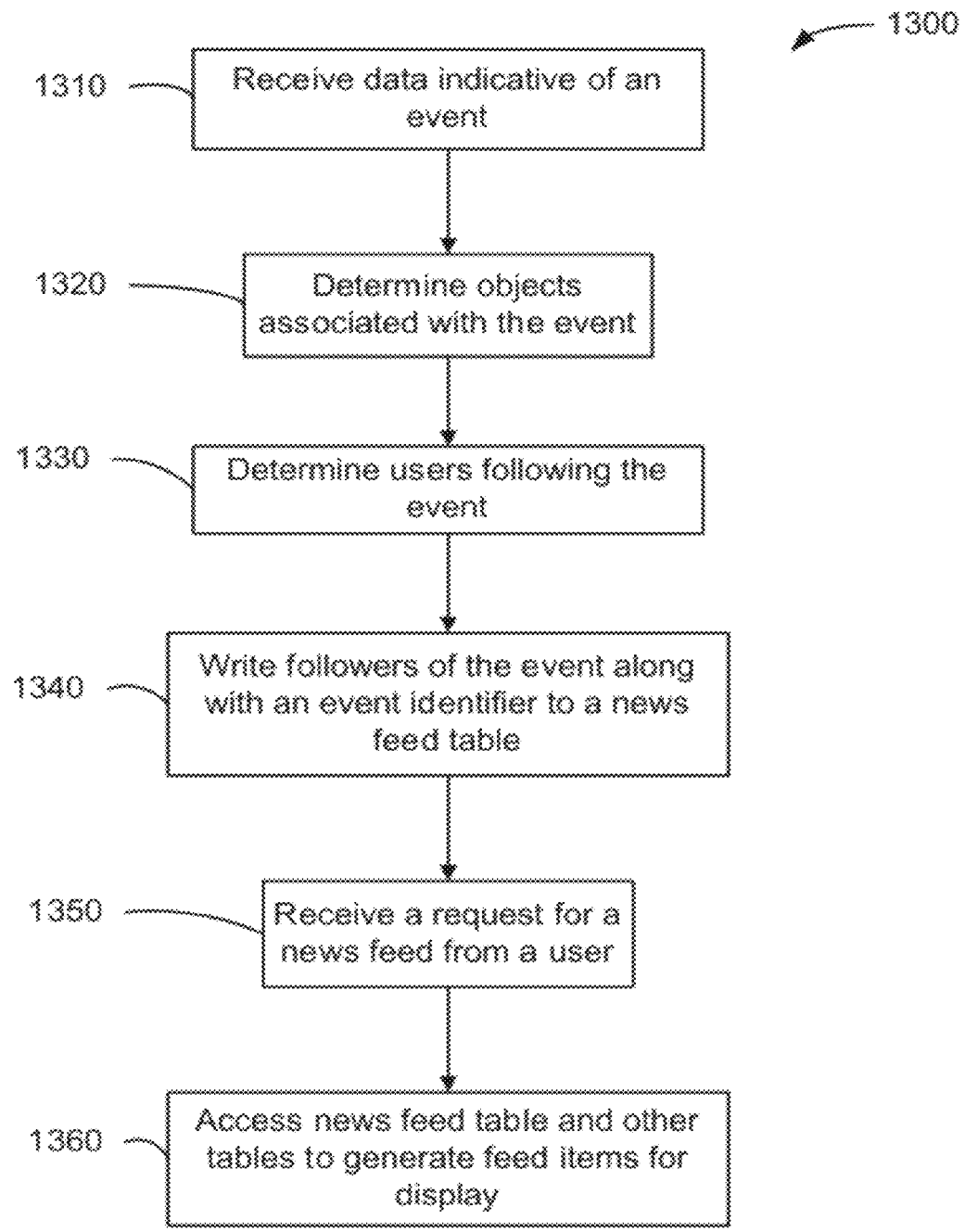
FIG. 13 is a flowchart of a method 1300 of storing event information for efficient generation of feed items to display in a feed according to one or more implementations.

FIG. 13 is a flowchart of a method 1300 of storing event information for efficient generation of feed items to display in a feed according to implementations. In various implementations, method 1300 can be performed each time an event is written to the events hifeed tracked update table, or periodically based on some other criteria (e.g. every minute, after five updates have been made, etc.).

In step 1310, data indicative of an event is received. The data may be the same and identified in the same way as described for step 1010. The event may be written to an event hifeed tracked update table (e.g. table 910).

In step 1320, the object(s) associated with the event are identified. In various implementations, the object may be identified by according to various criteria, such as the record being changed, the user changing the record, a user posting a message, and a user whose profile the message is being posted to.

In step 1330, the users following the event are determined. In one implementation, one or more objects that are associated with the event are used to determine the users following the event. In one implementation, a subscription table (e.g. table 940) can be used to find the identified objects. The entries of the identified objects can contain an identifier (e.g. user ID 941) of each the users following the object In step 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g. columns from the other tables) can be added.

News feed table 960 shows an example of such a table with user ID 961 and event ID or pointer 962. The table can be organized in any manner. One difference from event hifeed tracked update table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g. a maximum number of update operations may be allowed), and if more operations are performed, then the addition of the feed items is performed. In one aspect, the number of operations can be counted by the number of rows to be updated, including the rows of the record (which depends on the update event), and the rows of the hifeed tracked update tables, which can depend on the number of followers. In another implementation, if the number of users is large, the rest of the feed items can be created by batch. In one implementation, the feed items are always written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g. by how an event is defined in table 910), and thus there is no concern about a user missing a feed item that he/she should be able to view.

In step 1350, a request for a news feed is received from a user. In one implementation, the request is obtained when a user navigates to the user's home page. In another implementation, the user selects a table, link, or other page item that causes the request to be sent.

In step 1360, the news feed table and other tables are accessed to provide displayable feed items of the news feed. The news feed can then be displayed. In one implementation, the news feed table can then be joined with the event hifeed tracked update table to determine the feed items. For example, the news feed table 960 can be searched for entries with a particular user ID. These entries can be used to identify event entries in event hifeed tracked update table 910, and the proper information from any child tables can be retrieved. The feed items (e.g., feed tracked updates and messages) can then be generated for display.

In one implementation, the most recent feed items (e.g. 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event hifeed tracked update table (one search for each object the user is following). Thus, the query for the news feed can be proportional to the number of objects that one was subscribing to. The news feed table allows the intermediate step of determining the object IDs to be done at an earlier stage so that the relevant events are already known. Thus, the determination of the feed is no longer proportional to the number of object being followed.

In some implementations, a news feed table can include a pointer (as opposed to an event identifier) to the event hifeed tracked update table for each event that is being followed by the user. In this manner, the event entries can immediately be retrieved without having to perform a search on the event hifeed tracked update table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g. in news feeds, on a detail page of a record, and even based on how the user ended up at a particular page). In another implementation, only a finite number of feed items are displayed (e.g. 50). In one implementation, there can be a limit specifically on the number of feed tracked updates or messages displayed. Alternatively, the limit can be applied to particular types of feed tracked updates or messages. For example, only the most recent changes (e.g. 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

A. Sharing Rules for Feeds

As mentioned above, a user may not be allowed to see all of the records in the database, and not even all of the records of the organization to which the user belongs. A user can also be restricted from viewing certain fields of a record that the user is otherwise authorized to view. Accordingly, certain implementations use access rules (also called sharing rules and field-level security FLS) to ensure that a user does not view a feed tracked update or message that the user is not authorized to see. A feed of a record can be subject to the same access rules as the parent record.

In one implementation, access rules can be used to prevent subscription to a record that the user cannot see. In one implementation, a user can see a record, but only some of the fields. In such instances, only items about fields that the user can access may be displayed. In another implementation, sharing rules and FLS are applied before a feed item is being added to a feed. In another implementation, sharing rules and FLS are applied after a feed item has been added and when the feed is being displayed. When a restriction of display is mentioned, the enforcement of access rules may occur at any stage before display.

In some implementations, the access rules can be enforced when a query is provided to a record or a user's profile to obtain feed items for a news feed of a user. The access rules can be checked and cross-references with the feed items that are in the feed. Then, the query can only return feed items for which the user has access.

In other implementations, the access rules can be enforced when a user selects a specific profile feed or record feed. For example, when a user arrives on a home page (or selects a tab to see the record feed), the database system can check to see which feed items the user can see. In such an implementation, each feed item can be associated with metadata that identifies which field the feed item is about. Thus, in one implementation, a feed tracked update is not visible unless the associated record and/or field are visible to the user.

In one example, when a user accesses a feed of a record, an access check can be performed to identify whether the user can access the object type of the record. In one implementation, users are assigned a profile type, and the profile type is cross-referenced (e.g. by checking a table) to determine whether the profile type of the user can see the object type of the record.

In some implementations, access to specific records can be checked, e.g., after it has been determined that the user can access the record type. Rules can be used to determine the records viewable by a user. Such rules can determine the viewable records as a combination of those viewable by profile type, viewable due to a profile hierarchy (e.g. a boss can view records of profile types lower in the hierarchy), and viewable by manual sharing (e.g. as may be done by an owner of a record). In one implementation, the records viewable by a user can be determined beforehand and stored in a table. In one implementation, the table can be cross-referenced by user (or profile type of a user) to provide a list of the records that the user can see, and the list can be searched to determine if the record at issue is among the list. In another implementation, the table can be cross-referenced by record to determine a list of the profile types that can access the record, and the list can be searched to find out if the requesting user is in the list. In another implementation, the records viewable by a user can be determined dynamically at the time of the access check, e.g., by applying rules to data (such as user profile and hierarchy information) obtained from querying one or more tables.

In other implementations, checks can be made as to whether a user has access to certain fields of a record, e.g., after it has been determined that the user can access the record. In one aspect, the access check on fields can be performed on results already obtained from the database, to filter out fields that the user cannot see. In one implementation, the fields associated with retrieved feed items are determined, and these fields are cross-referenced with an access table that contains the fields accessible by the user (e.g. using the profile type of the user). Such an access table could also be a negative access table by specifying fields that the user cannot see, as can other access tables mentioned herein. In one implementation, the field level access table is stored in cache at a server.

In one implementation, a user can see the same fields across all records of a certain type (e.g. as long as the user can see the record). In one implementation, there is a field level access table for each object type. The access table can be cross-referenced by user (e.g. via profile type) or field. For example, a field can be identified along with the profile types that can see the field, and it can be determined whether the user's profile type is listed. In another example, the user can be found and the fields to which the user has access can be obtained. In another implementation, the accessible fields could be specified for each record.

Regarding profile feeds and news feeds, a first user may perform an action on a record, and a feed tracked update may be generated and added to the first user's profile feed. A second user who is allowed to follow the first user may not have access rights to the record. Thus, the feed tracked update can be excluded from a news feed of the second user, or when the second user views the first user's profile feed directly. In one implementation, if a user is already on the detail page, then another access check (at least at the record level) may optionally not be performed since a check was already done in order to view the detail page.

In some implementations, for profile feeds and news feeds, the feed items can be organized by object type. IT can then be determined whether the requesting user can access to those object types. Other access checks can be done independently or in conjunction with these access checks, as is described above.

B. API Implementation

Various implementations can implement the access rules in various ways. In one implementation, all recent feed items (or more generally events) are retrieved from a feed that is ready for display (e.g. after a feed generator performs formatting) or a table. Then, bulk sharing checks can be applied on the retrieved items. The viewable feed items of the most recent set can then be displayed.

In another implementation regarding a profile feed, for non-VAD (view all data) users, i.e. users who can see everything, certain functions can be overridden. In one implementation, a FROM clause in a query can be overridden to be a pipelined function, e.g., with different parts of the query being operated on at the same time, but with different operations of a pipeline. This pipeline function can be given a row limit and the maximum number of sharing checks to run. It can loop, selecting the next batch of rows, run sharing checks against them in bulk, and pipe back any IDs which are accessible. In one aspect, in nearly all cases, the user feed can contain accessible IDs so the sharing checks can pass on the first loop. However, it is possible the sharing may have changed such that this user's access is greatly reduced. In one worst case, implementations can run sharing checks on up to the maximum number of sharing check rows (e.g. a default 500) and then terminate the function with the IDs which passed so far, possibly zero. Such an example includes a low level person viewing profile feed of CEO.

In some implementations, if the user has a small number of subscriptions (e.g. <25), then implementations can first run sharing checks on those IDs and then drive the main query from those accessible IDs, as opposed to a semi-join against the subscription and running sharing checks on the resulting rows. In other implementations, FLS is enforced by building up a TABLE CAST of the accessible field IDs from the cached values. A main query can then join against this table to filter only accessible fields.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed, even though a user may be authorized to see more than what is displayed. Section VII.E also provides a description of filtering based on criteria.

In one implementation, an "interestingness" filter can function as a module for controlling/recommending which feed tracked updates make it to the news feed when the number of items that a user subscribes to is large. In one such implementation, a user can specify a filter, which is applied to a user's news feed or to record and profile feeds that the user requests. Different filters can be used for each. For example, processing can be done on the news feed to figure out which feed tracked updates are the most relevant to the user. One implementation can use an importance weight and level/ranking, as described herein. Other implementations can include a user specifying keywords for a message and specifying which records or users are most important.

In one implementation, a filter can be used that only allows certain feed items to be added to a feed and/or to be displayed as part of a feed. A filter can be used such that the removal or non-addition of certain feed items automatically occur for any new feed items after the filter criteria are entered. The filter criteria can also be added retroactively. The criteria of such a filter can be applied via a query mechanism as part of adding a feed item to a table or displaying a feed, as described in sections above. In various implementations, a user can directly write a query or create the query through a graphical user interface.

Figure 14:
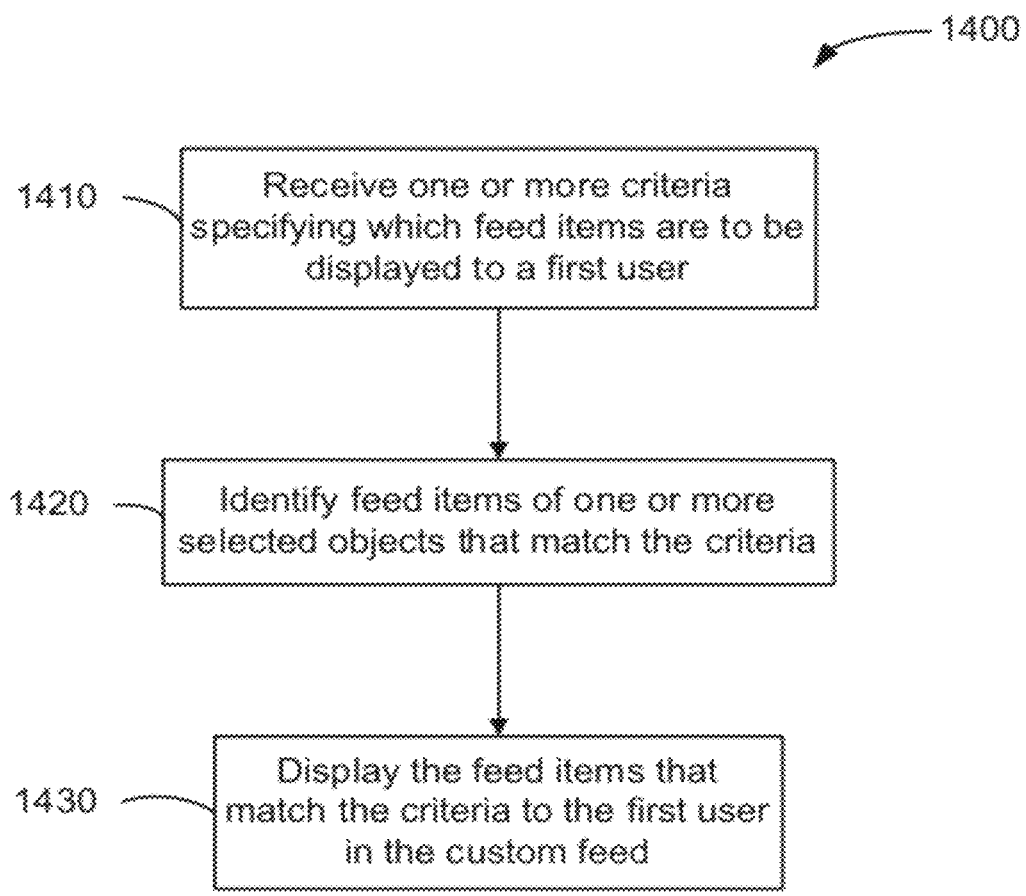
FIG. 14 is a flowchart of a method 1400 for creating a custom feed for users of a database system using filtering criteria according to one or more implementations.

FIG. 14 is a flowchart of a method 1400 for creating a custom feed for users of a database system using filtering criteria according to implementations. Any of the following steps can be performed wholly or partially with the database system, and in particular by one or more processor of the database system.

In step 1410, one or more criteria specifying which feed items are to be displayed to a first user are received from a tenant. In one implementation, the criteria specifies which items to add to the custom feed. For example, the criteria could specify to only include feed items for certain fields of a record, messages including certain keywords, and other criteria mentioned herein. In another implementation, the criteria specifies which items to remove from the custom feed. For example, the criteria could specify not to include feed items about certain fields or including certain keywords.

In step 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In step 1430, the feed items that match the criteria are displayed to the first user in the custom feed. The generation of text for a feed tracked update can occur after the identification of the feed items (e.g. data for a field change) and before the display of the final version of the feed item.

In one implementation, the criteria are received before a feed item is created. In another implementation, the criteria are received from the first user. In one aspect, the criteria may only used for determining feeds to display to the first user. In yet another implementation, the criteria are received from a first tenant and applies to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected.

In another implementation, a user can enter search criteria so that the feed items currently displayed are searched and a new list of matching feed items is displayed. A search box can be used to enter keywords. Picklists, menus, or other mechanisms can be used to select search criteria. In yet another implementation, feed comments are text-indexed and searchable. Feed comments accessibility and visibility can apply on the search operation too.

In one implementation, when a user performs a search of feeds, there can be an implicit filter of the user (e.g., by user ID). This can restrict the search to only the news feed of the user, and thus to only record feeds and profile feeds that the user is subscribed. In another implementation, searches can also be done across feeds of users and records that are not being subscribed.

Besides searching for feed items that match a criteria, one also could search for a particular feed item. However, in one implementation, a user cannot directly query a feed item or feed comment. In such an implementation, a user can query to obtain a particular profile or record feed, and then navigate to the feed item (e.g. as child of the parent feed). In another implementation, the relationship from a feed to its parent entity (e.g. a record or user profile) is uni-directional. That is a user can navigate from the feed to the parent but not vice versa.

In one implementation, a user can directly query the child tables, e.g., comment table 930. Thus, a user could search for comments only that user has made, or comments that contain certain words. In another implementation, a user can search for a profile feed of only one user. In yet another implementation, a user can search for profile feeds of multiple users (e.g. by specifying multiple user names or IDs), which can be combined into a single feed.

XII. Maintaining Records for Follower'S Feeds

If every feed item is stored and maintained on a follower's feed or even in the profile and/or record feeds, the amount of data to be stored could be massive, enough to cause storage issues in the system. In one implementation, the N (e.g. 50) most recent feed items for each feed are kept. However, there can be a need to keep certain older feed items. Thus, implementations can remove certain feed items, while keeping others. In other implementations, old feed tracked updates may be archived in a data store separate from where recent feed items are stored.

In some implementations, feeds are purged by a routine (also called a reaper) that can remove items deemed not worthy to keep (e.g. old items). Any underlying data structures from which feed items are created can also be purged. In one implementation, the reaper can remove certain items when new items are added (e.g. after every 5th item added). As another example, feed items may be deleted synchronously during the save operation itself. However, this may slow down each save operation. In one implementation, however, this may be better than incurring a larger cost when the items are removed at longer intervals. In another implementation, the reaper can run periodically as a batch process. Such routines can ensure that a table size does not become too large. In one aspect, a reaper routine can keep the event hifeed tracked update table relatively small so the sharing checks are not extremely expensive.

In various implementations, the reaper can maintain a minimum number (e.g. 50 or 100) of feed items per record, maintain a minimum number of records per user (e.g. per user ID), and not deleting feed items (or entire records) which have comments against it. Such implementations can ensure that the detail page and profile page have sufficient data to display in a feed. Note that the sharing checks for feed queries can cut down the number of records further for users with less access. Thus, the number of records finally displayed for specific users can be significantly less than a minimum number for a specific profile or record feed. In one implementation, a reaper deletes data that is older than a specified time (e.g. 6 months or a year).

In one implementation, the reaper can perform the deletion of feed items (purging) as a batch up deletion. This can avoid deletion of large number of records that may lead to locking issues. In another implementation, the reaper can be run often so that the table does not become difficult to manage (e.g. size-wise). In this way the reaper can work on a limited set of records. In one implementation, the reaper may have logic that deletes certain items (e.g. by an identification) from tables (e.g. those in FIG. 9A), or sections of the tables.

XIII. Performing Actions in Response to Information Updates Published on an Information Feed Some implementations disclosed herein provide for trigger rules, described in greater detail below, that facilitate the performance of actions in response to conditions detected in information updates created in an information feed system. Such updates can include updates made to data records, updates posted on a personal wall or bulletin board associated with a user account, updates that include user comments, or any other type of updates.

In some implementations, each trigger rule may include one or more trigger conditions. When the trigger condition is detected, the trigger rule may be activated. The trigger condition may include any status or property associated with an information update. The trigger condition may be detected by analyzing an information update and any associated information. The trigger condition may be specified by a menu selection, by custom code, or by any other mechanism.

In some implementations, each trigger rule may include one or more trigger actions. The trigger action is performed when the trigger condition is detected. The trigger action may include any operation or activity within the feed system or within a larger computing services environment associated with the feed system. The trigger action may be specified by a menu selection, by custom code, or by any other mechanism.

Figure 15:
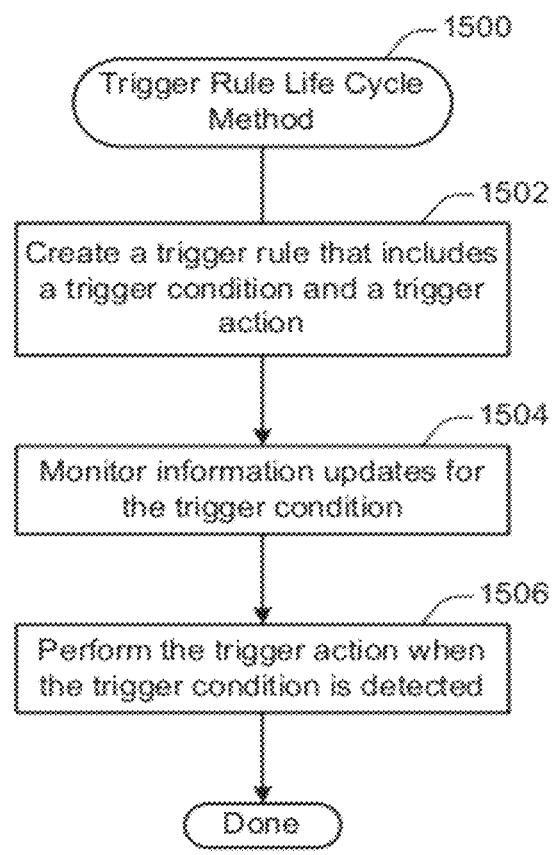
FIG. 15 is a flowchart of method 1500 for a trigger rule life cycle, performed according to one or more implementations.

FIG. 15 is a flowchart of method 1500 for a trigger rule life cycle, performed according to one or more implementations. The method 1500 shows a high-level overview of the types of operations that may be performed in relation to a trigger rule. The operations shown in FIG. 15 are discussed in additional detail with respect to other methods described herein, including the methods shown in FIGS. 16-21.

At 1502, a trigger rule is created. In some implementations, a trigger rule may be implemented in an information feed system such as a social network. Creating the trigger rule may include designating one or more actions and one or more trigger conditions. When an information update satisfies the one or more trigger conditions, the one or more trigger actions are performed.

In some implementations, a trigger rule may be created based on instructions received from a user. Alternately, or additionally, a trigger rule may be created automatically by the system.

In some implementations, a trigger rule may be defined that causes one or more users to follow or stop following an object within the feed system. In this example, these actions may be triggered by a trigger condition such as the inclusion of a text string within an information update.

Figure 22:
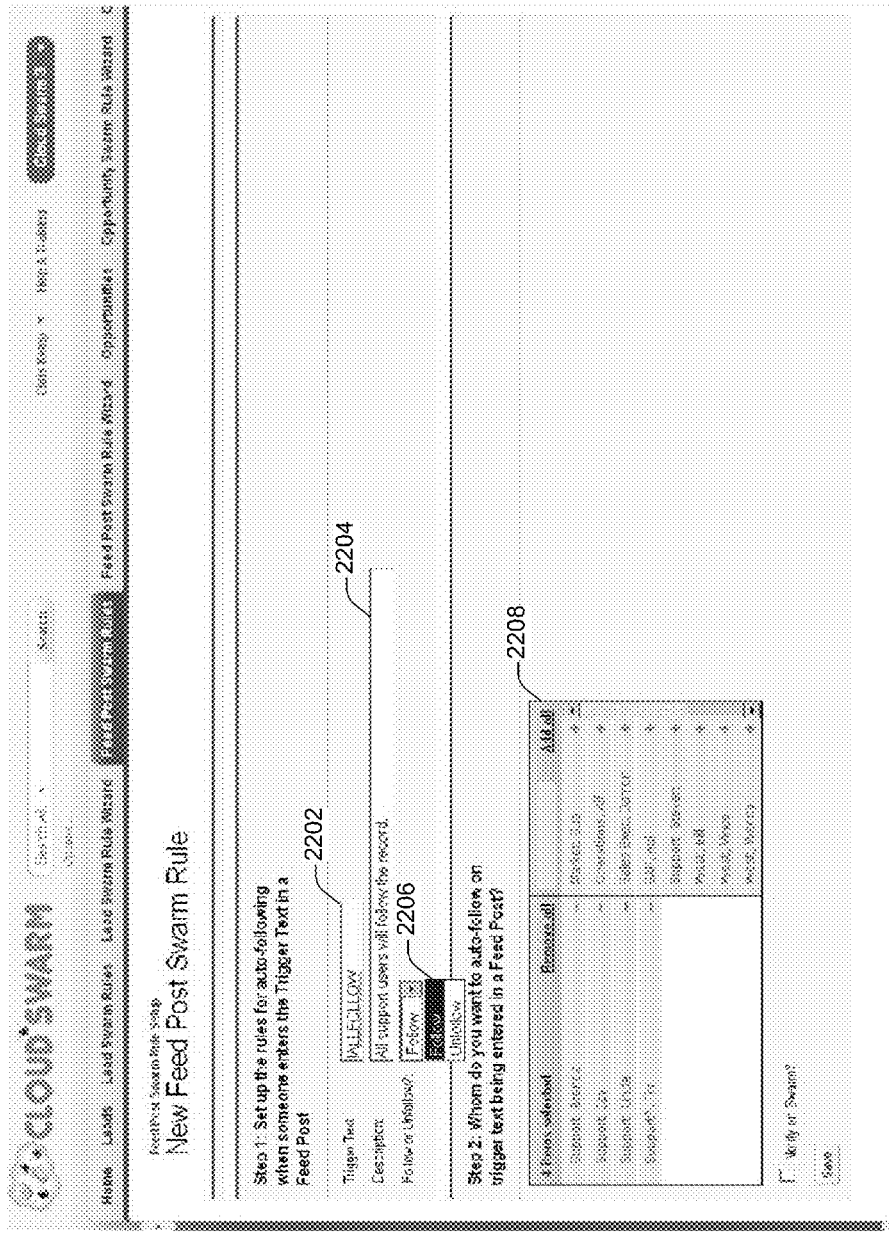
FIGS. 22-36 show images of user interface components, generated according to one or more implementations.

FIG. 22 shows an image of a user interface for configuring one such type of trigger rule, generated according to one or more implementations. The trigger condition interface 2202 allows a user to provide a text string representing a trigger condition. In FIG. 22, the text string is "!ALLFOLLOW." When this text string is detected in an information update, the trigger rule configured as shown in FIG. 22 will be activated. The trigger rule description interface 2204 allows a user to provide a description of the trigger rule. In FIG. 22, the description is "All support users will follow the record." The trigger action interface 2206 allows a user to indicate a trigger action. In FIG. 22, the selected trigger action is Follow, which causes one or more designated user accounts to follow a database record associated with the information update in which the trigger condition is detected. The user account selection interface 2208 allows a user to select user accounts to automatically follow a database record when the trigger rule is activated. In FIG. 22, the user accounts for Brenda, Jay, Linda, and Tim are selected.

Figure 23:
Figure 24:

FIGS. 23 and 24 show images of a user interface for activating the trigger rule configured in FIG. 22, generated according to one or more implementations. In FIGS. 23 and 24, the user interface is displaying information regarding a database record 2302. The user is creating an information update to post for the database record 2302 in the information update creation interface 2304. As shown in FIG. 23, the information update includes the text "!ALLFOLLOW." Before the information update is posted, in FIG. 23, the database record 2302 has no followers listed in the follower interface 2306. When the information update 2308 is created as shown in FIG. 24, the follower interface 2306 is updated to display a list of followers. These followers are now following the database record 2302 due to the activation of the trigger rule configured in FIG. 22.

Figure 25:
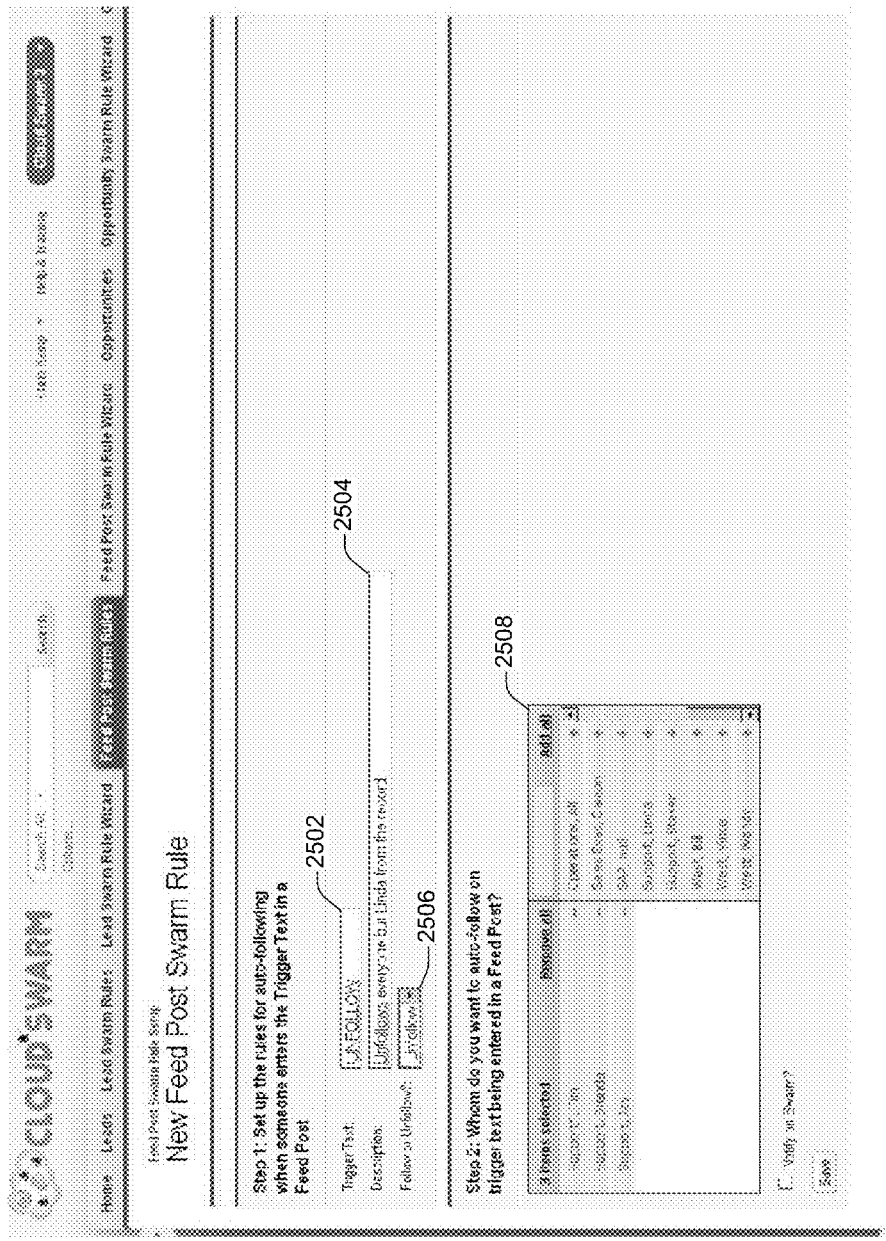

FIG. 25 shows an image of a user interface component for configuring another such type of trigger rule, generated according to one or more implementations. The trigger condition interface 2502 includes the text string "!UNFOLLOW" as a trigger condition. The trigger rule description interface 2504 includes the description "Unfollow everyone but Linda from the record." The trigger action interface 2506 includes the selected trigger action Unfollow, which causes one or more designated user accounts to stop following a database record associated with the information update in which the trigger condition is detected. The user account selection interface 2508 includes the selected user accounts for Brenda, Jay, and Tim.

Figure 26:
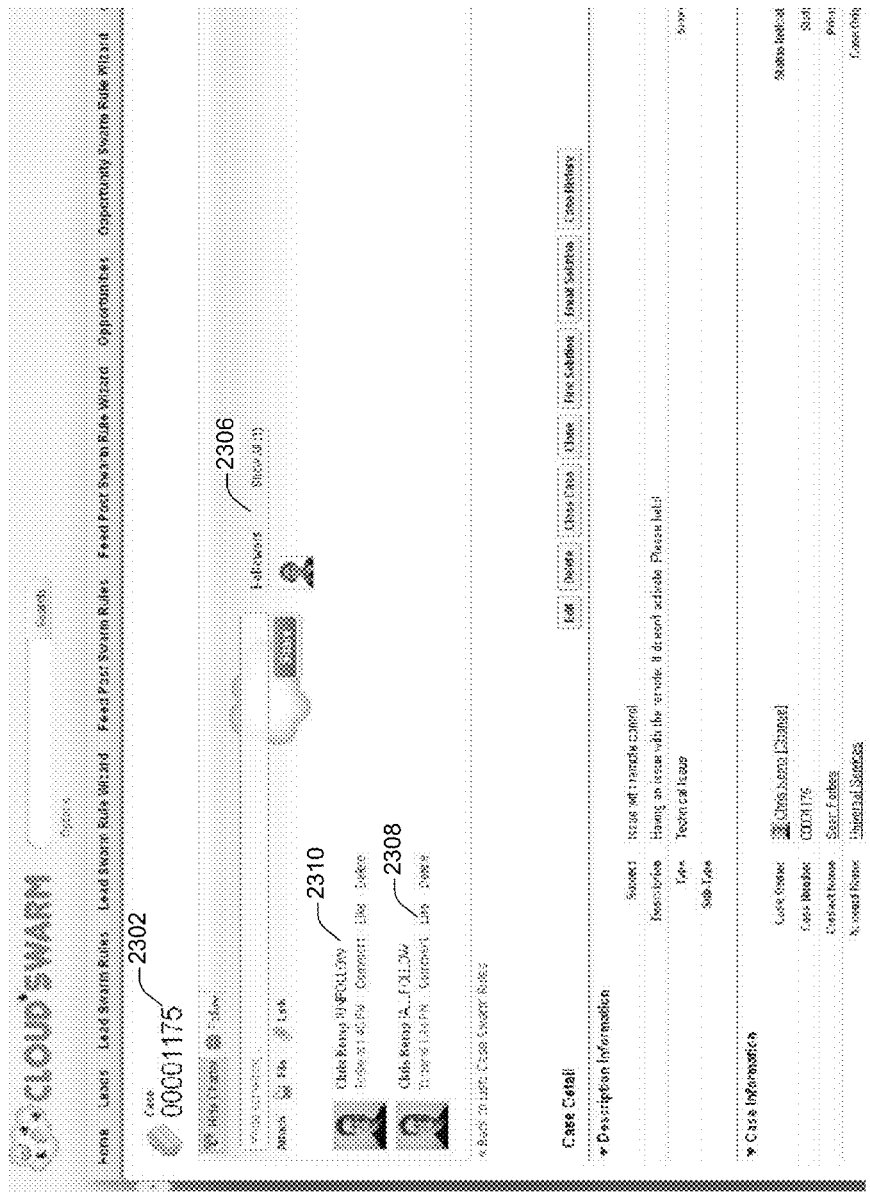

FIG. 26 show images of a user interface for activating the trigger rule configured in FIG. 25, generated according to one or more implementations. In FIG. 26, the user interface is displaying information regarding the database record 2302. The information update 2310 includes the text "!UNFOLLOW." When the information update 2310 is created as shown in FIG. 26, the follower interface 2304 is updated to display a list of followers. All of the followers shown in FIG. 24 are removed except Linda due to the trigger rule shown in FIG. 23.

Returning to FIG. 15, in some implementations a trigger rule may define an operation for automatically translating text in an information update from one language to another language. Such a trigger rule may be especially useful in a collaborative environment where teams of users are diverse and globalized. In this example, the trigger condition may include the presence of a text string such as "!translate." When the system detects the string "!translate" in an information update, the system will translate the information update. The source and destination languages for the translation may be specified within the translate rule or may be designated within the information update (e.g., "!translate English French"). The translated information update may be transmitted as a message, posted as a new information update, or treated in some other way.

In some implementations, a trigger rule may be defined to monitor a particular data record in a database for a status defined in the trigger condition. For example, the data record may represent a sales lead. The trigger rule may define the trigger condition as the status "actual sale." When the system detects a data record status has changed to an "actual sale," then the trigger condition is satisfied. In this example, the satisfaction of the trigger condition may cause the system to email a message to each of the associated team members about the actual sale.

In some implementations, a trigger rule may be defined to monitor keywords on an information feed to police content. For example, in a corporate setting, a team may be working on a top secret case called "order 66," the discussion of which is forbidden by company policy. Anytime the system detects the words "order 66" on an information feed, the system may automatically generate an information update in response, transmit a message to a user account, or delete the offending information update. Such a rule may also be useful to police profane or otherwise unacceptable language in an information feed system.

Figure 32:
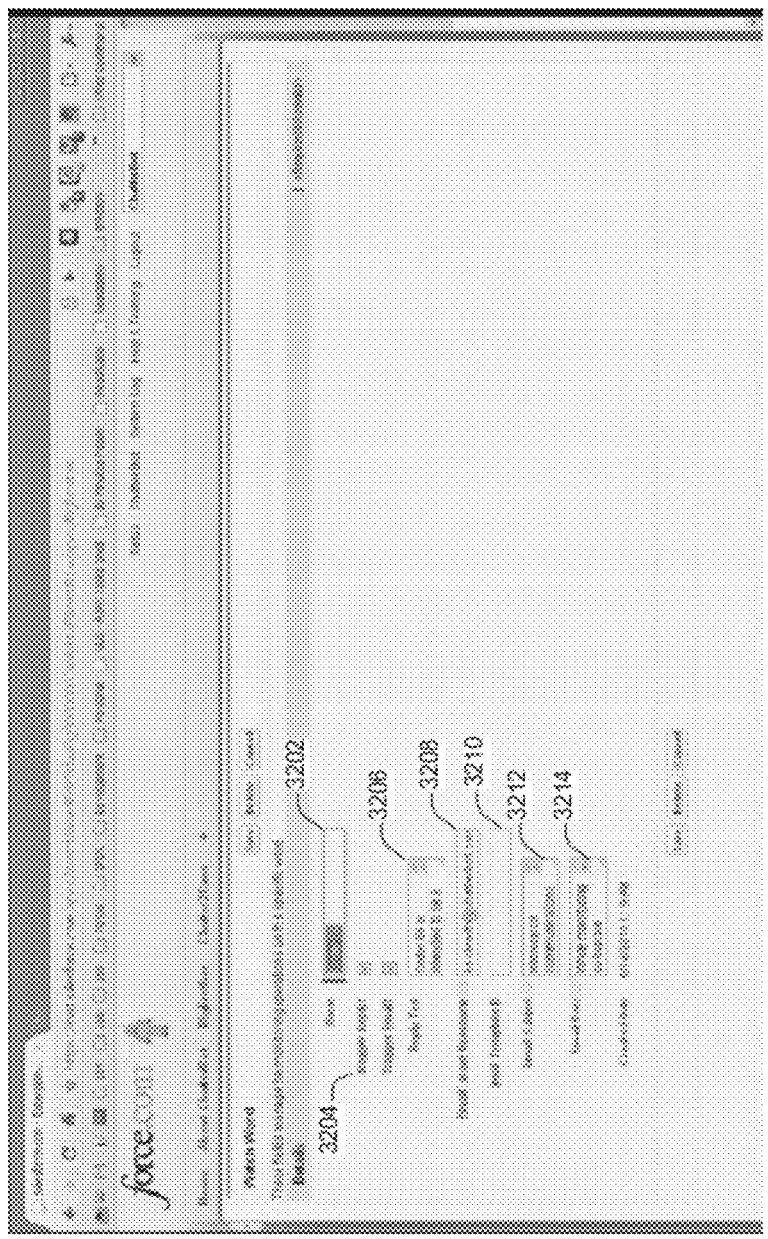
Figure 33:
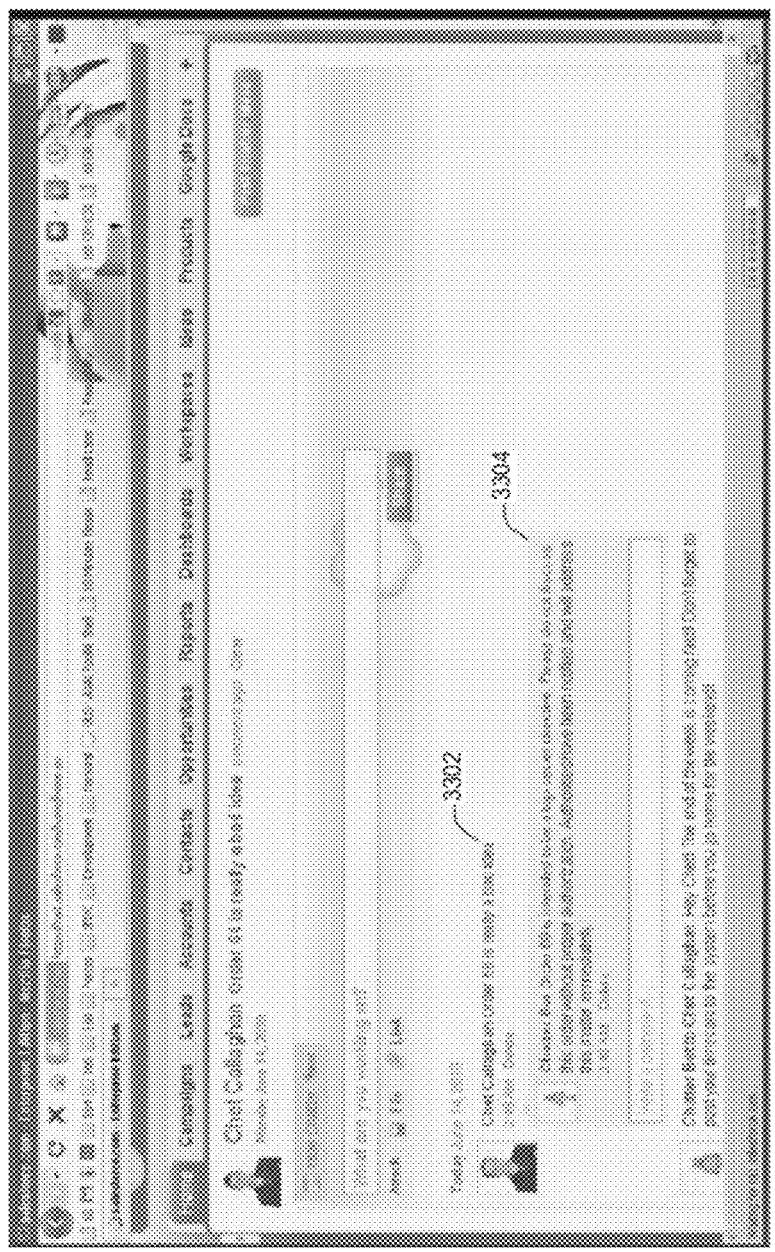

FIGS. 32 and 33 show images of user interfaces for automatically creating information updates in response to the detection of designated watchwords, generated according to one or more implementations. The name component 3202 shows the name "Order 66" for the custom trigger rule. The message type component 3204 shows the message types reply and email selected. The message content component 3206 shows the content of the message that will be automatically created. The message recipient component 3208 shows one or more user accounts that are configured to receive the automatically generated message. The message template component 3210 allows the message to be created according to a designated template, which in FIG. 32 is empty. The message subject component 3212 shows the subject line to include in the automatically created message. The message content component 3214 shows the content to include the in the automatically created message.

In FIG. 33, the user has created the information update 3202 that includes the watchword trigger text "Order 66." When the trigger condition is detected, the trigger rule is activated. Activation of the trigger rule automatically creates the information update 3304. The automatically created information update includes the subject line and content as specified by the configuration interface shown in FIG. 3302.

Returning to FIG. 15, in some implementations, the trigger rule may be defined to detect keywords in order to update records in a database. For example, in an organization it may be useful to streamline the process of reporting issues and problems to an information technology (IT) department. The trigger condition of the trigger rule may be defined to monitor key words such as "help," "problem with," or the mention of the IT group in the information update. Based on the information update, the system may automatically create a new customer case in the IT queue.

In some implementations, the trigger rule may be defined to escalate or draw attention to a data object associated with an information update. For example, an escalation trigger rule may be defined to detect the string "!911" in the text portion of an information update associated to a data record. When "!911" is detected in an information update, the system may escalate the priority of the associated data record in a data queue.

At 1504, an information update is monitored for a trigger condition. In some implementations, the information feed system may be configured to react to certain events or conditions as defined in a trigger rule. In some instances, the information feed system may monitor a batch of information updates for the presence of a trigger condition. The monitoring may be performed periodically, upon request, or according to some other schedule. Alternately, or additionally, the information feed system may compare a specific information update with a trigger condition. The monitoring may be performed when the information update is created or at some other time. The creation of an information update is discussed in additional detail with respect to the method 1600 shown in FIG. 16, as well as other methods.

At 1506, the trigger action is performed when the trigger condition is detected in the information update. In some implementations, various types of trigger actions may be associated with a trigger rule. For example, a trigger action may be defined as the creation or deletion of a data record in a database. In another example, the trigger action may be defined as updating or deleting a message from an information feed. In yet another example, a trigger action may be defined as allowing a user to "follow" or "unfollow" an object such as a data record. In yet another example, the trigger action may be defined as the performance of a combination of multiple events and/or actions.

Figure 28:
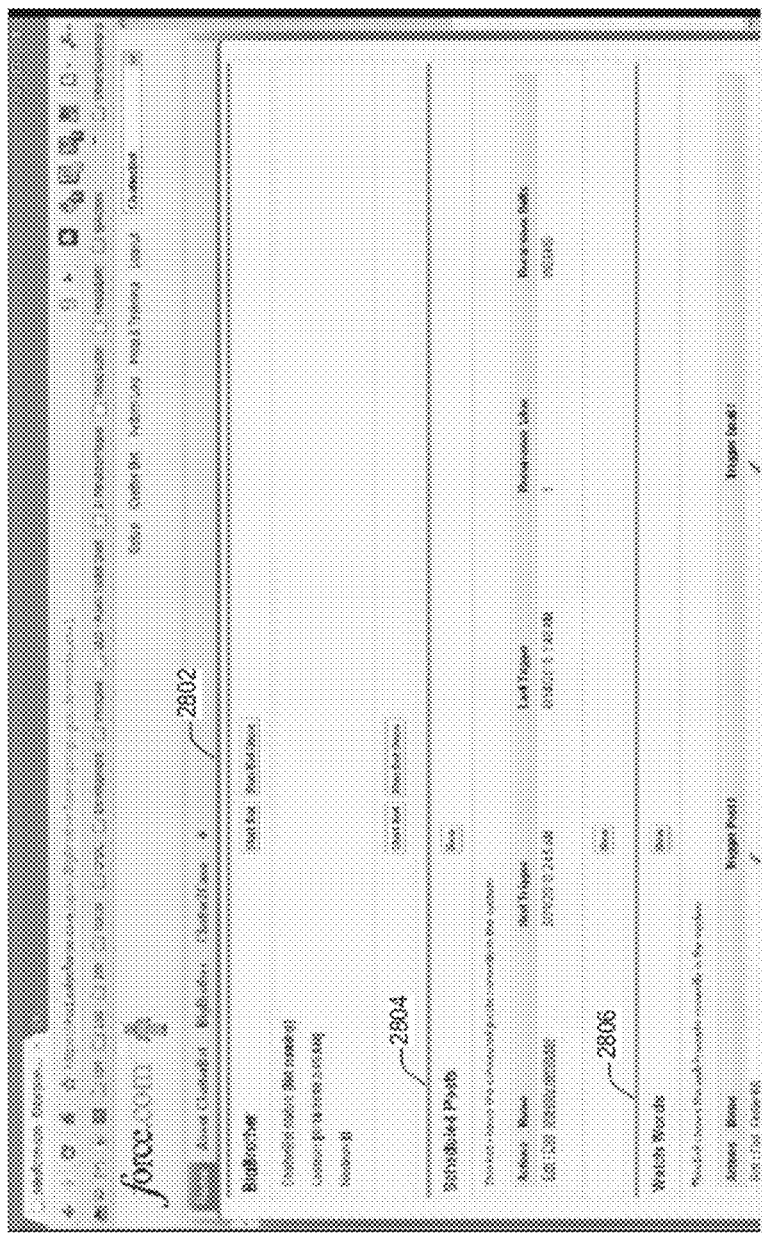

In some implementations, a user interface may be provided for displaying configuration settings for one or more trigger rules. For example, FIG. 28 shows an image of a user interface that shows configuration settings for different trigger rules, generated according to one or more implementations. The big brother trigger rule interface 2802 shows configuration settings for the big brother trigger rule. As shown in FIG. 28, the trigger rule can be run on demand or continuously. The scheduled posts trigger rule interface 2804 shows configuration settings for the scheduled posts trigger rule. The scheduled post trigger rule automatically creates information updates at designated times. The watch words trigger rule interface 2806 shows configuration settings for the watch word trigger rule. The watch word trigger rule automatically creates messages based on scheduling information and watch words.

Figure 16:
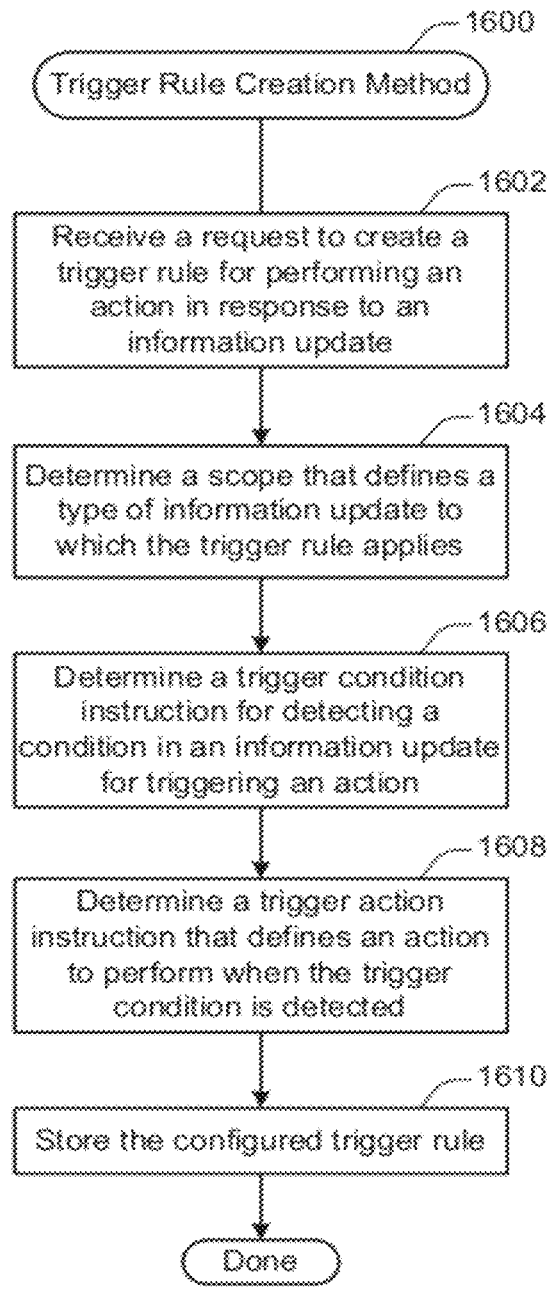
FIG. 16 is a flowchart of a method 1600 for creating a trigger rule, performed according to one or more implementations.

FIG. 16 is a flowchart of a method 1600 for creating a trigger rule, performed according to one or more implementations. In some implementations, creating a trigger rule may include operations for determining the scope of the trigger rule, determining the instructions to detect a trigger condition, and determining the instructions of actions to perform in response to detecting a trigger condition.

In some implementations, the method 1600 may be performed at least in part at a computing device configured to provide computing services associated with an information feed system such as a social networking system. The method 1600 may be initiated when a request to create a trigger rule is received at 1602.

At 1602, a request to create a trigger rule is received. In some implementations, the request may be generated at a client machine in communication with the computing device. For example, a user at the client machine may wish to create a user-defined trigger rule to detect a custom trigger condition and perform a custom trigger action.

In some implementations, the request to create the trigger rule may be generated from within the information feed system. For example, an automatic process may identify and make statistical associations between common conditions and common actions in response to those conditions. This process may determine that a trigger rule should be created to link the identified conditions and actions.

In some implementations, a trigger rule may be created at least in part with the use of a software package that includes a trigger rule framework. The software package may be accessible via an on-demand service environment available via a network. The trigger rule framework may be programmed in a programming language such as C++, Java, or Apex. The trigger rule framework may define core trigger classes to allow the user or the organization to create or customize a trigger rule. The user may implement or expand these classes in order to specify a trigger condition, a trigger action, a trigger scope, or other information related to a trigger rule.

In some implementations, a user may create the trigger rule at least in part with the use of a graphical user interface (GUI). The GUI may allow the user to define a trigger condition and/or a trigger action for a trigger rule. For example, the GUI may include a form that provides user interface components such as text boxes and drop down menus. Using these user interface components, the user may define a trigger condition, a trigger action, a trigger scope, or any other information related to the trigger rule. For instance, the GUI may provide a dropdown menu of predefined or user-defined trigger conditions or actions for the user to select. Alternately, or additionally, the user may provide or select a script containing computer programming language instructions to be performed.

At 1604, the scope of the trigger rule is determined. In some implementations, the scope may identify a type of information updates to which the trigger rule applies.

For example, computing resources in an on-demand computing services environment may be shared by multiple entities. In this case, the scope of a trigger rule may be limited to a single entity to ensure that one entity's data is not affected by another entity's trigger rule. As another example, an information feed system may be shared by many different users. In this case, the scope of a trigger rule may be limited to a particular user account or group of user accounts to allow users to use trigger rules in an individualized fashion.

In some implementations, the scope of the trigger rule may be determined at least in part based on user input. For example, a user may indicate that the application of the trigger rule should be limited to a designated scope.

In some implementations, the scope of the trigger rule may be determined at least in part by the system. For instance, the system may automatically establish a default or minimum trigger rule scope based on the user account, an organization associated with the user account, a data record, some combination of parameters, or any other consideration.

In some implementation, the scope may be statically determined. For instance, the scope may be specified when the trigger rule is created. In this case, the scope may be specified via a GUI, via computer programming language instructions, or via any other mechanism.

In some implementations, the scope may be determined dynamically. For example, the system may analyze a user's account identify the user's team members. Based on this information, the system may select user accounts for inclusion in the scope of the trigger rule.

At 1606, an instruction for detecting a condition in an information update for triggering an action is determined. The trigger condition may be defined as a status or property of an information update or information included in the information update.

In some implementations, the trigger condition may be any type of status, condition, or information that may be associated with an information update. For example, the trigger condition may include a text string or keyword that may be present in a text portion of an information update. As another example, the trigger condition may include a status or condition of the information update or of a data record associated with an information update. As yet another example, the trigger condition may include information retrieved from the information feed system, from an on-demand computing services environment, or from any other location.

In some implementations, the trigger condition instruction may include computer programming language code for detecting the trigger condition. For example, the trigger condition instruction may include code that includes operations for analyzing a string in an information update and determine if the string matches the string defined in the trigger condition. These operations may include instructions for regular expression analysis. In another example, the trigger condition instruction may include code that includes operations for retrieving information from various locations, such as a data record associated with the information update or other locations in an on-demand computing services environment. These operations may include instructions for querying a database to determine information associated with database records.

In some implementations, computer programming language code for detecting the trigger condition may be provided via user input. For instance, a user may provide code that overrides abstract methods to implement a trigger rule.

In some implementations, computer programming language code for detecting the trigger condition may be generated at a server. For instance, a user may indicate that the trigger rule should have a trigger condition in which an information update is analyzed to determine whether the update includes a designated text string. In this case, the server may determine executable code to search an information update based on the text string indicated by the user.

At 1608, a trigger action instruction for defining an action to perform when the trigger condition is detected is determined. In some implementations, the trigger action instruction may include any type of instructions capable of being performed within the information feed system. These instructions may include, but are not limited to: causing user accounts to follow or stop following a data object, creating or deleting a data object such as a database record, modifying a data object, altering the status of a data record, changing an association between data records, generating or deleting an information update, transmitting a message, or some combination thereof.

In some implementations, computer programming language code for performing the trigger action may be provided via user input. For instance, a user may provide code that overrides abstract methods to implement a trigger rule.

In some implementations, computer programming language code for performing the trigger action may be generated at a server. For instance, a user may indicate that the trigger rule should have a trigger action in which a list of designated user accounts are made to follow a designated data record. In this case, the server may determine executable code to cause this action to occur based on the input provided by the user.

In some implementations, the instructions for detecting the trigger condition and/or defining the trigger action may include instructions for analyzing the content of the information update to select an appropriate action. For example, a trigger condition may include the presence of the text string "!translate," the detection of which may result in translating the information update from one language to another language. In this case, the trigger rule instructions may facilitate the specification of the source and/or destination languages within the information update as well. For instance, the information update could include the text string "!translate from English to French", indicating that the information update should be translated from English to French. As illustrated by this example, trigger rules can be flexibly configured to accomplish a variety of tasks. Thus, the scope of the trigger conditions and trigger actions may be limited only by the framework used to specify the trigger rule and the computing environment in which the trigger rule is implemented.

At 1610, the configured trigger rule is stored. In some implementations, the configured trigger rule may be stored at a storage device or on any type of storage medium. The stored trigger rule may include information identifying a scope of the trigger rule, instructions for identifying a trigger condition, instructions for identifying a trigger action, a name of the trigger rule, an owner of the trigger rule, and any other information related to the trigger rule. The configured trigger rule may be stored for later use and/or activated when it is created.

Figure 17:
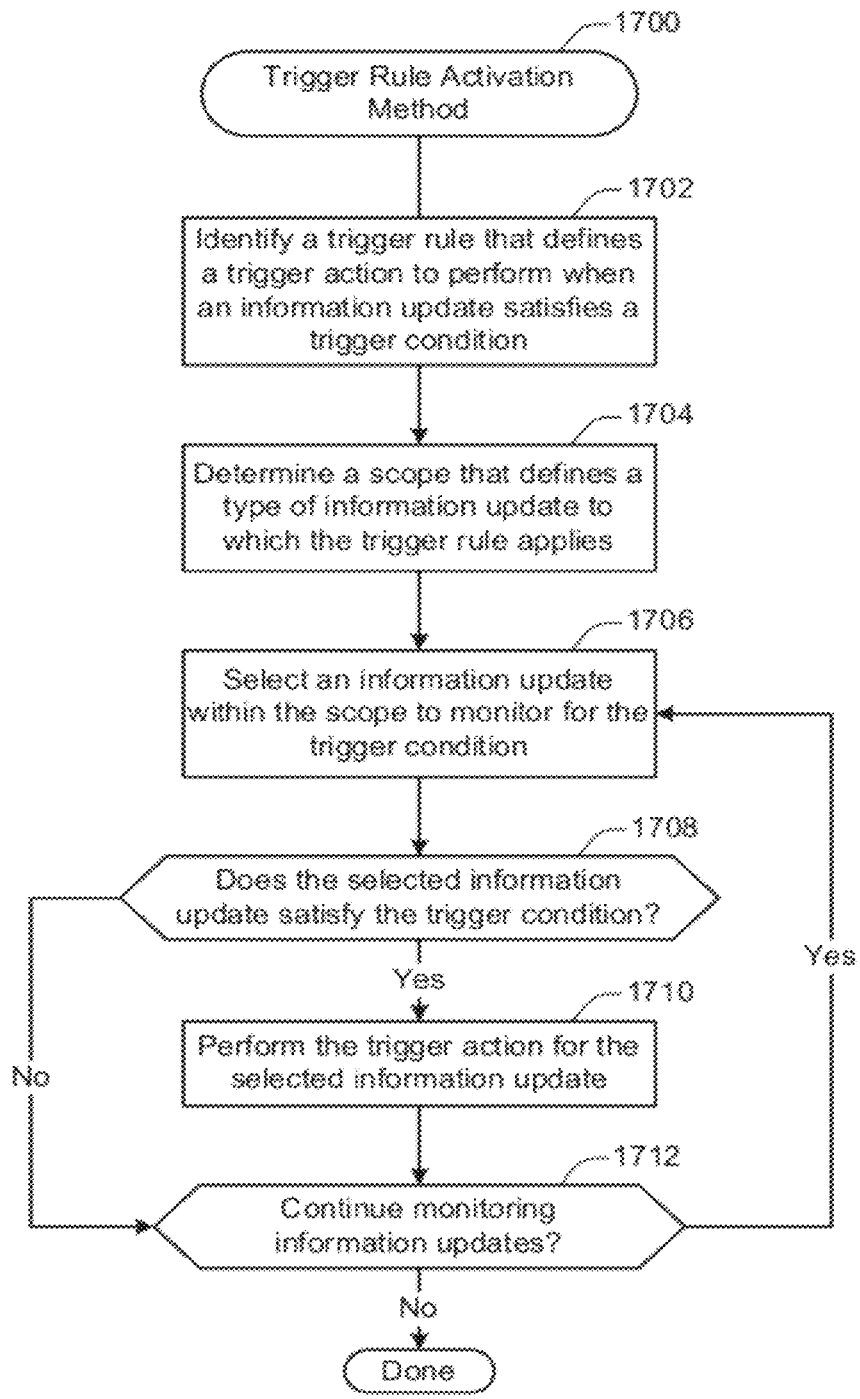
FIG. 17 is a flowchart of a method 1700 for activating a trigger rule, performed according to one or more implementations.

FIG. 17 is a flowchart of a method 1700 for activating a trigger rule, performed according to one or more implementations. In some implementations, the method 1700 may be used to activate a trigger rule configured as discussed with respect to the trigger rule creation method 1600 shown in FIG. 16.

In some implementations, the method 1700 may be performed at various times and according to various types of scheduling information. For instance, the method 1700 may be activated on demand, periodically, or at scheduled times. As another example, the method 1700 may be activated when a triggering event such as the creation of a new information update is detected.

In some implementations, the dates and times of previous instances of the method 1700 may be stored. Identification information for scheduled instances of the method 1700 may also be stored to facilitate alteration of the schedule or cancellation of the method instance.

In some implementations, instances of trigger rule activation methods may be scheduled as part of a scheduled batch of programming code for the feed system and/or on-demand computing services environment. The scheduled batch of programming code may be run periodically or at designated times, such as every hour.

In some implementations, the method 1700 may execute a query on a feed table such as UserFeed. For instance, the method may filter out information updates made before the previous run of the process. For an information update, the process may call abstract methods that may be overridden by implementation classes to implement the trigger rule.

At 1702, a trigger rule is identified. In some implementations, the trigger rule may define a trigger action to perform when an information update satisfies a trigger condition. The trigger rule may be stored on a storage medium and configured in accordance with a configuration method as discussed with respect to FIG. 16.

In some implementations, the trigger rule may be identified by the system. For example, the system may activate a trigger rule periodically or at scheduled times.

In some implementations, the trigger rule may be identified at least in part by a user. For example, the system may receive a request from a user to activate a particular trigger rule.

At 1704, a scope for the trigger rule is determined. In some implementations, the scope defines a type of information update to which the trigger rule applies. In some implementations, the scope may include one or more criteria for limiting the type of information updates that are selected for comparison with the trigger rule.

In some implementations, the scope may limit the application of the trigger rule to a particular entity or organization. For instance, two or more entities may access an information feed system provided via an on-demand computing service environment. These entities may have separate data but use shared computing resources for data processing. When a trigger rule is created for one of the entities, the trigger rule may be assigned an explicit or implicit scope that limits its application to the entity for which the trigger rule is created.

In some implementations, the scope may limit the application to information updates created in association with a designated user account or group of user accounts. For example, a user may create a personal trigger rule that only applies to updates created by the user. As another example, a trigger rule may be configured that applies to a designated group of users, such as developers, but that does not apply to users outside the group.

In some implementations, the scope may limit the application to designated data record or group of data records. For example, a trigger rule may be created that only applies to data records of the type "Account." When an information update is created in association with an Account data record, the information update may be compared with the trigger condition associated with the trigger rule. However, information updates creased in association with data records having other data types may not be compared with the trigger condition.

At 1706, an information update within the scope is selected to monitor for the trigger condition. In some implementations, the information update may be selected by querying a feed table for information updates that meet the criteria associated with the scope.

At 1708, a determination is made as to whether the selected information update satisfies the trigger condition. The implementation of the determination 1708 may depend largely upon the configuration of the trigger rule. For example, if the trigger rule includes the presence of a designated text string within the information update as a trigger rule, then the determination 1708 may be made by comparing a text portion of the information update with the designated text string. As another example, if the trigger rule defines the trigger condition via custom computer programming language code, then the determination 1708 may be made by executing the custom computer programming language code.

At 1710, the trigger action is performed for the selected information update. In some implementations, performing the trigger action may involve implementing the action or actions defined in operation 1608 shown in FIG. 16. For example, the trigger action may include creating a data record, translating the information update to a different language, causing one or more user accounts to follow or unfollow a data record, or creating a scheduled information update.

In some implementations, the performance of the trigger action 1710 may depend largely upon the configuration of the trigger rule. For example, if the trigger rule includes adding a designated pre-defined action as a trigger action, then the designated pre-defined action will be performed. As another example, if the trigger rule defines the trigger action via custom computer programming language code, then the trigger action may be performed at 1710 by executing the custom computer programming language code.

In some implementations, the trigger action may include making an update to a user's UserFeed table portion as specified in the trigger rule. If more than one user is specified as a recipient of a trigger action, then more than one user's UserFeed may be updated.

At 1712, a determination is made as to whether to continue monitoring information updates for application of the trigger rule. In some implementations, the determination may be based at least in part on whether any unprocessed information updates remain that fall within the scope of the trigger rule.

Figure 18:
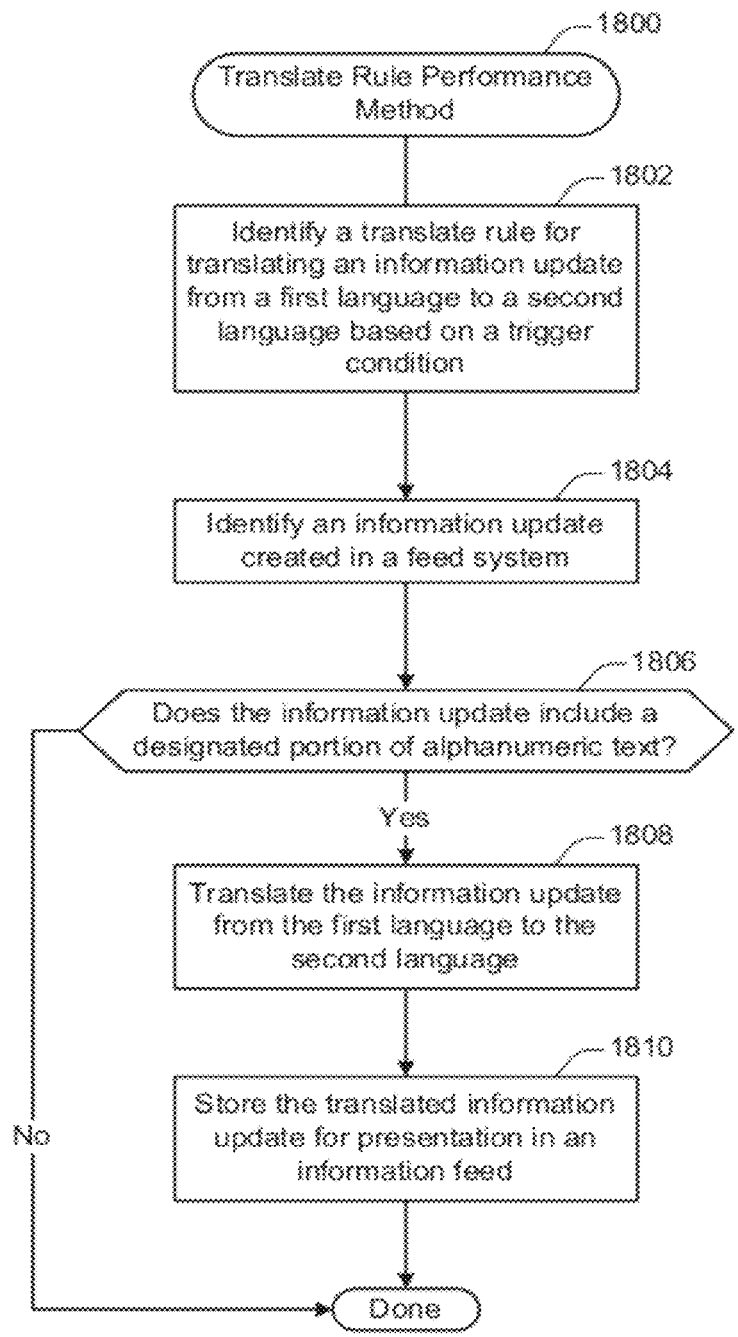
FIG. 18 is a flowchart of a method 1800 for performing a translate rule, performed according to one or more implementations.

FIG. 18 is a flow chart of a method 1800 for performing a translate rule. In some implementations, a trigger rule may be configured as a translate rule. The translate rule includes an indication of one or more actions to perform when an information update satisfies a trigger condition. The actions may include operations for translating the information update from a first language to a second language.

In some implementations, the first and second languages may be any one of various written languages. One or both of the first and second languages may be specified when the translate rule is configured. Alternately, or additionally, one or both of the first and second languages may be dynamically determined. For instance, either or both of the languages may be determined based on user-specified preferences.

Figure 27:
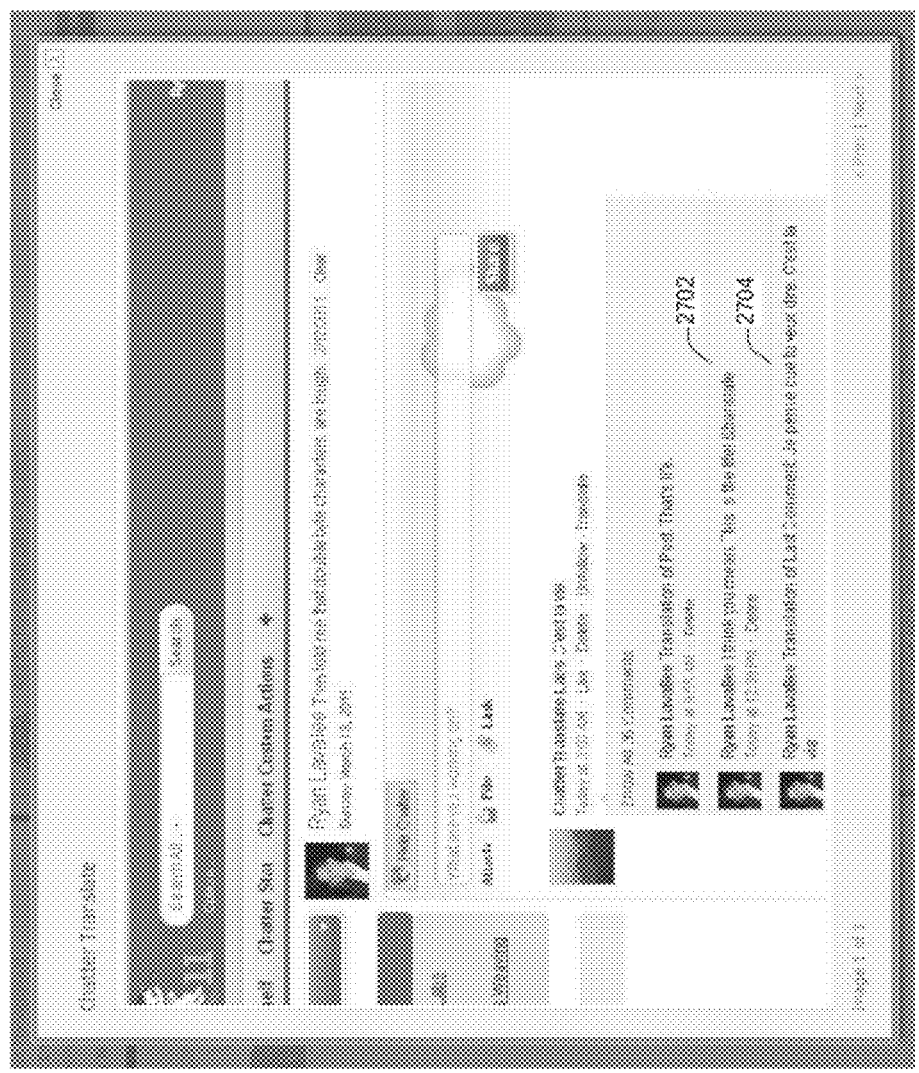

FIG. 27 shows an image of a user interface in which a translate trigger rule has been activated, generated according to one or more implementations. The information update 2702 includes the text "I think you mean: This is the life! &translate". For the translate trigger rule, the trigger condition is the text string "&translate." When the trigger condition is detected, the system automatically creates another information update that translates the information update that includes the trigger condition. In FIG. 27, the information update 2704 includes the text in the information update 2702, translated into French.

At 1802, a translate rule is identified. In some implementations, the translate rule may be retrieved from a storage medium or database. The translate rule may be configured as described with respect to the method 1600 shown in FIG. 16. In some instances, the identification of the translate rule at 1802 may be substantially similar to the operation 1702 shown in FIG. 17.

At 1804, an information update created in a feed system is identified. In some implementations, an information update may be identified at various times and in various ways. In a first example, the information update may be identified when it is created. For instance, the creation of an information update may trigger a process configured to determine whether the information update satisfies a trigger condition. In a second example, an information update may be identified upon demand. For instance, a user may instruct the system to analyze one or more information updates to determine whether any of them meet the trigger condition associated with a trigger rule. In a third example, an information update may be identified based on a schedule. For example, the system may periodically analyze information updates to determine whether any update satisfies the trigger condition.

In some implementations, a group of information updates may be identified and analyzed in succession. For instance, as discussed with respect to FIG. 17, information updates that fall within a scope associated with the trigger rule may be selected and analyzed for the presence of the trigger condition.

At 1806, a determination is made as to whether the text portion of the information update includes a designated portion of text. The designated text portion may be associated with a translate rule trigger condition. For instance, the designated text portion may be the text string "!translate."

In some implementations, the determination made at 1806 may be made at least in part by executing a string comparison function comparing a text portion of the information update and the designated text string. Alternately, or additionally, the system may execute custom computer code associated with the trigger condition instruction created during operation 1606 in FIG. 16. The trigger condition instruction may include computer programming language instructions for detecting the presence of the designated text string in a text portion of the information update.

In some implementations, a different type of trigger condition may be used. In FIG. 18, the trigger condition includes the presence of a designated portion of text. However, various types of trigger conditions may be used, as discussed with respect to the operation 1606 shown in FIG. 16.

At 1808, the information update is translated from the first language to the second language. In some implementations, the operations used to translate the information update may be strategically determined based on considerations such as the language that the information update is being translated from and the language that the information update is being translated to.

In some implementations, the system may use a computer program configured for language translation. For instance, the system may use the Google® Translate API available from Google, Inc. of Mountain View, Calif. Alternately, or additionally, the system may use the Microsoft® Translator program available from Microsoft, Inc. of Redmond, Wash.

In some implementation, the system may execute custom computer code associated with the trigger action instruction created during operation 1608 in FIG. 16. The trigger action instruction may include computer programming instruction for translating a first language to a second language.

At 1810, the translated information update is stored. In some implementations, the translated information update may be stored on a storage medium or storage device. For instance, the translated information update may be stored in a database, such as a multitenant database accessible to a plurality of tenants.

In some implementations, the stored translation may be presented in an information feed, as shown for example in FIG. 27. Alternately, or additionally, the translated information update may be transmitted in a message to one or more user accounts. In some instances, publication information may be stored with the translated information update. The publication information may indicate user accounts designated for receipt of the translated information update.

Figure 19:
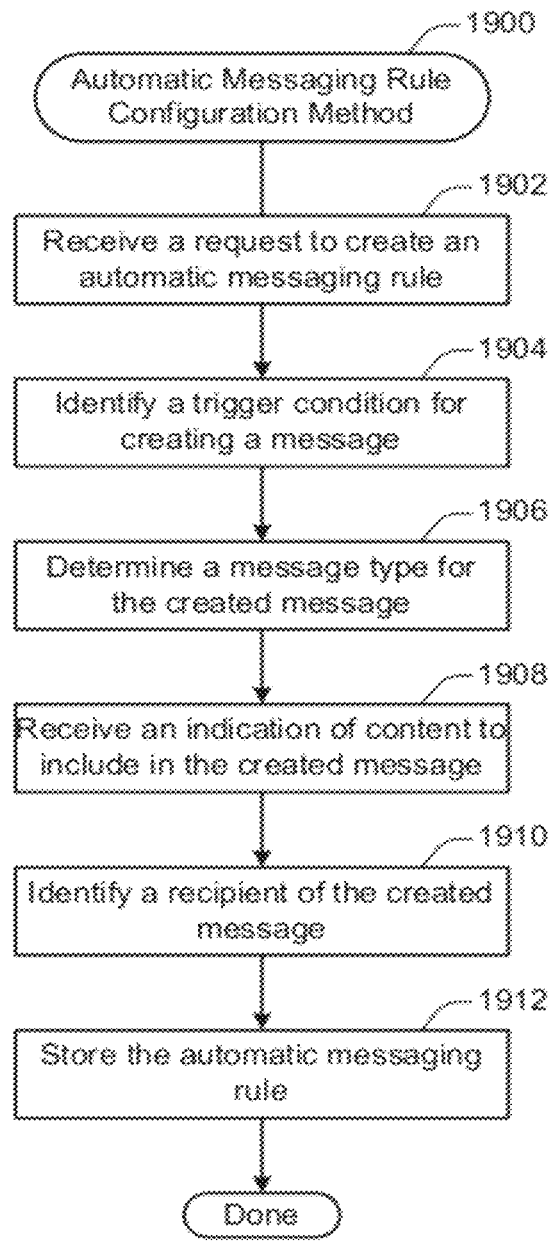
FIG. 19 is a flowchart of a method 1900 for configuring an automatic messaging rule, performed according to one or more implementations.

FIG. 19 is a flowchart of a method 1900 for configuring an automatic messaging rule, performed according to one or more implementations. In some implementations, the method 1900 may be used to create a rule for automatically generating messages in response to information updates. The message may be an information update, an e-mail, a text message, or any other type of message.

At 1902, a request to create an automatic messaging rule is received. In some implementations, the rule may specify a trigger condition for automatically generating a message. The rule may also provide instructions for automatically generating a message. For instance, the rule may provide instructions for generating the subject and content of the message. The rule may also provide instructions identifying a recipient or destination of the message.

In some implementations, the request to create an automatic messaging rule may be in many respects similar to operation 1602 shown in FIG. 16. For instance, the automatic messaging rule may be created via a graphical user interface, a computer programming language framework, or any other technique.

At 1904, a trigger condition for creating a message is identified. In some implementations, the identification of a trigger condition may be substantially similar to operation 1606 shown in FIG. 16.

At 1906, a message type for the created message is determined. The message type may include any message capable of being generated and stored or transmitted by the system. For example, the message type may include an e-mail message, an information update posted on an information feed, a text message, or any other type of message. In some instances, more than one message type may be indicated. For example, when the presence of the trigger condition is detected in an information update, the system may generate an information update in response and may also send an e-mail to a user such as a system administrator.

At 1908, an indication of the content to include in the created message is received. In some implementations, at least a portion of the content may be fixed. For example, the system may be configured to automatically generate a fixed warning message when the trigger condition is detected. As another example, the message may include a fixed portion with designated locations at which dynamic content is inserted.

In some implementations, at least a portion of the content may be selected from the information update or determined based on the information update. For example, the message may quote a portion of the information update. As another example, the message may translate a portion of the information update from a first language to a second language for inclusion in the message. As yet another example, a portion of the message may be based on a status or quality of the information update, such as the length of a text portion of the information update, a posting time of the information update, a formatting of a text portion of the information update, or information in a data record with which the information update is associated.

In some implementations, the indication of the content may include a selection of a predetermined content choice. For example, the user may select a message template from a list of templates. As another example, the user may enter text to include in the message.

In some implementations, the indication of the content may include computer programming language instructions for determining the content. In some instances, the user may be provided with a choice of preconfigured computer programming instructions for generating the message based on the information update. Alternately, or additionally, the user may provide customized computer programming instructions for dynamically generating the content.

At 1910, a recipient of the created message is identified. In some implementations, the recipient of the created message may include one or more user accounts, groups of user accounts, e-mail addresses, mailing lists, or any other digital messaging destinations associated with a user or users. In this case, the recipient or recipients may be specified by any identifier capable of being used to transmit a message to the recipient. For example, an e-mail may be sent to a group of e-mail addresses. As another example, an information update may be posted in an information feed associated with a user account.

In some implementations, the recipient of the created message may include one or more data records, groups of data records, publication destinations, or other digital location not directly associated with a particular user. In this case, the recipient or recipients may be identified by network address or any other identifier capable of being used to transmit a message to the recipient. For example, an information update may be posted in an information feed associated with a particular data record. As another example, a message may be posted on a webpage or other network accessible publication location.

In some implementations, one or more recipients of the message may be fixed. Alternately, or additionally, one or more recipients of the message may be dynamically determined. For example, the message may be transmitted to one user if it is generated during the morning and a different user if it is generated during the evening. As another example, the message may be sent to users included in a list that may be periodically modified, such as a mailing list.

In some implementations, the indication of the recipients may include a selection of recipients from a list. For example, the user may select one or more recipients from a directory list or search query result.

In some implementations, the indication of the recipients may include computer programming language instructions for determining the recipients. In some instances, the user may be provided with a choice of preconfigured computer programming instructions for selecting the recipients. Alternately, or additionally, the user may provide customized computer programming instructions for dynamically selecting the message recipients.

At 1912, the automatic messaging rule is stored. In some implementations, the storing of the automatic messaging rule may be substantially similar to the storing of the configured trigger rule discussed with respect to operation 1610 shown in FIG. 16.

In some implementations, configuration of an automatic messaging rule may include operations not shown in FIG. 19. For instance, an automatic messaging rule may be associated with a scope as discussed with respect to operation 1604 shown in FIG. 16.

Figure 20:
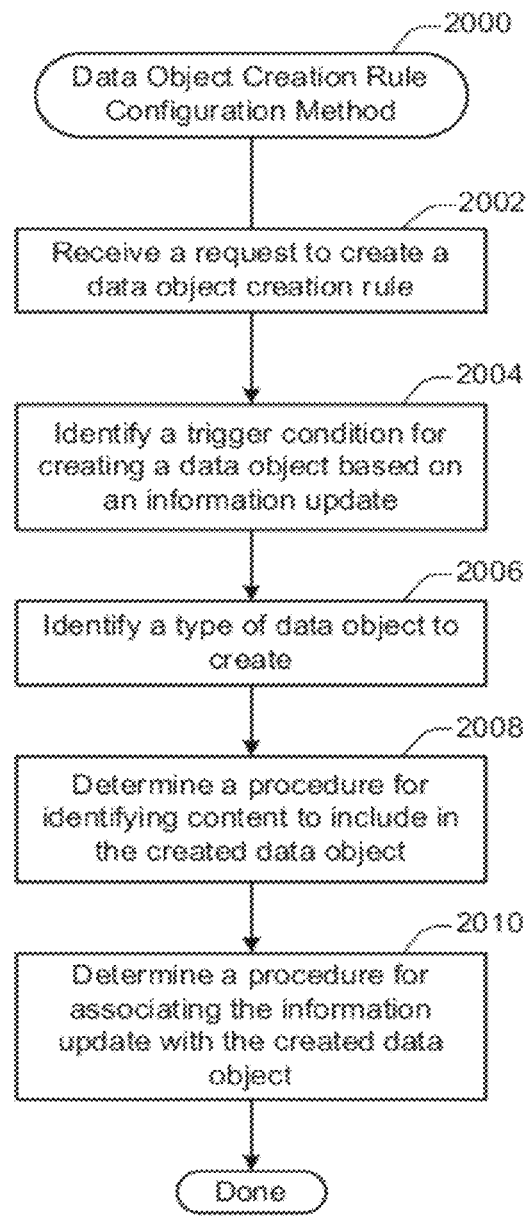
FIG. 20 is a flowchart of a method 2000 for creating an automatic data object rule, performed according to one or more implementations.

FIG. 20 is a flowchart of a method 2000 for configuring a data object creation rule, performed according to one or more implementations. In some implementations, the data object creation rule may be configured to cause a data object to be automatically created in response to detecting a data object creation trigger condition in an information update.

In some implementations, the automatic creation of a data object in response to an information update based on a data object creation rule may provide for rapid, configurable, and automatic actions in an information feed system. For example, a user may decide that a new data record should be created to encapsulate a conversation conducted between different users via a series of information updates. The user may be able to easily create the data rule simply by including a trigger condition such as "!account" within an information update. As another example, the system may be configured to automatically create a "Case" database record representing a problem that needs to be addressed if the system detects certain criteria that are indicative of a problem. These criteria may include designated keywords (e.g., "problem" or "issue"), designated feed conditions (e.g., an information update thread containing three or more related comments, or a designated length of time between successive information updates), or designated information update conditions (e.g., a length of an information update or other content-based analysis).

Figure 34:
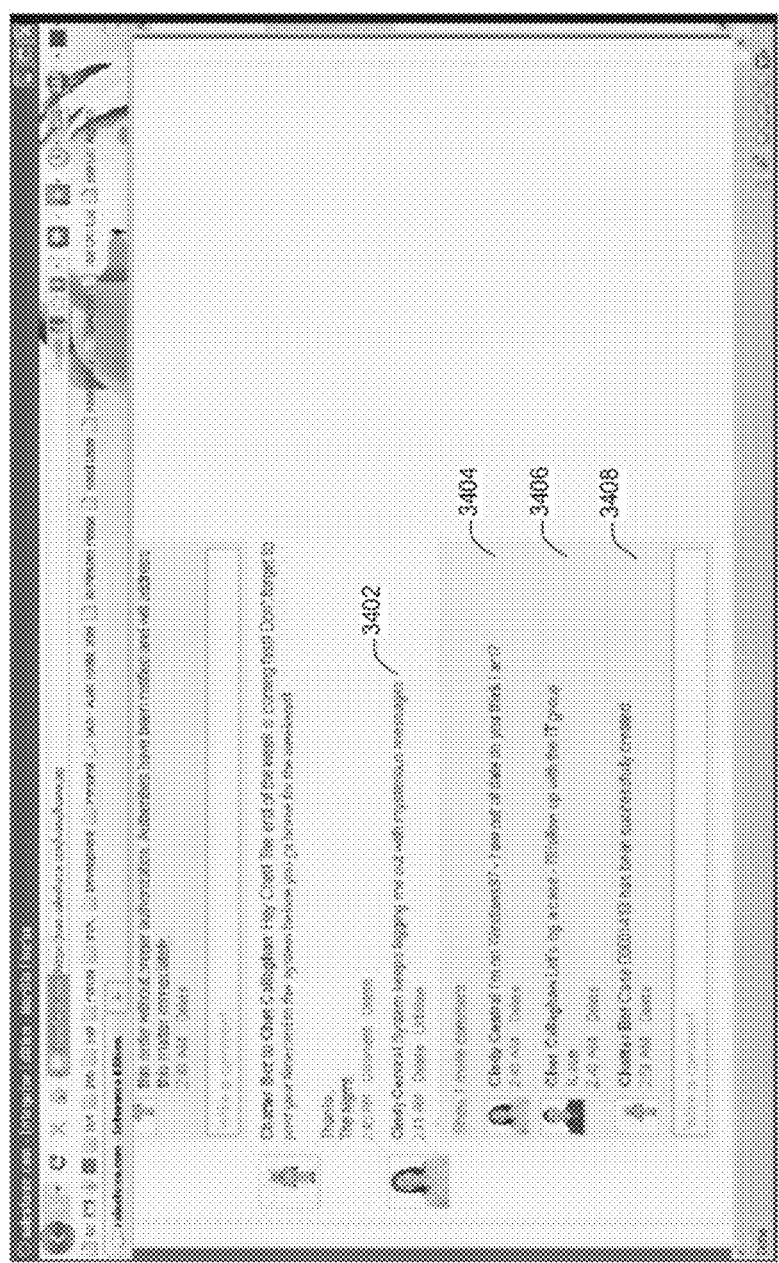
Figure 35:
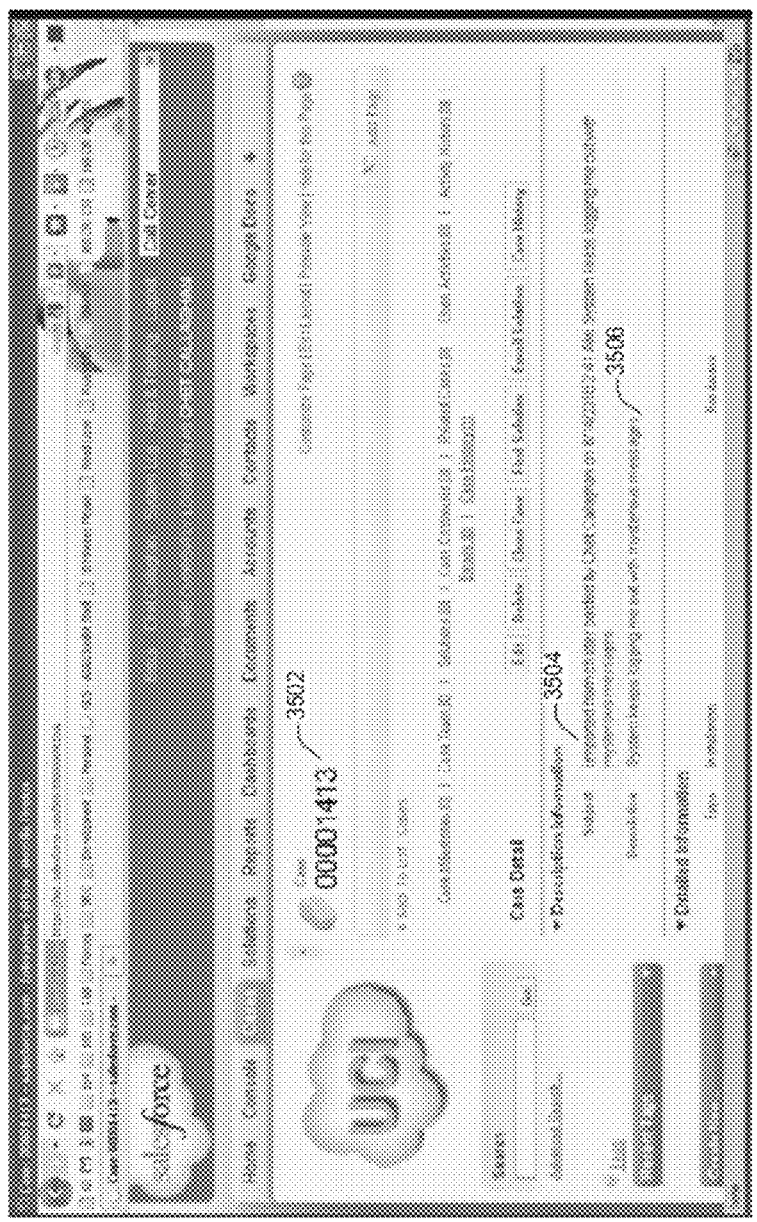
Figure 36:
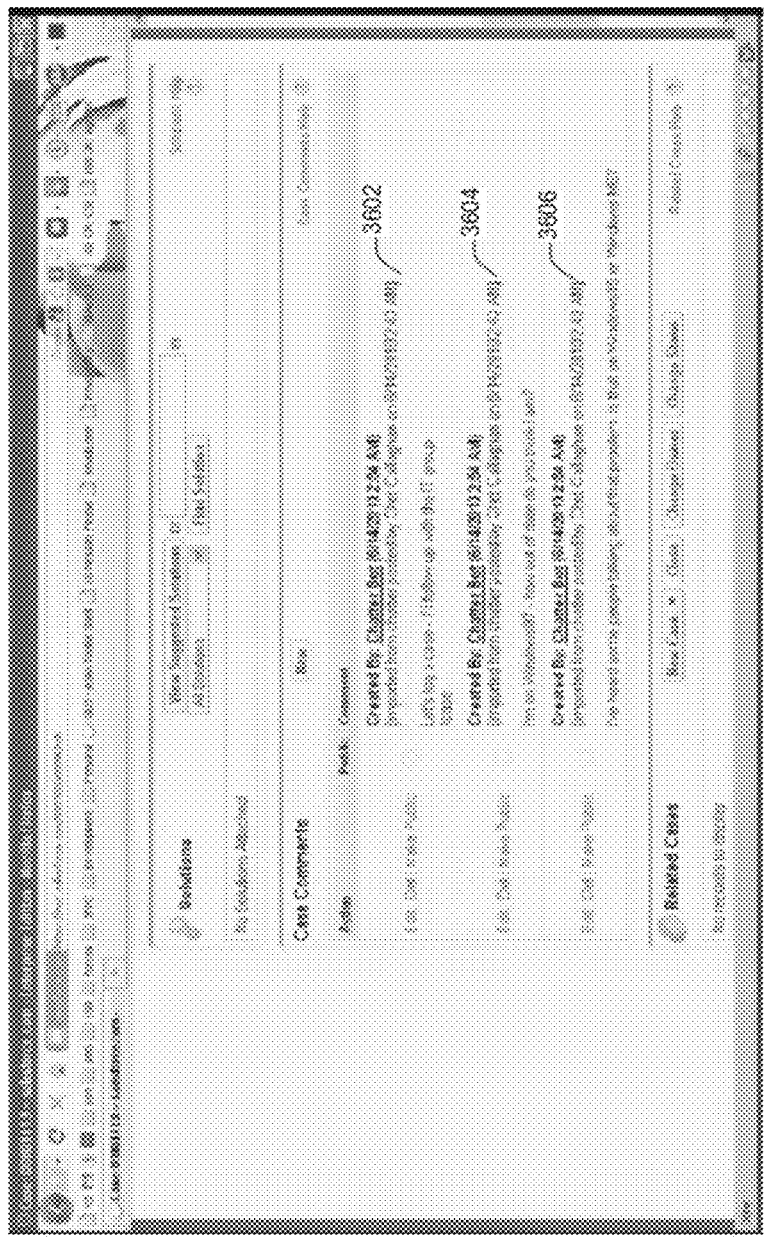

FIGS. 34-36 show images of user interfaces for automatically creating data records in response to detecting trigger conditions, generated according to one or more implementations. The information update 3402 shows a user discussing a problem she is having with the system. The information update 3404 shows another update describing the same problem. The information update 3406 includes the trigger condition "!case," which can be used to automatically create a data record based on the information updates. The information update 3408 is automatically created by the system to show that a case data record has been created in response to detecting the trigger condition.

FIG. 35 shows the database record 3502 that was automatically created. The database record includes a subject 3504 imported from the information update. The description 3506 is also imported from the information update. FIG. 36 shows the information updates displayed in FIG. 34. The information updates 3602, 3604, and 3606 were added as comments to the database record 3502.

Figure 29:
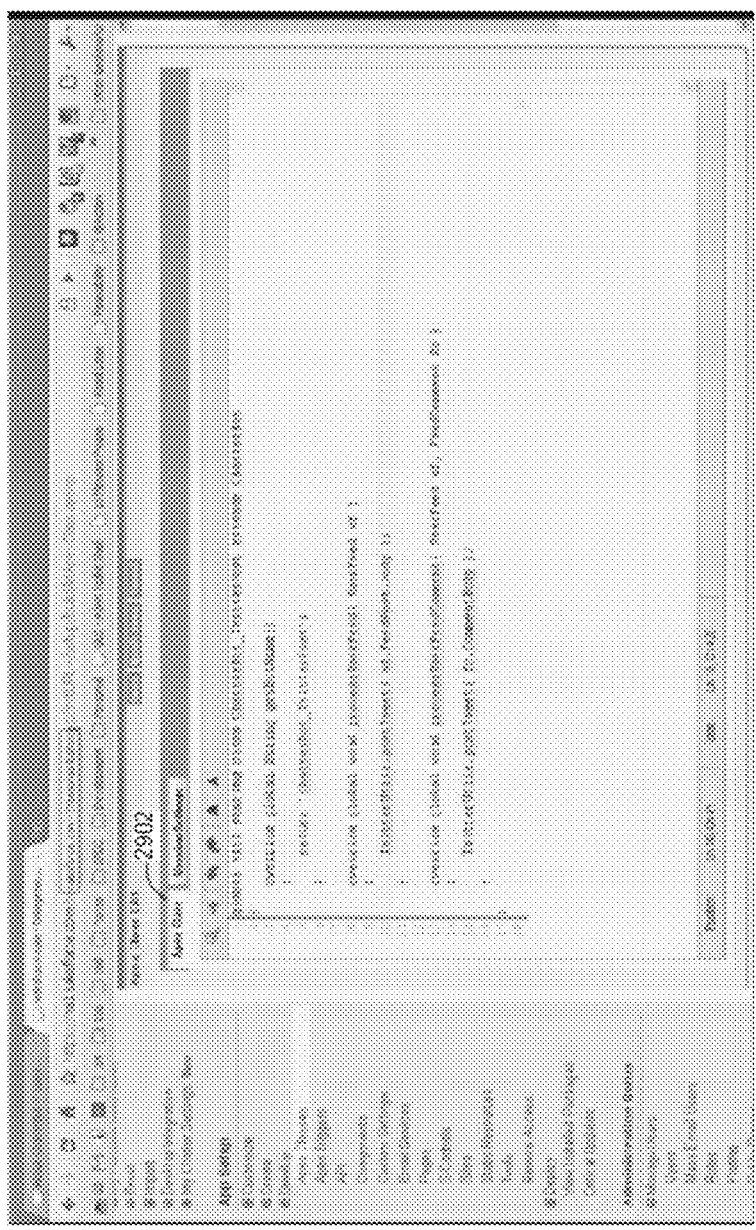

FIG. 29 shows an image of a user interface for receiving custom computer programming language instructions for generating a trigger rule, generated according to one or more implementations. The instructions interface 2902 shows the computer programming language instructions that have been provided. In some implementations, these instructions may override abstract methods provided by a custom trigger rules framework. In FIG. 29, the overridden methods include get-BotName( ) which returns a name of the custom trigger rule, processUserFeed( ) which runs the custom trigger rule for a user's information feed, and processUserFeedComment( ) which runs the custom trigger rule for an individual comment.

Returning to FIG. 20, a request to create a data object creation rule is received at 2002. In some implementations, the receipt of the request to create a data object creation rule at the operation 2002 may be substantially similar to the operation 1602 discussed with respect to FIG. 16.

At 2004, a trigger condition for creating a data object based on an information update is identified. In some implementations, the identification of the trigger condition at operation 2004 may be substantially similar to operation 1606 discussed with respect to FIG. 16.

In some implementations, various types of trigger conditions may be used. In one example, the trigger condition may include text. The text may identify the type of data object to create. For instance, the trigger condition may include the text "!case." When an information update is detected that includes the text "!case", a case data object may be created.

At 2006, a type of data object to create is identified. In some implementations, various types and numbers of data objects may be created in conjunction with a data object creation rule. The data objects may include any digital constructs that are capable of including or being associated with information. In a first example, a data record in a database may be created. In a second example, a file such as a text file, a comma separated value (CSV) file, a document file, or any other type of file may be created. In a third example, an existing file may be updated to include a new portion corresponding to the data object. In a fourth example, a dynamic object implemented in a computer programming language may be created within executing computer programming language code may be created.

In some implementations, a data object created in association with a data object creation rule may include a database record or collection of related database records accessible via an on-demand computing services environment. For instance, the database record may be a case, account, contact, or other database record used to on-demand computing services. These on-demand computing services may include sales organization services, customer relations management (CRM) services, or any other type of services.

In some implementations, portions of a data object creation rule may be specified in various ways. For instance, some portions of a data object creation rule, such as the trigger condition, may be selected from pre-configured options in a graphical user interface. As another example, other portions of a data object creation rule, such as a procedure for incorporating information related to an information update into the created data object, may be provided as custom computer programming code. The custom computer programming code may be configured to be executed when the data object creation rule is activated.

At 2008, a procedure for identifying content to include in the created data object is determined. In some implementations, the procedure may include one or more instructions directed to retrieving, determining, identifying, or selecting information to include in the data object. For instance, the data object may be a database record or collection of related database records stored in a database. In this case, the database record may have several fields for storing data. When the trigger rule is activated, some or all of these fields may be populated according to the procedure determined at operation 2008.

In some implementations, the content to include in the data record may be identified within the information update. For example, the information update may include the text "!Account 'Acme'". In this example, the name of the new Account data record may be set to "Acme."

In some implementations, the content to include in the data record may be identified based on a previously existing data record. For example, the information update may be a comment posted for a previously-existing data record, such as an Account object. When a Case object is created based on the information update, the Case object may include a data field that has a reference to the Account object, creating a child-parent relationship between the Case object and the Account object.

In some implementations, the content to include in the data record may be identified based on related information updates. For example, related information updates, such as updates in the same conversation, may be checked to determine whether any of them mentions a name associated with a Contact database record. If so, the newly created Account data record may be associated with the Contact database record mentioned in the related information update. As another example, related information updates may be checked to determine whether any of them mentions an e-mail address. If so, the newly created Account data record may be associated with the e-mail address (e.g., by creating a new Contact data object). As yet another example, the system may examine timestamp information for related data objects to identify the earliest occurrence of a problem. This information may be included in the created object to identify when the problem first occurred, which may be useful for calculating compliance with a service level agreement (SLA) in a services management system.

In some implementations, the content to include in the data record may be retrieved from a network address, such as a Web service URL. For instance, a related information update may contain a link to a contact management service such as Jigsaw. The system may visit the link to retrieve a formatted set of data to include within the created data object or in association with the created data object.

In some implementations, the content to include in the data record may be retrieved from a related data record. For instance, Lead and Opportunity data records in a customer relations management (CRM) system may be linked to an account or to one another based on information included in the information update. Upon detecting a trigger condition in an information update posted on a Lead record, a new, associated Opportunity record may be created. The newly created data record may draw information from a linked data record.

At 2010, a procedure for associating the information update with the created data object is identified. In some implementations, the procedure may include one or more instructions directed to establishing any kind of connection between the information update and the created data object. For instance, the information update may be added as a comment to the data object. Associating the information update with the created data object may include adding an identifier associated with the information update as data within the data object.

In some implementations, other information updates may also be associated with the created data object. For instance, the information update in which the trigger condition is detected may be responding to one or more earlier-posted information updates in a conversation thread. In this case, the earlier-posted information updates may also be added as comments to the data object that is created.

Figure 21:
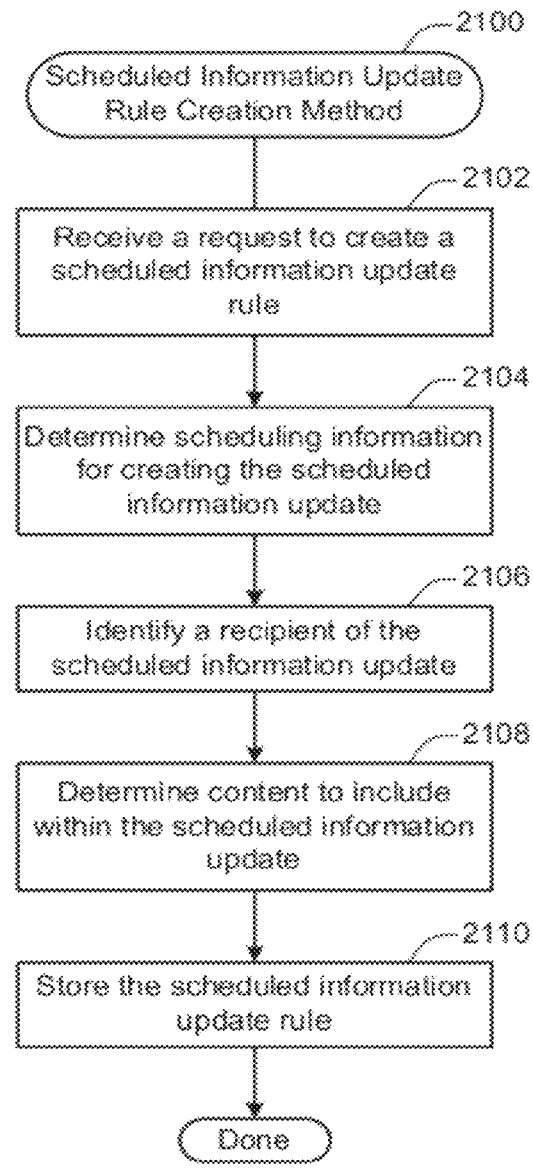
FIG. 21 is a flowchart of a method 2100 for creating a scheduled information update rule, performed according to one or more implementations.

FIG. 21 is a flowchart of a method 2100 for configuring an information update scheduling rule, performed according to one or more implementations. In some implementations, the method 2100 may be used to create an information update scheduling rule for automatically generating an information update at designated times. For example, an information update may be scheduled as a daily or weekly reminder.

Figure 30:
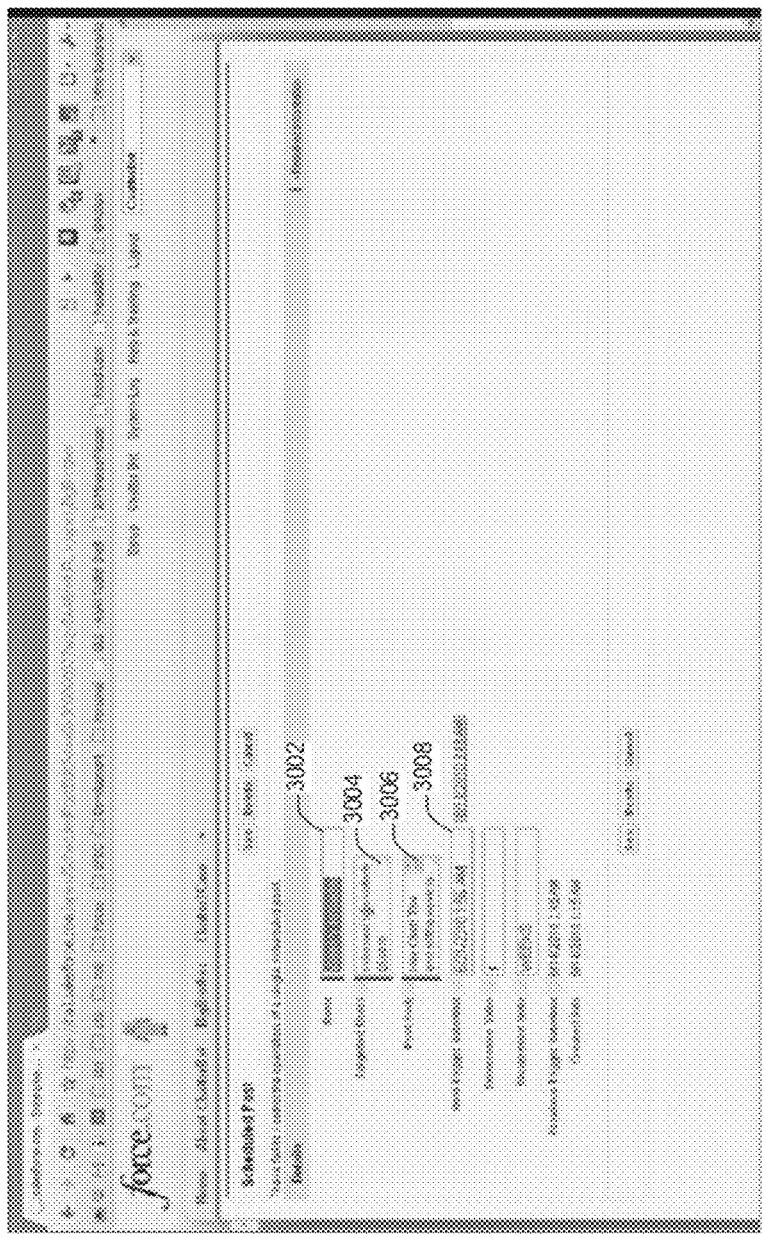
Figure 31:
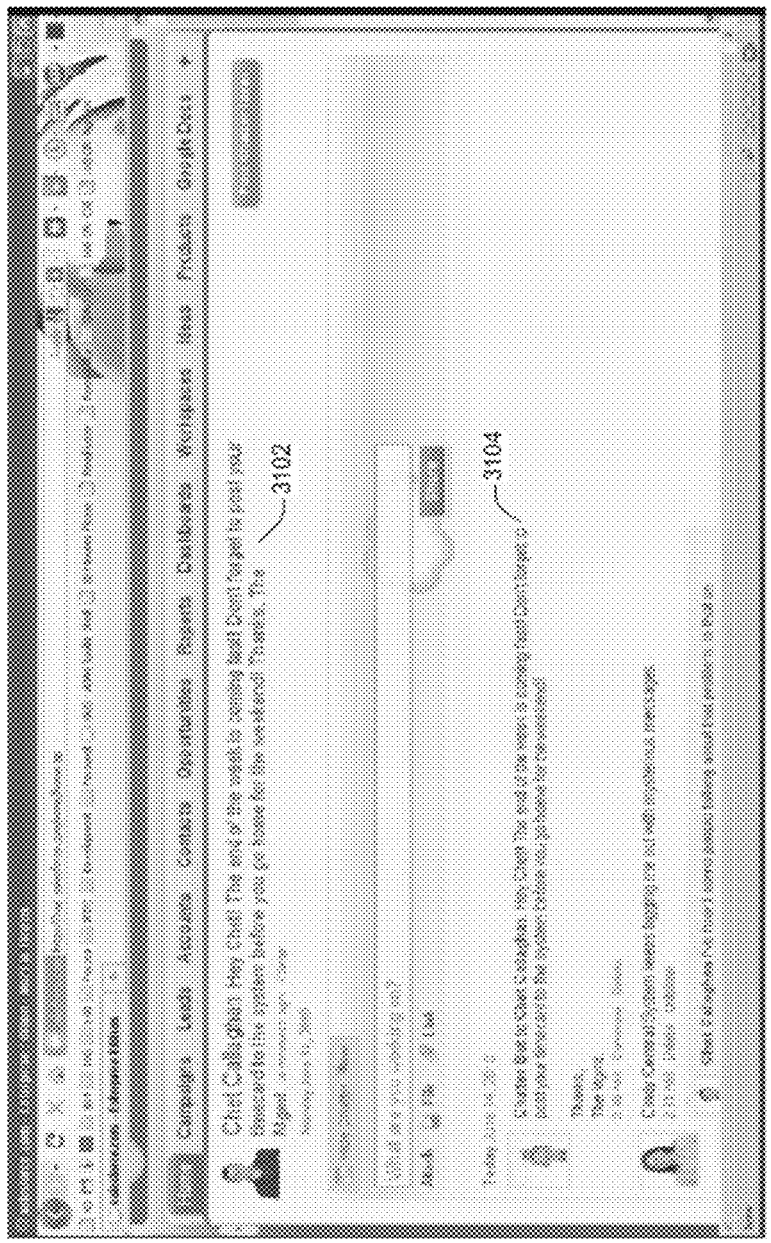

FIGS. 30 and 31 show images of user interfaces for creating scheduled information updates, generated according to one or more implementations. The name component 3002 shows the name "Weekly reminder" for the scheduled information update rule. The targeted users component 3004 shows the user accounts designated as receiving the scheduled information update. The message component 3006 shows the content that is included in the scheduled information update. The scheduling component 3008 shows the date and time scheduling information for creating the scheduled information update.

In FIG. 31, the scheduled information update 3104 is added to the user's information feed at the designated time. Because the information update is created according to a scheduling rule, it is also displayed as a highlighted update 3102 at the top of the user's information feed.

In some implementations, the content of the information update may be specified by the scheduling rule. For example, in FIG. 31, the information update includes the message: "The end of the week is coming fast! Don't forget to post your timecard to the system before you go home for the weekend! Thanks! The Mgmt."

Returning to FIG. 21, a request to create a scheduled information update rule is received at 2102. In some implementations, the receipt of the request to create a scheduled information update rule at the operation 2102 may be substantially similar to the operation 1602 discussed with respect to FIG. 16. For instance, the information update rule may be created via a graphical user interface, a computer programming language framework, or any other technique.

At 2104, the scheduling information for creating the scheduled information update rule is determined. In some implementations, the rule may specify a trigger condition for automatically scheduling an information update. For example, the rule may provide a date and time to generate the information update. As another example, the rule may specify recurrence information for periodically generating an information update. The recurrence information may indicate whether the information update is to be posted hourly, weekly, monthly, yearly, and the like.

In some implementations, the scheduling information may be dynamically determined. For example, the rule may refer to scheduling information that is dynamically determined based on a status of a database record, the content of a file, or other information.

At 2106, the recipients of the scheduled information update are identified. In some implementations, the recipients of the information update may include one or more user accounts or groups of user accounts. Alternately, or additionally, the recipients of the information update may include one or more data records, groups of data records, publication destinations, or other digital location not directly associated with a particular user. In some implementations, the identification of the recipients of the information update may be substantially similar to the operation 1910 discussed with respect to FIG. 19.

At 2108, the content to include within the scheduled information update is determined. In some implementations, at least a portion of the content may be fixed. Alternately, or additionally, at least a portion of the content may be determined dynamically. In some implementations, the identification of the content to include in the information update may be substantially similar to the operation 1908 discussed with respect to FIG. 19.

At 2110, the scheduled information update rule is stored. In some implementations, the storing of the automatic messaging rule may be substantially similar to the storing of the configured trigger rule discussed with respect to operation 1610 shown in FIG. 16.

Figure 37:
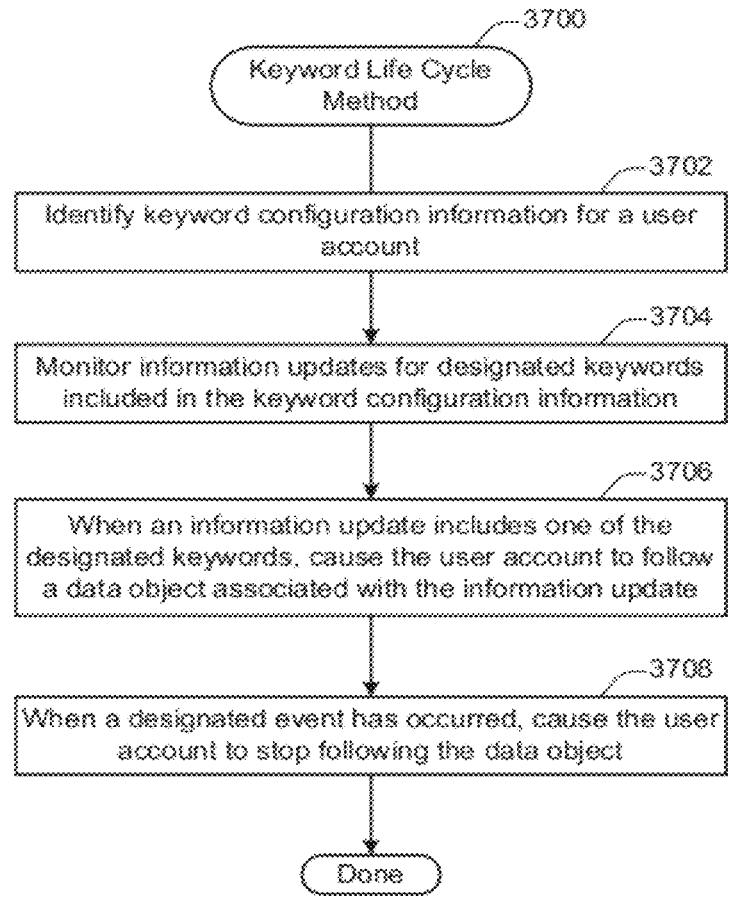
FIG. 37 shows a flowchart of a method 3700 for a keyword life cycle method, performed according to some implementations.

FIG. 37 shows a flowchart of a method 3700 for a keyword life cycle method, performed according to some implementations. In some implementations, the method 3700 may be used to configure keyword information for a user account and monitor information updates for designated keywords. The method 3700 may be initiated when a request to configure keyword information for a user account is received.

At 3702, keyword configuration information for a user account is identified. To distinguish the user account for which the keyword configuration information is identified from other user accounts within the system, the user account for which the keyword configuration information is identified is referred to herein as the keyword user account.

In some implementations, the keyword configuration information may include various types of information for use in monitoring information updates for the presence of one or more keywords. For example, the keyword configuration information may include an indication of one or more keywords for which to monitor, an indication of one or more data objects to follow upon detection of a keyword, an indication of termination information for terminating the following of one or more data objects, and any other information related to the monitoring of information updates for the presence of keywords.

At 3704, information updates are monitored for designated keywords included in the keyword configuration. In some implementations, the information updates may be monitored according to various types of monitoring schemes. For instance, an information update may be compared with the designated keywords when the information update is created. Alternately, or additionally, groups of information updates, such as recently created information updates, may be periodically monitored for the presence of the designated keywords.

At 3706, the keyword user account is caused to follow a data object associated with an information update when a designated keyword is detected in the information update. In some implementations, the data object may be any data object accessible within an information feed system. For instance, the data objet may be a different user account within the information feed system. Alternately, the data object may be a data record stored in a database. The data record may be accessible via an on-demand database service provided via a computer services environment.

In some implementations, when the keyword user account is caused to follow the data object, the keyword user account may receive future information updates related to the data object. For example, if the data object is a different user account, then the keyword user account may receive information updates created by the different user account. As another example, if the data object is a database record stored in a database, then the keyword user account may receive information updates that are created in association with the database record. An information update may be created in association with a database record by posting the information update on an information feed associated with the database record.

In some implementations, more than one data object may be followed. For example, the designated keyword may be detected in an information update posted by a posting user account in an information feed specific to a data record stored in a database. In this case, the user account for which keywords are configured may be made to follow both the posting user account and the data record stored in the database.

At 3708, the user account is caused to stop following the data object when a designated event has occurred. In some implementations, data objects that are followed by a user account as described with respect to operation 3706 may be monitored for the occurrence of a designated termination event provided in the configuration information for keyword monitoring. When the designated termination event occurs, the user account may be made to stop following the data object.

In some implementations, various types of events may trigger the system to cause the user account to stop following the data object. For example, the user account may be made to stop following the data object after a designated period of time has passed since the following of the data object. As another example, the user account may be made to stop following the data object after a designated period of time has passed since the most recent occurrence of the designated keyword in information updates associated with the data object. As yet another example, the user account may be made to stop following the data object when the number of objects followed by the user account has reached a designated threshold. Various trigger events, such as a designated period of time for stopping the a user from following a data record, may be configured by a user, for instance as discussed with respect to FIG. 38.

Figure 38:
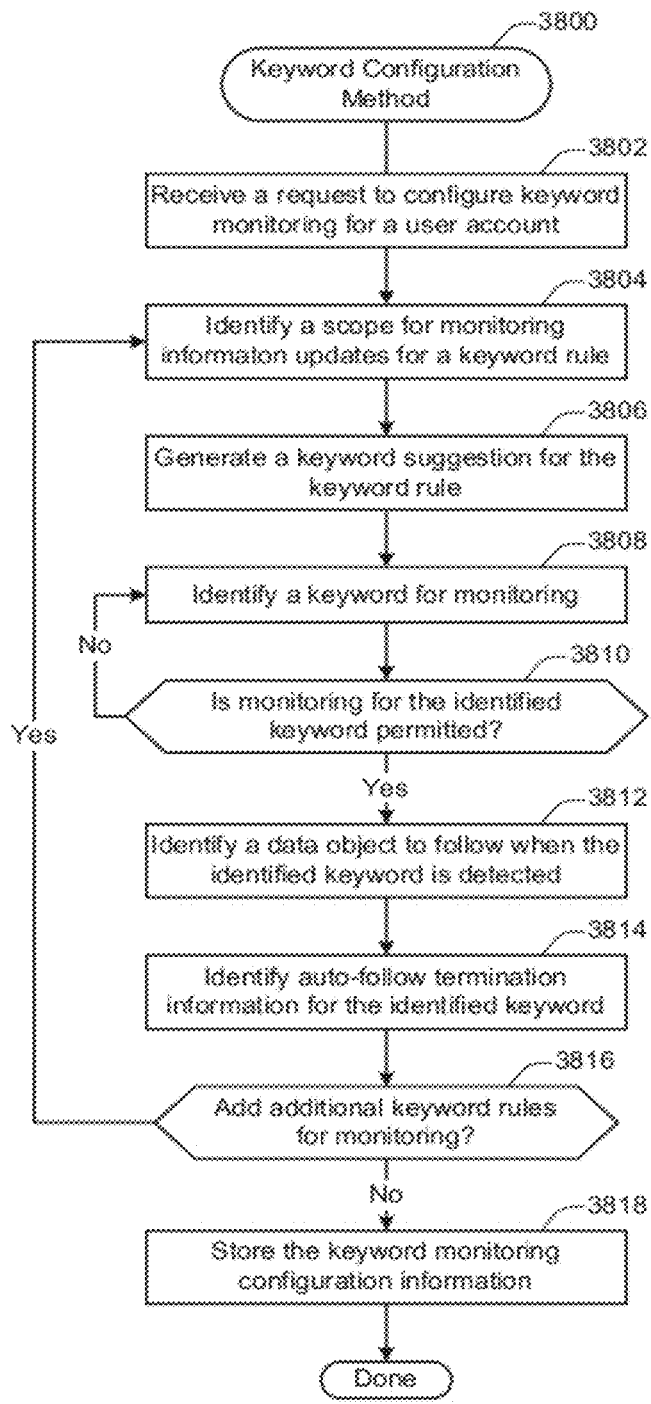
FIG. 38 shows a flowchart of a method 3800 for configuring keywords for a user account, performed according to some implementations.

FIG. 38 shows a flowchart of a method 3800 for configuring keywords for a user account, performed according to some implementations. In some implementations, the method 3800 may be performed at a server in communication with a client machine. The method 3800 may be used to identify, receive, determine, or select information for monitoring information updates for keywords.

In some implementations, the method 3800 may be run automatically when a user sets up a new profile. New users may have difficulty identifying other user accounts or data records to manually follow. By selecting keywords for monitoring topics of interest, a user may automatically follow other user accounts that tend to post topics of interest to the user.

In some implementations, the method 3800 may be run on demand. For example, a user may transmit a request to configure keywords for the user's account. The request may be transmitted to the system from a client machine associated with the user.

At 3802, a request is received to configure keyword monitoring for a user account. In some implementations, the request may be transmitted from a client machine to a server configured to provide information feed services. Alternately, or additionally, the request may be generated within the information feed system. For instance, the system may identify a keyword that is likely to be relevant to a particular user account and then automatically initiate the keyword configuration method 3800.

At 3804, a scope for monitoring information updates for a keyword rule is identified. In some implementations, the determination of the scope at operation 3804 may be substantially similar to the determination of scope discussed with respect to operation 1604 shown in FIG. 16.

In some implementations, information in addition to information updates may be monitored for the presence of keywords. For example, the scope may exclude or include the names of files uploaded to a computing services environment or an information feed system. As another example, the scope may exclude or include information included within data objects such as database records (e.g., Case, Account, Contact) accessible via the on-demand computing services environment.

In some implementations, the scope may identify a range of time to monitor for the designated keyword. For example, the scope may identify a number of days in the past to search for the designated keyword. In this way, a user may be informed of pre-existing information updates that mention the designated keyword. As another example, the scope may identify a number of days that the keyword rule will remain active. In this way, the user may avoid automatically following data objects based on a keyword topic that the user is interested in only for a limited period of time.

At 3806, a keyword suggestion for the keyword rule is generated. In some implementations, the system may generate a suggested keyword based on user input. For instance, the system may auto-complete partially entered keywords based on a dictionary or based on a list of keywords commonly used within the information feed system.

In some implementations, the system may generate a suggested keyword based on information associated with the user account. For example, the user account may indicate that the user is a Java® developer. In this case, the system may suggest keywords such as "Java", "object oriented", and "programming language" for keyword monitoring. As another example, the user account may already be monitoring various keywords, and the system may suggest other keywords similar to those already being monitored by the user account.

In some implementations, the system may provide a list of keywords already used by other user accounts in order of popularity. Alternately, or additionally, the system may identify relationships between keywords. For example, the system may indicate that users following one keyword also tend to follow, or not follow, certain other keywords. As another example, the system may identify groups of related keywords.

At 3808, a keyword is identified for monitoring. In some implementations, a keyword may be related to any topic relevant to the user's interests For instance, a keyword may include such as the name of a technology, a place, a software program, or a job task.

In some implementations, the keyword may be identified based on user input. For example, a user may transmit a keyword from a client machine to the server. As another example, a user may select a keyword from a list of available or suggested keywords displayed in a user interface component.

In some implementations, the keyword may be identified by the server. For instance, the server may automatically select a keyword generated as a suggestion at operation 3806.

In some implementations, more than one keyword may be provided. For example, keywords may be grouped together by logical operators such as AND, OR, and XOR. As another example, a single keyword may be a phrase that includes several words, such as "Java Runtime Environment".

In some implementations, more than one keyword may be identified. For example, a keyword rule may identify information updates that include two or more of a list of designated keywords. As another example, a keyword rule may identify information updates that include the word "Apex" and the word "language" but not the phrase "Version 1.0."

In some implementations, one or more exclusions may be identified along with the keyword. For instance, a data record or group of user accounts having the keyword in the name may be excluded from matching the keyword, or may be identified only once. In this way, the user may avoid receiving irrelevant, excessive, or extraneous information updates in the information feed associated with the keyword user account.

At 3810, a determination is made as to whether monitoring for the identified keyword is permitted. In some implementations, monitoring for some keywords may be disabled by the system or by a user such as an administrator. For example, monitoring for very common words such as articles and prepositions may be disallowed. Following these words may generate a large amount of work for the system due to a relatively large number of occurrences. Also, information updates containing such common words may be unlikely to be particularly relevant to a user's interests. As another example, monitoring for expletives or other words deemed undesirable in a social feed system may be disallowed. As yet another example, users may be limited to monitoring for certain designated keywords rather than being able to indicate any word for monitoring. Such a constraint may facilitate improved computing resource management within the information feed system.

In some implementations, users may not be permitted to monitor keywords that return too many results. For example, a user may not be permitted to monitor a keyword such as "Java". If the user attempts to monitor such a keyword, the user may be presented with suggestions for more specific keywords. For example, a user requesting to monitor the keyword "Java" may be presented with a suggestion to monitor keywords such as "Java runtime environment" or "Java AND object oriented".

At 3812, a data object is identified. The data object may be followed when the identified keyword is detected. In some implementations, the data object may be any data object associated with an information update in which a designated keyword is detected. For example, the data object may be a user account that generated the information update. As another example, the data object may be a database record with which the information update is associated. As yet another example, the data object may be a group of user accounts to which the information update is posted.

In some implementations, the data object may in some instances be defined in relation to the information update. Alternately, or additionally, the data object may be defined when the keyword monitoring rule is created.

In some implementations, the identification of the data object may include an indication of the scope of information to include in the keyword user account's information feed based on the keyword rule. For example, when the designated keyword is detected, the system may cause the keyword user account to automatically follow the user account that created the information update in which the keyword was detected and receive all information updates created by that user account. As another example, the system may cause the keyword user account to follow the user account that created the information update by to receive only information updates created by that user account related to the designated keyword. As yet another example, the system may cause the keyword user account to follow a group of user accounts to which the information update containing the designated keyword was posted. As yet another example, the system may cause the keyword user account to receive only the information update containing the keyword and other information updates in the same conversation, but not to actually follow a data record based on the keyword rule. As yet another example, the system may cause the keyword user account to receive only the information update containing the keyword, and the user may be given the choice as to whether to actively follow a data record. For instance, the information update may be presented in a user interface component with "follow" buttons that allow the user to choose to follow a data record.

At 3814, auto-follow termination information is identified for the identified keyword. In some implementations, the auto-follow termination information may be used to cause the keyword user account to stop following a data object that the keyword user account was made to follow based on a keyword rule. The auto-follow termination information may include any information specifying an event or condition that causes the keyword user account to stop following such a data object.

In some implementations, the auto-follow termination information may identify a time period. The types of time periods that may be identified may include, but are not limited to: a time period after the most recent occurrence of a keyword in an information update associated with the data object, a time period after the keyword user account was caused to follow the data object, a time period after the creation of the information update that caused the user account to follow the data object, and at time period after the most recent reply to the information update that caused the user account to follow the data object.

In some implementations, the auto-follow termination information may identify an event. When the identified event is detected, the following of the data object by the keyword user account as specified by the keyword rule may be terminated. The types of events that may be identified may include, but are not limited to: reaching a designated threshold of data objects followed by the keyword user account, reaching a designated threshold of automatically followed data objects followed by the user account, and reaching a designated threshold of automatically followed data objects followed by the user account based on the keyword monitoring rule.

At 3816, a determination is made as to whether to add additional keyword rules for monitoring. In some implementations, the determination may be based at least in part based on user input. For instance, a user interface component may present the opportunity for user input indicating whether to add additional keyword rules.

In some implementations, the determination may be made at least in part automatically. For instance, the system may determine whether any additional keyword suggestions may be generated for the keyword user account.

At 3818, the keyword monitoring configuration information is stored. In some implementations, the keyword monitoring configuration information may be stored on a storage device or storage medium accessible to the information feed system. For instance, the keyword monitoring configuration information may be stored in a database in association with information identifying the keyword user account, such as a database key.

In some implementations, not all of the operations shown in FIG. 38 need be performed. For instance, some implementations may not employ some types of configuration information. Also, some configuration information may not be configured for some user accounts or some keywords if such configuration information is unnecessary or undesired.

Figure 41:
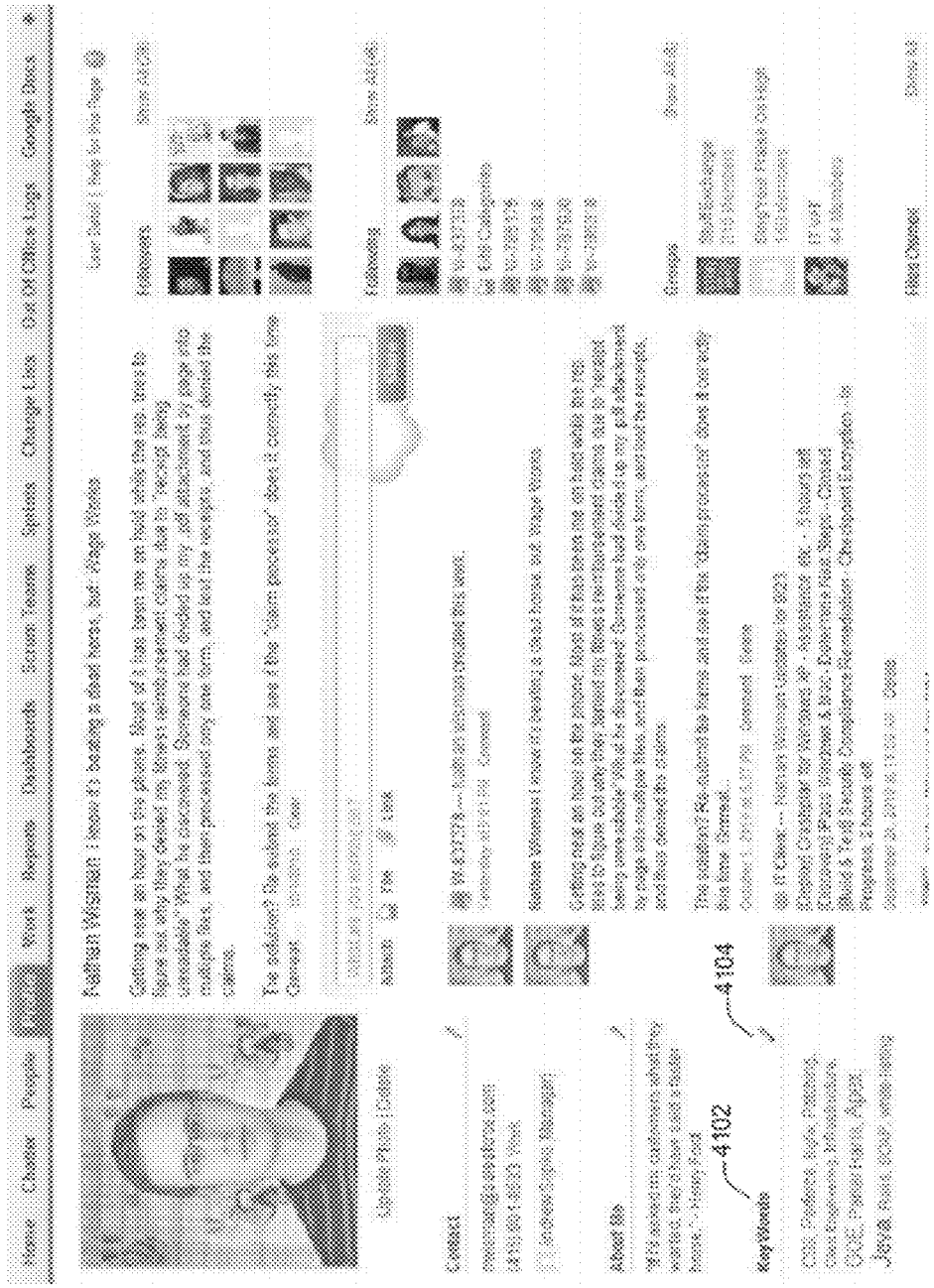
FIGS. 41 and 42 show images of user interface components, generated according to one or more implementations.

FIG. 41 shows an image of a user interface component, generated according to one or more implementations. The user interface shown in FIG. 41 includes a keyword display area 4102 and a keyword configuration button 4104. The keyword display area 4102 and the keyword configuration button 4104 may be used to provide the user with an overview of the user's current keyword configuration. The keyword configuration may be provided as described with respect to FIG. 3/.

In some implementations, the keyword display area 4102 may be displayed in a user's profile area or another user interface component presented in an information feed system. The keyword display area 4102 may display the keywords that are currently configured for the user account. In some implementations, the keywords displayed within the keyword display area 4102 may resize dynamically based on various factors such as the prevalence of the keyword as compared to other keywords, a designated importance ranking indicated by the user, a frequency of occurrence within the information feed system, or other such information. The user may edit the configuration of the keywords, add new keywords, or perform other keyword-related functions by activating the keyword configuration button 4104.

In some implementations, keywords may be ordered in various ways. For example, keywords may be ordered alphabetically. As another example, keywords may be ordered based on prevalence in the information feed system. As yet another example, keywords may be ordered based on user input. For instance, a user may separate keywords into categories, provide importance rankings for keywords, or drag and drop keywords into a desired ordering.

Figure 39:
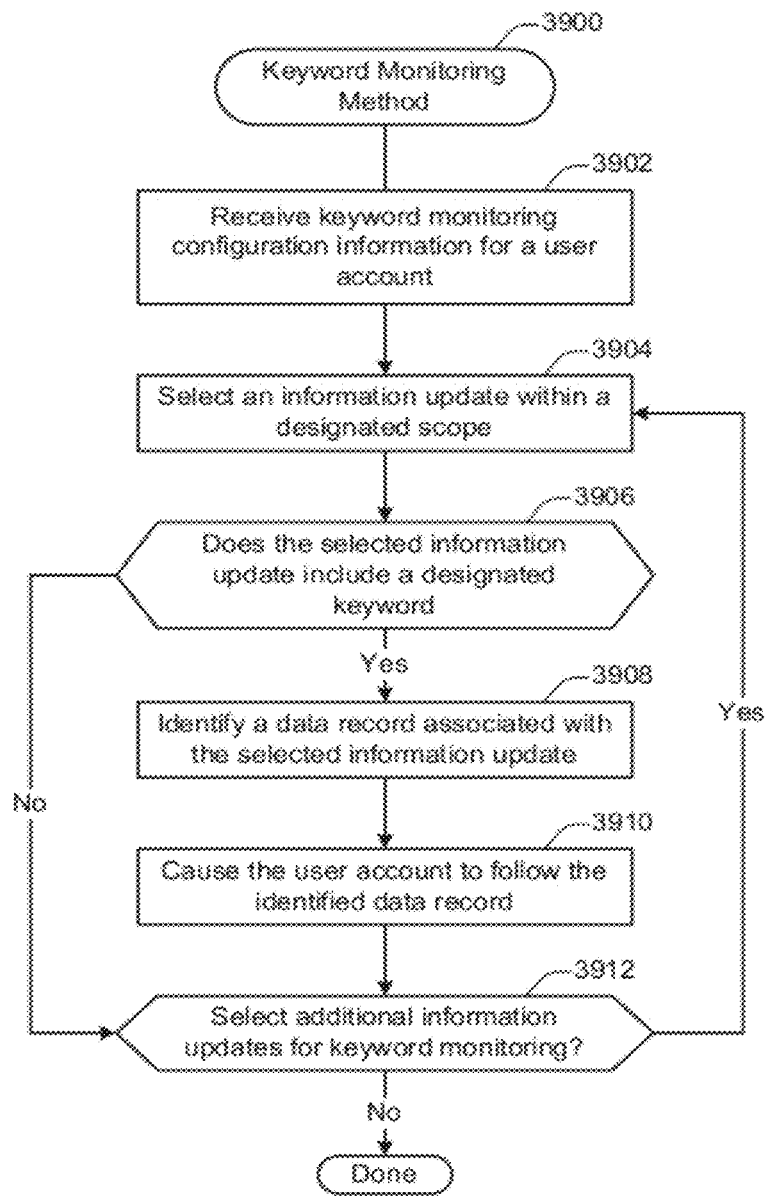
FIG. 39 shows a flowchart of a method 3900 for monitoring for a keyword, performed according to some implementations.

FIG. 39 shows a flowchart of a method 3900 for monitoring for a keyword, performed according to some implementations. In some implementations, the method 3900 may be performed in order to determine whether the keyword user account should follow any data records based on a keyword rule. The keyword rule may be configured as discussed with respect to the method 3800 shown in FIG. 38.

In some implementations, the method 3900 may be run on-demand. For example, the user may request to run the method 3900 via a user interface component provided in a web browser.

In some implementations, the method 3900 may be run automatically. For instance, the method 3900 may be run when keyword monitoring is first configured for the keyword user account or when keyword configuration information is changed for the keyword user account.

In some implementations, the method 3900 may be run periodically or at scheduled times. For instance, the method 3900 may be run once per day, once per week, several times per day, or at scheduled times.

In some implementations, such as when keyword monitoring uses a large amount of system resources, the method 3900 may be divided into batch jobs to spread the computing load over a period of time. The different batch jobs may include different sets of configured keyword rules or may be run for different sets of information updates.

At 3902, keyword monitoring configuration information for the keyword user account is retrieved. In some implementations, the keyword monitoring configuration information may include the information stored at operation 3818 discussed with respect to FIG. 38. The information may be retrieved from a storage medium accessible to the information feed system.

In some implementations, the keyword monitoring configuration information may include one or more keyword rule. Each keyword rule may include various types of information, which may include, but is not limited to: one or more designated keywords to monitor, scope information identifying a scope of information updates to monitor for the designated keywords, an indication of a logical combination of the designated keywords, one or more data objects to follow when the designated keywords are detected, and auto-follow termination information for the designated keywords.

At 3904, an information update is selected from within a designated scope. In some implementations, the selection of the information update at 3904 may be substantially similar to the selection of the information update discussed with respect to operation 1706 shown in FIG. 17.

In some implementations, the scope may define a type of information to which the keyword rule applies. For example, the scope may include or exclude information such as information updates, the names of files, the content of files, and the content of data records. As another example, the scope may include or exclude information updates published in relation to designated types of data records, designated user accounts or groups of user accounts, designated user account roles, or any other categorizations within an information feed system or computing services system.

In some implementations, the scope may define a range of information to which the keyword rule applies. For instance, the scope may include any information updates created in a set number of days (e.g., ten days) before the keyword rule was configured.

At 3906, a determination is made as to whether the selected information update includes a designated keyword. In some implementations, a keyword rule may include one or more keywords, which each may include one or more words as a phrase. Keywords may be combined using logical operators such as AND, OR, and XOR. The determination made at 3906 may involve performing one or more string comparison operations on data values, such as a text portion, associated with the selected information update. Further, the determination made at 3906 may involve performing computer programming language instructions related to evaluating a logical combination of keywords. The determination made at 3906 may also involve performing any other related instructions.

In some implementations, the selected information update may be monitored for text strings related to the keyword. For example, a common misspelling of a designated keyword may be treated as a match. As another example, synonyms of a designated keyword may be treated as a match. As yet another example, words commonly associated with a designated keyword may be treated as a match.

At 3908, a data record associated with the selected information update is identified. In some implementations, the data record may be identified in accordance with the information specified at operation 3812 discussed with respect to FIG. 38. In some cases, more than one data record may be identified.

In some implementations, as discussed with respect to operation 3812, the data object may be fixed. Alternately, the data record may be dynamically determined. For instance, the data record may be defined in relation to the information update. The types of data objects that may be identified may include, but are not limited to: a user account that created the information update, a database record with which the information update is linked, a group of user accounts to which the information update is posted, a file that includes the keyword within the file contents or file name, and a database record that includes the keyword within its fields.

In some implementations, as discussed with respect to operation 3808, matching of the keyword may be subject to one or more exclusions. For instance, a data record or group of user accounts having the keyword in the name may be excluded from matching the keyword, or may be identified only once. Data objects within such exclusions may not be identified at operation 3908 for following by the keyword user account.

At 3910, the user account is caused to follow the identified data record. In some implementations, causing the user account to follow the identified data record may include setting a data value to an indication that the first user account is following the data object such that updates related to the data object are capable of being stored as feed items in a feed table. In some cases, if more than one data record is identified at operation 3908, then more than one data record may be followed at operation 3910.

In some implementations, the following of the data record at 3910 may be substantially similar to the following of data records elsewhere within the information feed system. For instance, the keyword user account may be made to receive all information updates created in association with the followed data record, subject to any restrictions such as privacy controls or volume restrictions.

In some implementations, the following of the data record at 3910 may be in at least some ways different than the following of data records elsewhere within the information feed system. For example, information updates presented in the information feed associated with the keyword user account based on keyword rules may be presented in a different color or otherwise set off from other information updates to emphasize the fact that the keyword-based information updates result from keyword rules. As another example, the following of the data record at 3910 may result in only a limited number of information updates being displayed in the information feed associated with the keyword user account. For instance, the information updates displayed in the information feed may be limited to only the information update in which the keyword was detected, or to only a conversation that includes the information update in which the keyword was detected and other directly related information updates. As yet another example, the following of the data record at 3910 may result in information appearing in the information feed associated with the keyword user account such that the user associated with that account has the option to permanently follow data records associated with the information update. For instance, the information update that includes the keyword may be presented, and the user may be presented with the option to follow the user account that generated the information update or the data object to which the information update was posted.

At 3912, a determination is made as to whether to select additional information updates for keyword monitoring. In some implementations, as discussed with respect to operation 3904, information updates may be monitored for keywords when the information updates are created. Alternately, or additionally, groups of information updates may be monitored periodically or at scheduled times. For example, recently created information updates may be monitored once per day, once per week, several times per day, or according to some other schedule.

Figure 42:
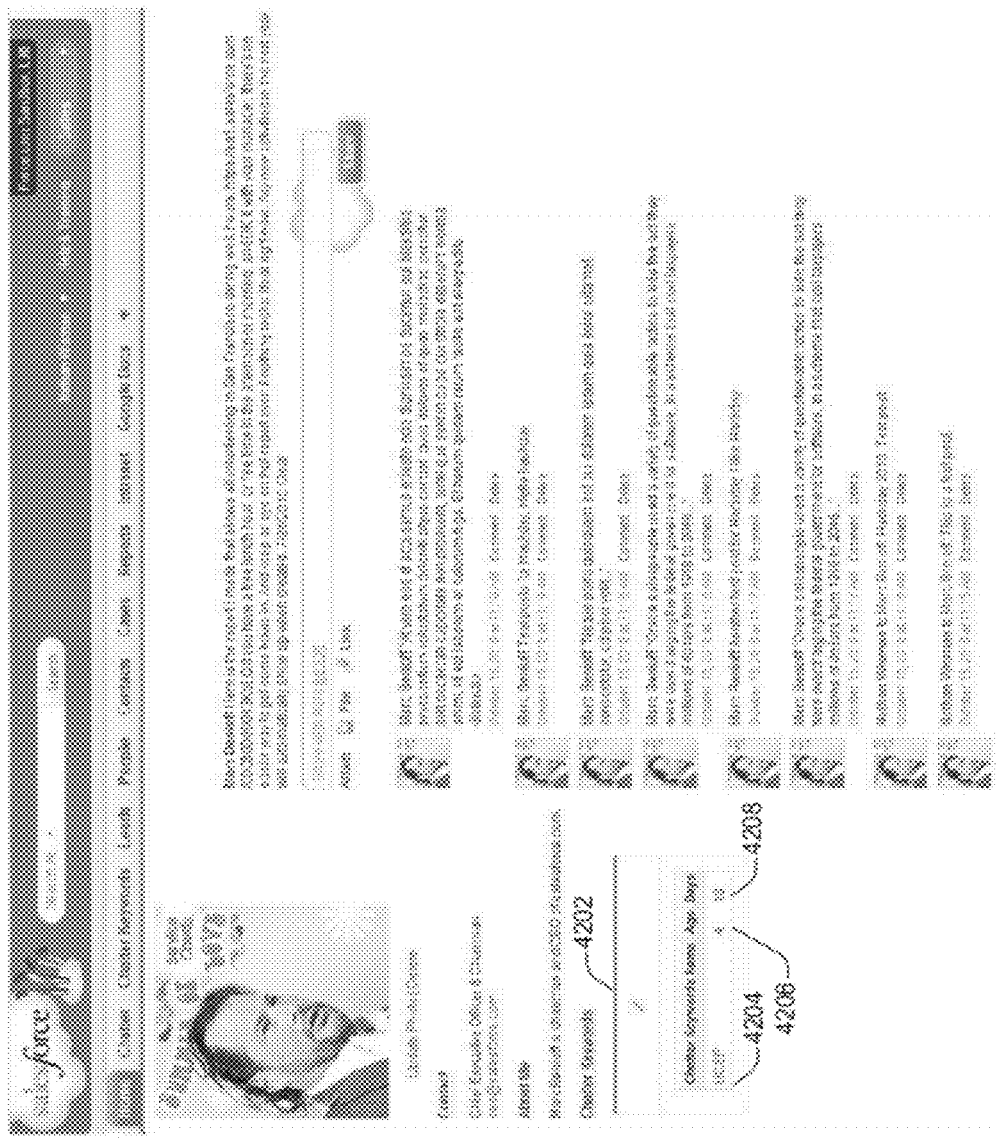

FIG. 42 shows an image of a user interface component, generated according to one or more implementations. The user interface component shown in FIG. 42 includes the keywords user interface component 4202. The keywords user interface component includes the keyword name area 4204, the keywords age area 4206, and the keywords days area 4208.

In some implementations, the keywords user interface component 4202 may be displayed on a page such as an information feed associated with the keyword user account. The keywords user interface component 4202 may display keyword rules configured for the keyword user account. In FIG. 42, the user account has configured only one rule for the keyword "UCSF" because the user, Mark Benioff, is interested in the subject UCSF.

In some implementations, the keyword name area 4204 lists the keywords that have been designated, which in FIG. 42 includes only the keyword UCSF. The keyword age area 4204 identifies the number of days in the past to search for information updates that include the keyword indicated in the keyword name area 4204. The keyword age area 4206 identifies the number of days that objects automatically followed by the keyword user account as a result of the keyword rule are to be followed. The user interface component shown in FIG. 42 is only an example of the types of user interface components that may be generated in accordance with techniques described herein. For example, the user interface component may not display information shown in FIG. 42 or may display additional information. As another example, time periods may be measured in intervals other than days, such as hours or weeks.

In some implementations, information presented in an information feed based on keyword rules may be displayed in a manner distinct from other information. For example, updates from automatically followed data objects may be flagged to indicate that the following of these objects is temporary and/or is the result of a keyword rule. As another example, updates from automatically followed data objects may be grouped together in a digest to avoid flooding an information feed with possibly irrelevant information. As yet another example, updates from automatically followed data objects may be ordered based on an ordering assigned to the keywords or keyword rules. As still another example, updates from automatically followed data objects may be selected based on an importance ranking or prevalence of the keywords.

Figure 40:
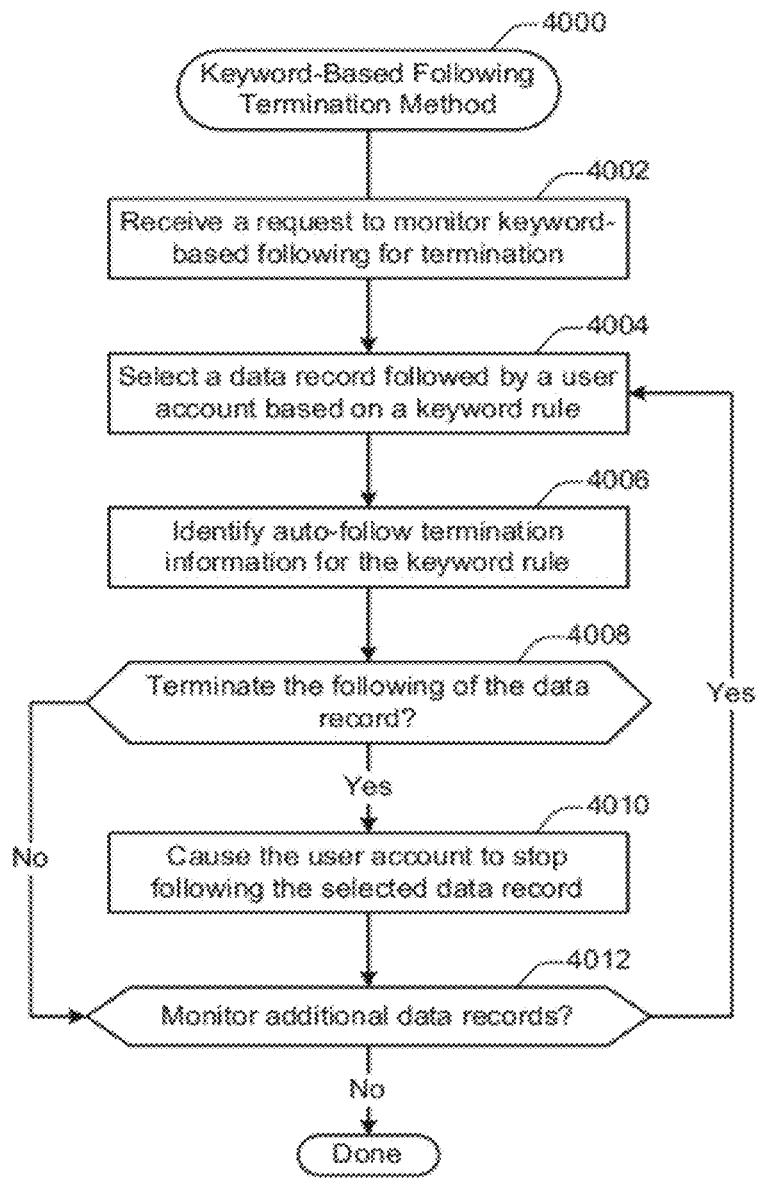
FIG. 40 shows a flowchart of a method 4000 for terminating keyword-based following, performed according to some implementations.

FIG. 40 shows a flowchart of a method 4000 for terminating keyword-based following, performed according to some implementations. In some implementations, the method 4000 may be used to cause the keyword user account to stop following a data record when a designated termination event has occurred. For instance, a keyword rule may be configured to cause the keyword user account to stop following a data record 10 days after the data record was automatically followed based on the keyword rule.

At 4002, a request is received to monitor keyword-based following for termination. In some implementations, the request received at 4002 may be generated automatically by the system. For instance, the system may be configured to check automatically followed data records for a user account to determine whether a termination event has occurred for any of the data records. The system may be configured to perform such a check at scheduled times, periodically (e.g., once per day), or when a possible termination event is detected.

In some implementations, the request received at 4002 may be generated by a user. For example, a user may notice that he or she is automatically following a large number of data records an request the system to determine whether to stop following any of the data records. As another example, the method 4000 may be run when the keyword configuration information is altered for the keyword user account. As yet another example, a system administrator may request that the method 4000 be initiated.

At 4004, a data record is selected. The data record may be followed by a user account based on a keyword. In some implementations, the data record may be selected by sequentially analyzing every data record being automatically followed by the keyword user account. Alternately, the data record may be selected by choosing a data record likely to qualify for auto-follow termination.

In some implementations, the method 4000 may be periodically run so as to monitor all data records monitored by a user account. Alternately, or additionally, the method 4000 may be run for selected data records or designated keyword rules. For instance, the method 4000 may be run in order to monitor a particular keyword rule when an event is detected that may cause the termination of data objects automatically followed based on that keyword rule.

At 4006, auto-follow termination information is identified for the keyword. In some implementations, the auto-follow termination information may be selected based on the data record selected at operation 4004. For example, if the data record selected at operation 4004 was automatically followed due to a particular keyword rule, then the auto-follow termination information for that keyword rule may be retrieved.

In some implementations, the auto-follow termination information may include the information identified at operation 3814 shown in FIG. 38. Alternately, or additionally, the auto-follow termination information may include termination events enforced by the system. Such system-provided termination information may be used to conserve system resources, enforce limits on the number of data objects followed, or perform various other tasks.

At 4008, a decision is made as to whether to terminate the following of the data record. In some implementations, the decision may be made at least in part based on the auto-follow termination information identified at 4006. For instance, the auto-follow termination information may indicate that the keyword user account should stop following another user account if the other user account has not mentioned the designated keyword within the past ten days. In this case, the system may review the information updates posted by the other user account for the past ten days to determine whether any of the information updates includes the designated keyword.

At 4010, the user account is caused to stop following the selected data record. In some implementations, the user account may be made to stop following the designated data record by setting a data value to an indication that the first user account is not following the data object. For instance, the system may remove an indication of the data object from a feeds data table in a database that indicates the data objects followed by various user accounts.

In some implementations, when the user account is caused to stop following the data record, a change may be made to a user interface component displaying information related to the information feed system. For instance, a list of data records automatically followed by the keyword user account may be altered to remove a reference to the data record that is no longer followed.

At 4012, a determination is made as to whether to monitor additional data records. As discussed with respect to operation 4004, in some implementations the method 4000 may be periodically run for all data records monitored by a user account. Alternately, or additionally, the method 4000 may be run on demand or may be run upon detecting a designated event.

The specific details of the specific aspects of implementations of the present invention may be combined in any suitable manner without departing from the spirit and scope of implementations of the invention. However, other implementations of the invention may be directed to specific implementations relating to each individual aspect, or specific combinations of these individual aspects.

While examples of the present invention are often described herein with reference to an implementation in which an on-demand enterprise services environment is implemented in a system having an application server providing a front end for an on-demand database service capable of supporting multiple tenants, the present invention is not limited to multi-tenant databases or to deployment on application servers. Implementations may be practiced using other database architectures, i.e., ORACLE®, DB2® by IBM and the like without departing from the scope of the implementations claimed.

It should be understood that implementations of the present invention as described above can be implemented in the form of control logic using hardware and/or using computer software in a modular or integrated manner. Other ways and/or methods to implement the present invention are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Computer readable media encoded with the software/program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method comprising:
   receiving a feed item, the feed item being displayable in a feed of a social networking system implemented using a database system, the feed being displayable on a display device;
   processing textual content of the feed item to detect a designated keyword in the textual content, the designated keyword associated with a data record creation rule;
   responsive to detecting the designated keyword in the textual content of the feed item, automatically:
      causing a data record to be created as a data object in a database of the database system, the created data record being accessible via a cloud-based computing services environment;
      identifying information of the feed item or of one or more feed items associated with the feed item related to the created data record;

determining that the created data record is related to a first customer relationship management (CRM) record of a CRM system; and causing one or more data fields of the created data record to be populated with the identified information of the feed item and information of the first CRM record.

2. The method recited in claim 1, wherein the received message feed item is displayable in the feed in accordance with first computer programming language instructions provided by a first entity, and wherein the created data record is created in accordance with second computer programming language instructions provided by a second entity.

3. The method recited in claim 2, wherein detecting the designated keyword in the textual content comprises:

executing third computer programming language instructions provided by the second entity.

4. The method recited in claim 2, wherein the first entity is an information service provider providing information services to a plurality of recipients.

5. The method recited in claim 4, wherein the second entity is one of the plurality of recipients.

6. The method recited in claim 1, wherein the created data record is stored in a multitenant database accessible to a plurality of tenants via a network.

7. The method recited in claim 1, wherein causing the created data record to be created comprises:

determining a data type for the created data record, the created data record being created in accordance with the determined data type.

8. The method recited in claim 1, the method further comprising:

associating the created data record with a user account in the social networking system, the created data record being created in association with the user account.

9. The method recited in claim 1, wherein causing the created data record to be created comprises:

associating the received feed item with the created data record, the received feed item being accessible via the created data record.

10. A database system implemented using a server system, the database system configurable to cause:

processing a feed item, the feed item being displayable in a feed of a social networking system implemented using the database system, the feed being displayable on a display device;

processing textual content of the feed item to detect a designated keyword in the textual content, the designated keyword associated with a data record creation rule;

responsive to detecting the designated keyword in the textual content of the feed item, automatically:

creating a data record to be stored as a data object in a database of the database system, the created data record being accessible via a cloud-based computing services environment;

identifying information of the feed item or of one or more feed items associated with the feed item related to the created data record;

determining that the created data record is related to a first customer relationship management (CRM) record of a CRM system; and populating one or more data fields of the created data record with the identified information of the feed item and information of the first CRM record.

11. The database system recited in claim 10, wherein the received feed item is displayable in the feed in accordance with first computer programming language instructions provided by a first entity, and wherein the created data record is created in accordance with second computer programming language instructions provided by a second entity.

12. The database system recited in claim 11, wherein detecting the designated keyword in the textual content comprises:

executing third computer programming language instructions provided by the second entity.

13. The database system recited in claim 11, wherein the first entity is an information service provider providing information services to a plurality of recipients.

14. The database system recited in claim 13, wherein the second entity is one of the plurality of recipients.

15. The database system recited in claim 10, wherein causing the created data record to be created comprises:

determining a data type for the created data record, the created data record being created in accordance with the determined data type.

16. A computer program product comprising computer-readable program code executable by one or more processors when retrieved from a non-transitory computer-readable medium, the program code comprising instructions configurable to cause:

processing a feed item, the feed item being displayable in a feed of a social networking system implemented using a database system, the feed being displayable on a display device;

processing textual content of the feed item to detect a designated keyword in the textual content, the designated keyword associated with a data record creation rule;

responsive to detecting the designated keyword in the textual content of the feed item, automatically:

creating a data record to be stored as a data object in a database of the database system, the created data record being accessible via a cloud-based computing services environment;

identifying information of the feed item or of one or more feed items associated with the feed item related to the created data record;

determining that the created data record is related to a first customer relationship management (CRM) record of a CRM system; and populating one or more data fields of the created data record with the identified information of the feed item and information of the first CRM record.

17. The computer program product recited in claim 16, wherein the received feed item is displayable in the feed in accordance with first computer programming language instructions provided by a first entity, and wherein the created data record is created in accordance with second computer programming language instructions provided by a second entity.

18. The computer program product recited in claim 17, wherein detecting the designated keyword in the textual content comprises:

executing third computer programming language instructions provided by the second entity.

19. The computer program product recited in claim 17, wherein the first entity is an information service provider providing information services to a plurality of recipients.

20. The computer program product recited in claim 19, wherein the second entity is one of the plurality of recipients.

* * * * *